US012674572B2

(12) United States Patent
Cohen

(10) Patent No.: US 12,674,572 B2
(45) **Date of Patent: *Jul. 7, 2026**

(54) INTEGRATED LIGHTING MODULE

(71) Applicant: AMP Plus, Inc., Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,375

(22) Filed: Feb. 19, 2025

(65) Prior Publication Data

US 2025/0244006 A1 Jul. 31, 2025

Related U.S. Application Data

(63) Continuation of application No. 19/020,672, filed on Jan. 14, 2025, and a continuation-in-part of (Continued)

(51) Int. Cl.

*F21V 29/76* (2015.01)
*F21V 7/04* (2006.01)
*F21Y 115/10* (2016.01)

(52) U.S. Cl.

CPC ............ *F21V 29/767* (2015.01); *F21V 7/041* (2013.01); *F21Y 2115/10* (2016.08)

(58) Field of Classification Search

CPC ..... F21V 29/767; F21V 7/041; F21Y 2115/10
See application file for complete search history.

(56) References Cited

U.S. PATENT DOCUMENTS 1,133,535 A * 3/1915 Cain ...................... H02G 3/126 248/57
1,471,340 A * 10/1923 Knight .................. H02G 3/083 220/3.94

(Continued)

FOREIGN PATENT DOCUMENTS

EP 3521688 A1 7/2019
WO WO2010051985 A1 5/2010

(Continued)

OTHER PUBLICATIONS

US 10,816,169 B1, 10/2020, Danesh (withdrawn)

(Continued)

*Primary Examiner* — Abdulmajeed Aziz
*Assistant Examiner* — Jessica M Apenteng
(74) *Attorney, Agent, or Firm* — Eric Kelly

(57) ABSTRACT

An integrated-lighting-module may have a heat sink module, a LED light chip, an optical reflector, and a holder, and optionally a driver cap. The driver cap may be configured to hold a driver within the driver cap to power the LED light chip. The driver cap may attach to a top of the heat sink module. The driver may be housed within the heat sink module. The heat sink module may be finned at various locations. The holder may attach to the heat sink module with the optical reflector and the LED light chip disposed between elements of the holder and elements of the heat sink module. Trim, such as MR16 sized trim, a lamp, and/or a lens holder, may attach to a bottom flange of the holder. The integrated-lighting-module may be adjusted without interfering with the trim. The holder may function as trim in some embodiments.

3 Claims, 55 Drawing Sheets

Related U.S. Application Data application No. 29/981,337, filed on Dec. 30, 2024, now Pat. No. Des. 1,108,687, and a continuation-in-part of application No. 29/962,228, filed on Sep. 10, 2024, now Pat. No. Des. 1,108,686, and a continuation-in-part of application No. 29/894,010, filed on Jun. 5, 2023, now Pat. No. Des. 1,108,685.

(56) References Cited

U.S. PATENT DOCUMENTS

| | | | | |
|---|---|---|---|---|
| 1,856,356 | A * | 5/1932 | Owen | H02G 3/126 220/3.9 |
| 2,352,913 | A * | 7/1944 | Parker | H01R 24/76 174/664 |
| 2,758,810 | A | 8/1956 | Good | |
| 2,802,933 | A | 8/1957 | Broadwin | |
| 3,104,087 | A | 9/1963 | Budnick | |
| 3,773,968 | A | 11/1973 | Copp | |
| 3,913,773 | A | 10/1975 | Copp | |
| 4,880,128 | A | 11/1989 | Jorgensen | |
| 4,919,292 | A | 4/1990 | Hsu | |
| 5,303,894 | A | 4/1994 | Deschamps | |
| 5,420,376 | A | 5/1995 | Rajecki | |
| 5,957,573 | A | 9/1999 | Wedekind | |
| 6,521,833 | B1 | 2/2003 | DeFreitas | |
| 6,967,284 | B1 | 11/2005 | Gretz | |
| 7,784,754 | B2 | 8/2010 | Nevers | |
| 7,857,275 | B2 | 12/2010 | de la Borbolla | |
| 7,950,832 | B2 | 5/2011 | Tanaka | |
| 8,235,549 | B2 | 8/2012 | Gingrich, III | |
| 8,322,897 | B2 | 12/2012 | Blincoe | |
| 8,545,064 | B2 | 10/2013 | Blincoe | |
| 8,680,755 | B2 | 3/2014 | Lim | |
| 8,845,144 | B1 | 9/2014 | Davis | |
| 8,926,133 | B2 | 1/2015 | Booth | |
| 9,039,254 | B2 | 5/2015 | Danesh | |
| 9,151,457 | B2 | 10/2015 | Pickard | |
| 9,404,639 | B2 | 8/2016 | Bailey | |
| 9,523,493 | B2 | 12/2016 | Chen | |
| 9,605,842 | B1 | 3/2017 | Davis | |
| 9,673,597 | B2 | 6/2017 | Lee | |
| 9,696,021 | B2 | 7/2017 | Wronski | |
| 9,797,562 | B2 | 10/2017 | Dabiet | |
| 9,854,642 | B2 | 12/2017 | Kashani | |
| 9,890,942 | B2 | 2/2018 | Lin | |
| 9,945,548 | B2 | 4/2018 | Williams | |
| 9,964,266 | B2 | 5/2018 | Danesh | |
| 10,072,805 | B2 | 9/2018 | Bailey | |
| D832,218 | S | 10/2018 | Wronski | |
| D833,977 | S | 11/2018 | Danesh | |
| 10,139,059 | B2 | 11/2018 | Danesh | |
| 10,244,607 | B1 | 3/2019 | Kashani | |
| D847,414 | S | 4/2019 | Danesh | |
| D847,415 | S | 4/2019 | Danesh | |
| 10,247,390 | B1 | 4/2019 | Kopitzke | |
| D848,375 | S | 5/2019 | Danesh | |
| D851,046 | S | 6/2019 | Peng | |
| 10,378,738 | B1 | 8/2019 | Davis | |
| 10,408,395 | B2 | 9/2019 | Danesh | |
| 10,408,396 | B2 | 9/2019 | Wronski | |
| D864,877 | S | 10/2019 | Danesh | |
| 10,488,000 | B2 | 11/2019 | Danesh | |
| 10,551,044 | B2 | 2/2020 | Peng | |
| 10,563,850 | B2 | 2/2020 | Danesh | |
| D877,957 | S | 3/2020 | Kopitzke | |
| 10,591,120 | B2 | 3/2020 | Bailey | |
| 10,609,785 | B1 | 3/2020 | Fardadi | |
| 10,616,968 | B2 | 4/2020 | Wang | |
| 10,663,127 | B2 | 5/2020 | Danesh | |
| 10,663,153 | B2 | 5/2020 | Nikooyan | |
| 10,753,558 | B2 | 8/2020 | Danesh | |
| 10,805,997 | B2 | 10/2020 | Wang | |
| 10,816,148 | B2 | 10/2020 | Danesh | |
| D901,398 | S | 11/2020 | Danesh | |
| D902,871 | S | 11/2020 | Danesh | |
| D903,605 | S | 12/2020 | Danesh | |
| D905,327 | S | 12/2020 | Williams | |
| D907,284 | S | 1/2021 | Danesh | |
| 10,975,570 | B2 | 4/2021 | Shen | |
| 10,982,829 | B2 | 4/2021 | Danesh | |
| 10,989,390 | B2 | 4/2021 | Lotfi | |
| 11,022,259 | B2 | 6/2021 | Bailey | |
| 11,028,982 | B2 | 6/2021 | Danesh | |
| 11,047,538 | B2 | 6/2021 | Danesh | |
| D924,467 | S | 7/2021 | Danesh | |
| D925,109 | S | 7/2021 | Danesh | |
| 11,060,705 | B1 | 7/2021 | Danesh | |
| 11,067,231 | B2 | 7/2021 | Lotfi | |
| 11,085,597 | B2 | 8/2021 | Danesh | |
| 11,092,326 | B2 * | 8/2021 | Cohen | F21V 19/003 |
| 11,118,768 | B2 | 9/2021 | Danesh | |
| 11,466,849 | B2 * | 10/2022 | Cohen | F21V 7/0016 |
| 11,668,458 | B2 * | 6/2023 | Cohen | F21V 17/12 362/268 |
| 2014/0254177 | A1 | 9/2014 | Danesh | |
| 2015/0009676 | A1 | 1/2015 | Danesh | |
| 2015/0233556 | A1 | 8/2015 | Danesh | |
| 2015/0276185 | A1 | 10/2015 | Bailey | |
| 2016/0312987 | A1 | 10/2016 | Danesh | |
| 2016/0348860 | A1 | 12/2016 | Bailey | |
| 2016/0348861 | A1 | 12/2016 | Bailey | |
| 2017/0005460 | A1 | 1/2017 | Lee | |
| 2017/0045213 | A1 | 2/2017 | Williams | |
| 2017/0051880 | A1 | 2/2017 | Joye | |
| 2017/0138576 | A1 | 5/2017 | Peng | |
| 2017/0167672 | A1 | 6/2017 | Stauner | |
| 2017/0167699 | A1 | 6/2017 | Schubert | |
| 2017/0290129 | A1 | 10/2017 | Kashani | |
| 2018/0231197 | A1 | 8/2018 | Danesh | |
| 2018/0372284 | A1 | 12/2018 | Danesh | |
| 2019/0049080 | A1 | 2/2019 | Danesh | |
| 2019/0063701 | A1 | 2/2019 | Lotfi | |
| 2019/0093836 | A1 | 3/2019 | Danesh | |
| 2019/0394849 | A1 | 12/2019 | Wang | |
| 2020/0056752 | A1 | 2/2020 | Danesh | |
| 2020/0116340 | A1 | 4/2020 | Nikooyan | |
| 2020/0158302 | A1 | 5/2020 | Danesh | |
| 2020/0232624 | A1 | 7/2020 | Lotfi | |
| 2020/0236755 | A1 | 7/2020 | Wang | |
| 2020/0291652 | A1 | 9/2020 | Shen | |
| 2020/0348000 | A1 | 11/2020 | Bailey | |
| 2020/0386375 | A1 | 12/2020 | Danesh | |
| 2020/0393118 | A1 | 12/2020 | Danesh | |
| 2021/0010647 | A1 | 1/2021 | Danesh | |
| 2021/0010663 | A1 | 1/2021 | Nikooyan | |
| 2021/0033268 | A1 | 2/2021 | Danesh | |
| 2021/0041070 | A1 | 2/2021 | Danesh | |
| 2021/0071836 | A1 | 3/2021 | Danesh | |
| 2021/0080084 | A1 | 3/2021 | Danesh | |
| 2021/0262650 | A1 | 8/2021 | Danesh | |

FOREIGN PATENT DOCUMENTS

| | | | |
|---|---|---|---|
| WO | WO2018237294 | A2 | 12/2018 |
| WO | WO2018237294 | A3 | 12/2018 |
| WO | WO2019046310 | A1 | 3/2019 |
| WO | WO2019133669 | A1 | 7/2019 |
| WO | WO2019222259 | A1 | 11/2019 |
| WO | WO2019241198 | A1 | 12/2019 |
| WO | WO2021051101 | A1 | 3/2021 |

OTHER PUBLICATIONS

US 10,969,069 B2, 04/2021, Danesh (withdrawn)

DMF DRD2 Product Publicly available at least as early as Sep. 6, 2018 Website: https://www.dmflighting.com/product/drd2/.

DMF DRD4 Product Publicly available at least as early as Sep. 6, 2018 Website: https://www.dmflighting.com/product/drd4/.

ELCO E247 Product Publicly available at least as early as Sep. 6, 2018 See attached concurrently filed NPL document with two product images of this ELCO E247 Product.

(56) References Cited

OTHER PUBLICATIONS

Soraa LED Optical Light Engine See: https://res.cloudinary.com/soraa/image/upload/v1516986148/resources/misc/ole-more-info-pdf.pdf.
IMTRA Tide PowerLED Light Fixture See: https://www.imtra.com/1806fa8d-4593-40f4-bbf0-f9a833e92148/lighting-light-fixtures-detail.htm Publicly available at least as early as 2012.
ELCO 4" Round LED Reflector Insert Publicly available at least as early as Mar. 23, 2021 Website: https://elcolighting.com/products/4-round-led-reflector-insert.
ELCO 4" Five-Color Temperature Switch LED Reflector Inserts Publicly available at least as early as Mar. 23, 2021 Website: https://elcolighting.com/node/1432026.
MaxLitePublicly available at least as early as Mar. 23, 2021 Website: https://www.maxlite.com/news-and-events/2021/02/05/maxlite-introduces-canless-commercial-downlights- with-field-selectable-wattages-and-ccts/ And.
Soraa Vivid MR16-GU10; https://www.soraa.com/products/19-MR16-GU10.php (last visited Nov. 9, 2021).
Nora Lighting, NIOB-2RNDC https://noralighting.com/product/niob-2rndc/.
Nora Lighting, NIO-4RPH https://noralighting.com/product/nio-4rph/.
Nora Lighting, NIOB-1RNG https://noralighting.com/product/niob-1rng/.
Nora Lighting https://noralighting.com/product-category/products/pendants/cylinder/.
Nora Lighting https://noralighting.com/product-category/products/pendants/ilene-mini-cylinder/.
Bruck Lighting https://brucklighting.com/download/b/GX15/Spec%20Sheets/GX15%20Cylinder%20Multi-Mount%20Spec%20Sheet.pdf.
Elite LED Lighting https://iuseelite.com/product-category/architectural-cylinders/?characteristics=c%2Bq.
DMF Lighting https://www.dmflighting.com/wp-content/uploads/2021/12/DMFLighting_DCC_Spec_Sheet.pdf.
Integrated Lighting Module A.
Integrated Lighting Module B.
Integrated Lighting Module C.

* cited by examiner

INTEGRATED LIGHTING MODULE

PRIORITY NOTICE

The present application, a continuation application, claims priority under 35 U.S.C. § 120 to U.S. Non-Provisional patent application Ser. No. 19/020,672 filed on Jan. 14, 2025, the disclosure of which is incorporated herein by reference in its entirety.

The present application, a continuation-in-part (CIP) application, claims priority under 35 U.S.C. § 120 to U.S. Non-Provisional patent application Ser. No. 29/894,010 filed on Jun. 5, 2023, the disclosure of which is incorporated herein by reference in its entirety.

The present application, a continuation-in-part (CIP) application, claims priority under 35 U.S.C. § 120 to U.S. Non-Provisional patent application Ser. No. 29/962,228 filed on Sep. 10, 2024, the disclosure of which is incorporated herein by reference in its entirety.

The present application, a continuation-in-part (CIP) application, claims priority under 35 U.S.C. § 120 to U.S. Non-Provisional patent application Ser. No. 29/981,337 filed on Dec. 30, 2024, the disclosure of which is incorporated herein by reference in its entirety.

TECHNICAL FIELD OF THE INVENTION

The present invention relates in general to integrated lighting modules and more specifically to an integrated lighting module wherein its heat sink module may have an upper portion that is finned and a bottom portion that is non-finned, wherein a diameter of the upper finned portion may be larger than a diameter of the bottom non-finned portion.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

There is a need in the art for an integrated lighting module that has a heat sink module with an upper finned portion and bottom non-finned portion, wherein a diameter of the upper finned portion is larger than a diameter of bottom non-finned portion as this will allow for increased heat dissipation efficiencies, increased lumens output, while still be configured for a specific sized trim, such as, but not limited, to MR16 sized trim.

There is a need in the art for an integrated lighting module that may be adjusted without interfering with its associated trim.

It is to these ends that the present invention has been developed.

BRIEF SUMMARY OF THE INVENTION

To minimize the limitations in the prior art, and to minimize other limitations that will be apparent upon reading and understanding the present specification, the present invention may describe an integrated-lighting-module and/or a lighting system that comprises the integrated-lighting-module.

In some embodiments, the integrated-lighting-module may have a driver cap, a finned heat sink module, a LED light chip, an optical reflector, and a holder. In some embodiments, the driver cap may be configured to hold a driver within the driver cap to power the LED light chip. In some embodiments, the driver cap may attach to a top of the heat sink module. In some embodiments, the holder may attach to the heat sink module with the optical reflector and the LED light chip disposed between elements of the holder and elements of the heat sink module. In some embodiments, the heat sink module may be finned at various locations (of the heat sink module). In some embodiments, where the heat sink module may be finned at its upper portions, the heat sink module may have a larger diameter than its non-finned bottom portion, which in turn may provide for increased heat dissipation and greater lumens output. In some embodiments, the holder may screw upon the bottom portion of the heat sink module with the optical reflector and the LED light chip disposed between the holder and the heat sink module. In some embodiments, trim, such as MR16 sized trim, may attach to bottom flanges of the holder. In some embodiments, the integrated-lighting-module may be adjusted without interfering with the trim. In some embodiments, the holder may be trim in some embodiments.

It is an objective of the present invention to provide an integrated lighting module.

It is another objective of the present invention to provide an integrated-lighting-module wherein its heat sink module may have an upper portion that is finned and a lower/bottom portion that is non-finned, wherein a diameter of the upper finned portion may be larger than a diameter of the bottom non-finned portion.

It is another objective of the present invention to provide an integrated-lighting-module wherein its heat sink module that may be used with MR16 sized trim, a lamp holder, and/or a lens holder.

It is another objective of the present invention to provide an integrated-lighting-module wherein its heat sink module that may be adjusted without interfering with the trim.

It is another objective of the present invention to provide an integrated-lighting-module wherein its driver may be entirely housed within its heat sink module.

It is yet another objective of the present invention to provide an integrated-lighting-module wherein its driver may be integrated onto a same printed circuit board (PCB) as the LED.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1:
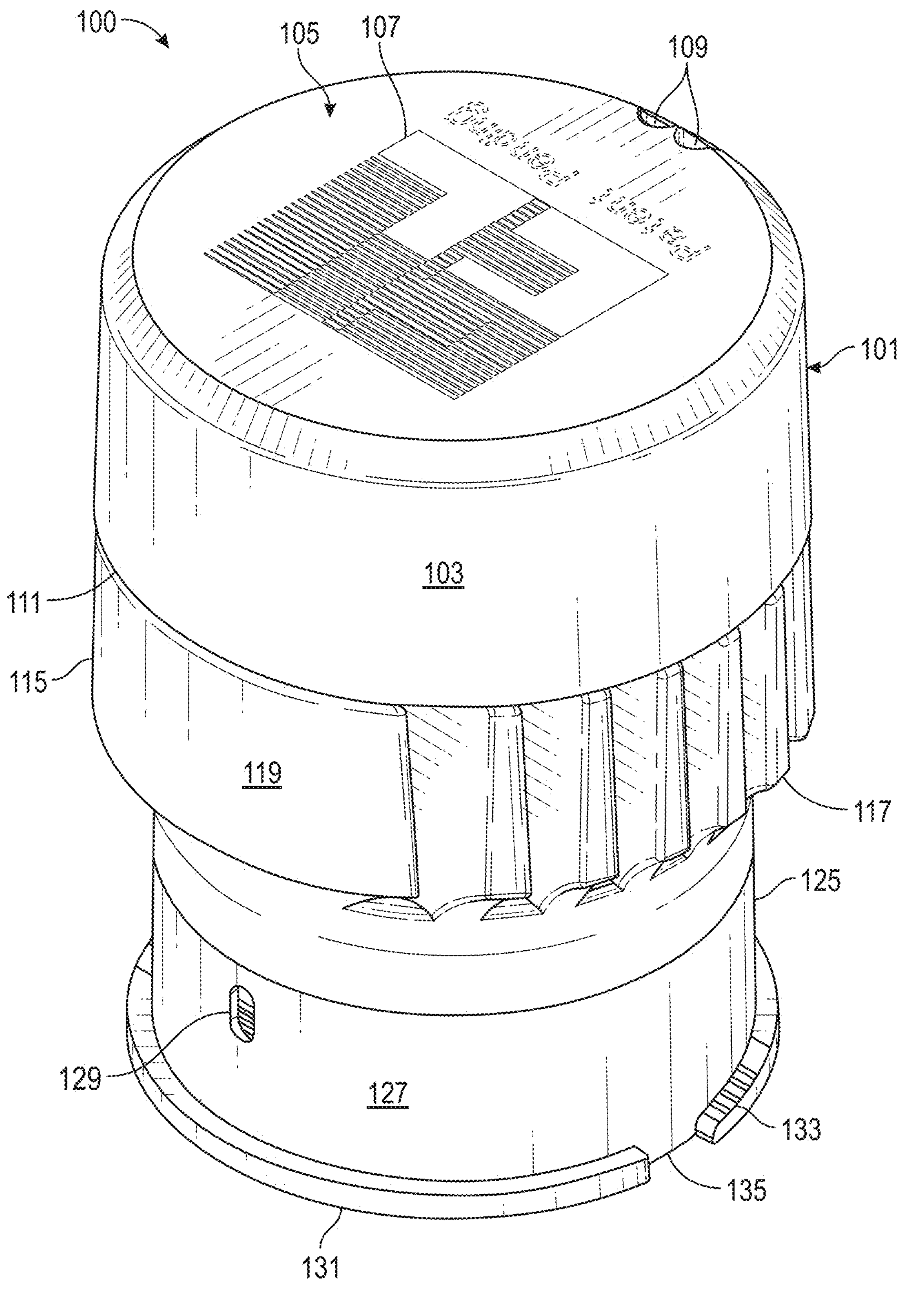
FIG. 1 illustrates a top perspective view of an integrated-lighting-module (in an assembled configuration).

100 integrated-lighting-module 100
101 driver cap 101 (driver housing 101)
103 side-wall 103 (first side-wall 103)
105 top 105 (first top 105)
107 indicator 107

109 aperture 109
111 bottom 111 (first bottom 111)
115 heat sink module 115
117 fin 117
119 side wall 119
125 holder 125
127 side-wall 127 (second side-wall 127)
129 thread lock notch 129
131 twist-lock-flange 131
133 twist-lock-teeth 133
135 twist-lock-opening 135
701 LED light chip 701 (light emitting diode element 701)
703 optical reflector 703
901 heat-sink-module-top-diameter 901
903 holder-side-wall-diameter 903
905 twist-lock-flange-outer-diameter 905
907 assembled-integrated-lighting-module-length 907
909 assembled-holder-length 909
911 assembled-driver-cap-and-heat-sink-module-length 911
1001 fin-radius 1003
1003 flange-radius 1003
1115 top 1115 (second top 1115)
1117 aperture 1117 (of heat sink 115)
1119 aperture 1119 (of heat sink 115)
1121 aperture 1121 (of heat sink 115)
1123 threading 1123 (of heat sink 115)
1125 bottom 1125 (of heat sink 115)
1131 top-hole 1131 (of optical reflector 703)
1133 bottom 1133 (second bottom 1133)
1141 top 1141 (third top 1141)
1143 internal-threading 1143 (of holder 125)
1201 frame 1201
1203 frame hole 1203
1211 can 1211
1221 trim 1221
1299 full assembly 1299
1301 communication-region-between-driver-cap-and-heat-sink-module 1301
1303 communication-region-between-heat-sink-module-and-holder 1303
1305 communication-region-between-driver-cap-and-heat-sink-module 1305
1307 communication-region-between-driver-cap-and-heat-sink-module 1307
1309 communication-region-between-heat-sink-module-and-holder 1309
1311 communication-region-between-heat-sink-module-and-holder 1311
1401 region-for-housing-LED-chip 1401
1403 region-for-housing-reflector 1403
1501 volume 1501
1503 volume 1503
1701 upper-region 1701
1703 middle-region 1703
1705 bottom-region 1705
1711 upper-region 1711
1713 lower-region 1713
1721 upper-finned-region 1721
1723 conical-frustrum-region 1723
1725 cylindrical-region 1725
1727 bottom-threaded-region 1727
1731 finned-upper-region 1731
1733 middle-transition-region 1733
1735 bottom-region 1735
1800 integrated-lighting-module 1800

1815 heat sink module 1815
1825 holder 1825
1841 gap (air gap) 1841
1843 spacer 1843
1900 integrated-lighting-module 1900
1901 lid (cap) 1901
1903 aperture-for-receiving-fastener 1903
1915 heat sink module 1915
2001 upper-cavity 2001
2003 lower-cavity 2003
2005 floor/ceiling 2005
2007 structure 2007
2011 driver and/or other electronics 2011
2102 holder-of-LED 2102
2103 selector 2103
2217*a* fin 2217*a*
2217*b* fin 2217*b*
2300 integrated-lighting-module 2300
2301 LED-chip-with-integrated-driver 2301
2400 prior-art-integrated-lighting-module 2400
2401 driver-cap 2401
2415 non-finned-heat-sink 2415
2417 undulations 2417
2419 bottom-cavity 2419
2421 LED 2421
2423 exterior-tooth (tab) 2423
2425 holder 2425
2427 half-arc-inside-flange (ledge) 2427
2429 paper-reflector 2429
2500 prior-art-integrated-lighting-module 2500
2501 driver-cap 2501
2511 exterior-wiring 2511
2515 trapezoidal-finned-heat-sink 2515
2517 swept-fin 2517
2519 bottom-cavity 2519
2521 LED 2521
2525 holder 2525
2529 reflector 2529

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 illustrates a top perspective view of an integrated-lighting-module 100 (in an assembled configuration). Note, “integrated-lighting-module” may also be referred to as “integrated lighting module” (i.e., with or without the hyphens). Note, unless otherwise specified “integrated-lighting-module 100” may refer to the assembled configuration for integrated-lighting-module 100 such as that shown in FIG. 1. In some embodiments, integrated-lighting-module 100 may also be known as a driver assembly. In some embodiments, integrated-lighting-module 100 may comprise sub-components of a driver cap 101, a heat sink module 115, and a holder 125. In some embodiments, driver cap 101 may be referred to as a driver housing 101. In some embodiments, driver cap 101 may attach to a top portion of heat sink module 115 (and in some embodiments, this attachment may be removable). In some embodiments, a bottom portion of heat sink module 115 may attach to holder 125 (and in some embodiments, this attachment may be removable). In some embodiments, heat sink module 115 may be disposed between driver cap 101 and holder 125. In some embodiments, heat sink module 115 may be in communication with driver cap 101 and with holder 125. In some embodiments, driver cap 101 may not be touching holder 125.

Continuing discussing FIG. 1, in some embodiments, driver cap 101 may be substantially hollow (void space) and cylindrical member (e.g., with side-wall 103) that may be closed (capped) at one end (its top 105) and open at its other end (bottom 111). In some embodiments, this hollow void space that driver cap 101 may surround may be for various electronics, such as, but not limited to a driver. In some embodiments, top 105 and bottom 111 of driver cap 101 may be disposed opposite from each other, separated by side-wall 103. In some embodiments, top 105 may comprise one or more aperture(s) 109. In some embodiments, top 105 may have one or more aperture(s) 109. In some embodiments, the one or more aperture(s) 109 may be through holes. In some embodiments, the one or more aperture(s) 109 may facilitate passage of wires, cabling, and/or the like. In some embodiments, top 105 may have one or more indicator(s) 107. In some embodiments, top 105 may have one or more indicator(s) 107. In some embodiments, the one or more indicator(s) 107 may be one or more of: word(s), writing, number(s), graphic(s), logo(s), trademark(s), serial number(s), model number(s), certification indication(s), status indication(s), lot number(s), patent number(s), tracking number(s), registration number(s), and/or the like. In some embodiments, bottom 111 of driver cap 101 may be open, which may allow various electronics, such as, but not limited to, the driver to be inserted and used while in the hollow void space that driver cap 101 may surround. In some embodiments, bottom 111 of driver cap 101 may be open, which may allow driver cap 101 to attach (removably so in some embodiments) to a top portion of heat sink module 115. In some embodiments, a nature (type or style) of attachment between driver cap 101 and heat sink module 115 may be one or more of: friction fit, press fit, snap fit, threaded fit, attached using adhesives, welded fit, attached using screws, attached using bolts, attached using tacks, and/or the like.

Continuing discussing FIG. 1, in some embodiments, heat sink module 115 may be a substantially hollow (surrounding void space) and cylindrical member that may be substantially finned along its upper (top) portion and threaded along its bottom portion. In some embodiments, heat sink module 115 may be finned with a plurality of fins 117. In some embodiments, heat sink module 115 may be fined (e.g., with fin(s) 117) or non-finned (e.g., no fins 117). In some embodiments, heat sink module 115 may be finned with one or more fin(s) 117. In some embodiments, the one or more fin(s) 117 may encourage, facilitate, and/or provide for heat transfer, such as, but not limited, heat radiated out from these one or more fin(s) 117 into the surrounding environment. In some embodiments, the one or more fin(s) 117 may allow cooling of heat sink module 115. In some embodiments, where sides of heat sink module 115 are not finned with fins 117, there may be side walls 119. In some embodiments, heat sink module 115 may comprise side walls 119. In some embodiments, heat sink module 115 may have side walls 119. In some embodiments, heat sink module 115 may house various electronics, such as, but not limited to, LED light chip 701 (see e.g., FIG. 7 and FIG. 11 for LED light chip 701). In some embodiments, LED light chip 701 may also be referred to as LED element 701. Also, “chip,” “board,”

"PCB," and/or "printed circuit board" may be used interchangeably herein. Note, "LED" as used herein may mean "light emitting diode." In some embodiments LED light chip 701 may be a light source that may comprise one or more LEDs. In some embodiments LED light chip 701 may be a light source that may comprise one or more light source(s) that may or may not include LEDs. In some embodiments, heat sink module 115 may house at least some portion of optical reflector 703 (see e.g., FIG. 7 and FIG. 11 for optical reflector 703). In some embodiments, heat sink module 115 may be substantially (mostly) closed at its top end (aside from various apertures and the fins 117). In some embodiments, heat sink module 115 may be substantially (mostly) open at its bottom end.

In some embodiments, heat sink module 115 may attach to holder 125. In some embodiments, heat sink module 115 may be removably attached to holder 125. In some embodiments, heat sink module 115 may be removably attached to holder 125 via complimentary threading on each respective component (such as, threading 1123 of heat sink module 115 and internal-threading 1143 of holder 125—see e.g., FIG. 11).

Continuing discussing FIG. 1, in some embodiments, holder 125 may be a substantially hollow and cylindrical member that may be open at both ends. In some embodiments, holder 125 may hold heat sink module 115. In some embodiments, holder 125 may hold optical reflector 703. In some embodiments, holder 125 may hold both heat sink module 115 and optical reflector 703. In some embodiments, when integrated-lighting-module 100 may be assembled, at least a portion of heat sink module 115 and/or at least a portion of optical reflector 703 may be located within holder 125. In some embodiments, a main cylindrical side wall portion of holder 125 may be denoted as side-wall 127. In some embodiments, holder 125 may comprise side-wall 127, which may be a side wall of holder 125. In some embodiments, within side-wall 127 may be one or more holes, denoted as thread lock notch 129. In some embodiments, a given thread lock notch 129 may be a through hole through side-wall 127. In some embodiments, a given thread lock notch 129 may be threaded to receive a threaded screw and/or a threaded bolt. In some embodiments, such a threaded screw and/or a threaded bolt passing through thread lock notch 129, may be used to securely lock optical reflector 703 onto a bottom portion of heat sink module 115.

Continuing discussing FIG. 1, in some embodiments, a bottom portion of holder 125 may have a twist-lock flange 131. In some embodiments, twist-lock flange 131 may be one or more flange(s) that run around and extend outwardly from a bottom portion of holder 125. In some embodiments, twist-lock flange 131 may be two or more flange(s) that run around and extend outwardly from a bottom portion of holder 125; wherein each such flange may be separated by a gap in the given flange, wherein this gap may be denoted as twist-lock-opening 135. In some embodiments, at one end of each such gap (i.e., at one end of twist-lock-opening 135) may be a tapered portion of twist-lock flange 131 with gripping teeth, denoted as twist-lock-teeth 133. In some embodiments, the two or more twist-lock flanges 131, with two twist-lock-teeth 133, and two twist-lock-openings 135, may be used to removably attached holder 125 to a given trim 1221 (see e.g., FIG. 12A and FIG. 12B for trim 1221). In some embodiments, flange 131 may be an outside annular flange of a portion of holder 125 (such as a bottom portion of holder 125). In some embodiments, flange 131 may be an outside annular flange, with or without breaks/interruptions in a continuity of that given annular flange. In some embodiments, a bottom portion of holder 125 may have an annular flange (such as, but not limited to flange 131). See e.g., FIG. 1.

In some embodiments, optical reflector 703 may be held (secured) by holder 125. In some embodiments, optical reflector 703 may be held within holder 125. In some embodiments, this may be accomplished by a set screw passing at least partially through a given thread lock notch 129 of holder 125 to engage optical reflector 703. In some embodiments, side-wall 127 of holder 125 may have at least one thread lock notch 129. See e.g., FIG. 1.

In some embodiments, holder 125 may be removed via twisting (un-twisting) action, which in turn may then allow for a change in optics (such as, but not limited, to use of louvers, spread lens, and/or the like). In some embodiments, holder 125 may have adjustability via twisting (or un-twisting) action. In some embodiments, adjusting holder 125 may not require tools.

In some embodiments, a given integrated-lighting-module 100 may comprise: a driver cap 101, a heat sink module 115, a LED light chip 701, an optical reflector 703, and a holder 125. See e.g., FIG. 1, FIG. 11 and/or FIG. 15.

Figure 2:
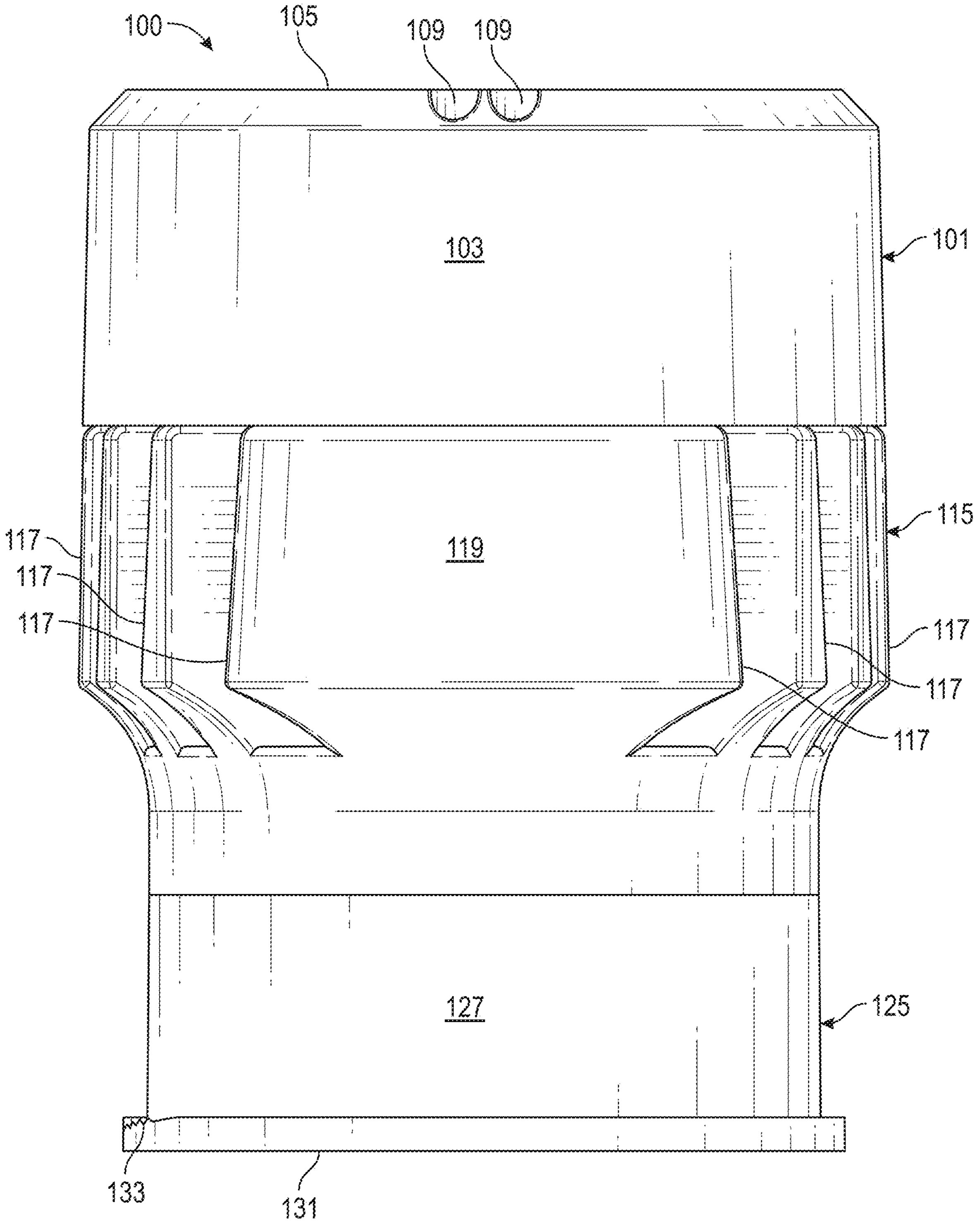
FIG. 2 illustrates a front view of the integrated-lighting-module of FIG. 1.

FIG. 2 illustrates a front view of integrated-lighting-module 100. Portions of driver cap 101, of heat sink module 115, and of holder 125 of integrated-lighting-module 100 may be seen in FIG. 2. Portions of aperture(s) 109 of driver cap 101 may be seen. Portions of side-wall 103 of driver cap 101 may be seen. Portions of fins 117 of heat sink module 115 may be seen. Portions of side wall 119 of heat sink module 115 may be seen. Note as shown in FIG. 2, the finned portions of heat sink module 115 may be wider than a bottom portion of heat sink module 115. That is, the bottom of heat sink module 115, where the main opening to the interior of heat sink module 115 may be located, may have a smaller diameter as compared to an upper finned portion of heat sink module 115; and in turn this configuration may facilitate more efficient heat dissipation and/or overall improved performance. For example, and without limiting the scope of the present invention, note in FIG. 2 as the viewer progresses upwards from a bottom of heat sink module 115 that its diameters increases, such that most of the finned region has a greater diameter than the bottom non-finned regions (note, this can also be seen in figures FIG. 3 through FIG. 5). Note, heat sink module 115 may have a curve that transitions from its smaller diameter bottom regions to its upper finned portions with the larger diameter. This curve in heat sink module 115 may permit integrated-lighting-module 100 to be adjusted without hitting/interfering with trim 1221 (see FIG. 12A or FIG. 12B for trim 1221). (The bottom of heat sink module 115 may be denoted as bottom 1125 and may be shown in FIG. 11.) Portion of side-wall 127 of holder 125 may be seen in FIG. 2. Portions of twist-lock-flange 131 and twist-lock-teeth 133 of holder 125 may also be seen in FIG. 2.

Figure 3:
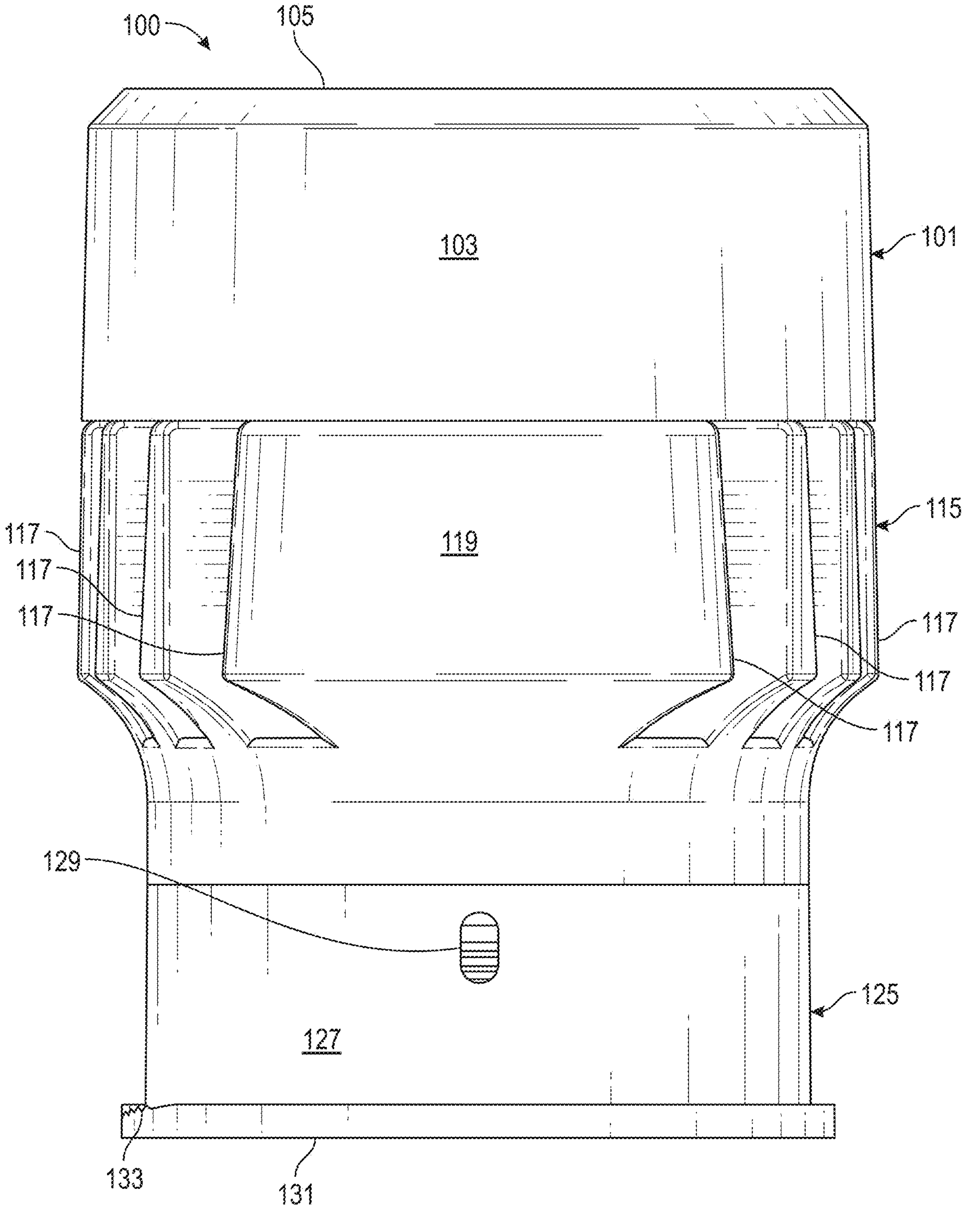
FIG. 3 illustrates a rear view of the integrated-lighting-module of FIG. 1.

FIG. 3 illustrates a rear view of integrated-lighting-module 100. Portions of driver cap 101, of heat sink module 115, and of holder 125 of integrated-lighting-module 100 may be seen in FIG. 3. Portions of side-wall 103 of driver cap 101 may be seen. Portions of fins 117 of heat sink module 115 may be seen. Portions of side wall 119 of heat sink module 115 may be seen. Note as shown in FIG. 3, the finned portions of heat sink module 115 may be wider than a bottom portion of heat sink module 115. That is, the bottom (bottom 1125) of heat sink module 115, where the main opening to the interior of heat sink module 115 may be located, may have a smaller diameter as compared to an upper finned portion of heat sink module 115; and in turn this configuration may facilitate more efficient heat dissipation and/or overall improved performance. (The bottom 1125 of heat sink module 115 may be shown in FIG. 11.) Portion of side-wall 127 of holder 125 may be seen in FIG. 3. A thread lock notch 129 of holder 125 may be seen in FIG. 3. Portions of twist-lock-flange 131 and twist-lock-teeth 133 of holder 125 may also be seen in FIG. 3. The view of FIG. 3 may be an opposing view as compared against the view of FIG. 2.

Figure 4:
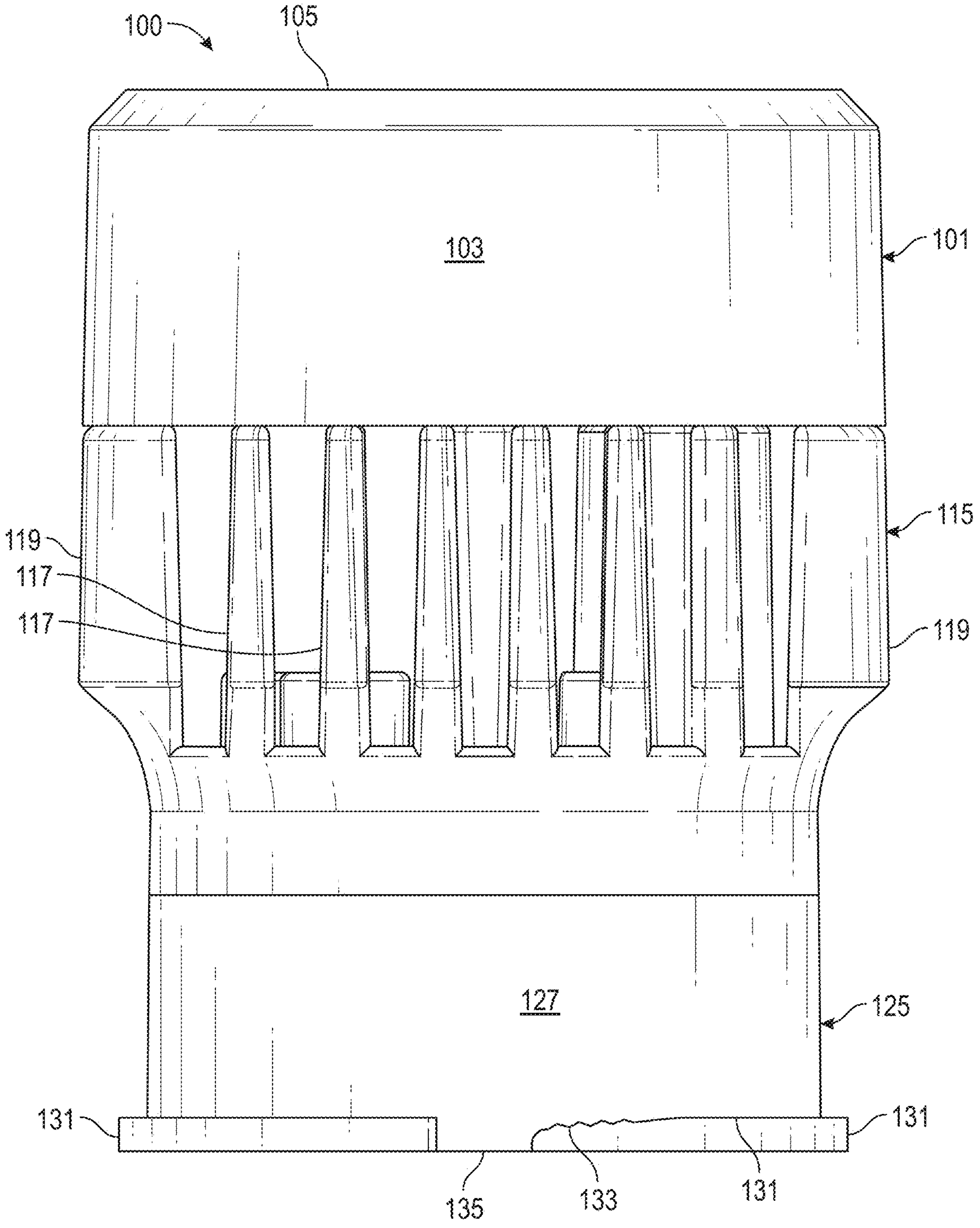
FIG. 4 illustrates a left-side view of the integrated-lighting-module of FIG. 1.

FIG. 4 illustrates a left-side view of integrated-lighting-module 100. Portions of driver cap 101, of heat sink module 115, and of holder 125 of integrated-lighting-module 100 may be seen in FIG. 4. Portions of side-wall 103 of driver cap 101 may be seen. Portions of fins 117 of heat sink module 115 may be seen. Portions of side wall 119 of heat sink module 115 may be seen. Portion of side-wall 127 of holder 125 may be seen in FIG. 4. Portions of twist-lock-flange 131 and twist-lock-teeth 133 of holder 125 may also be seen in FIG. 4.

Figure 5:
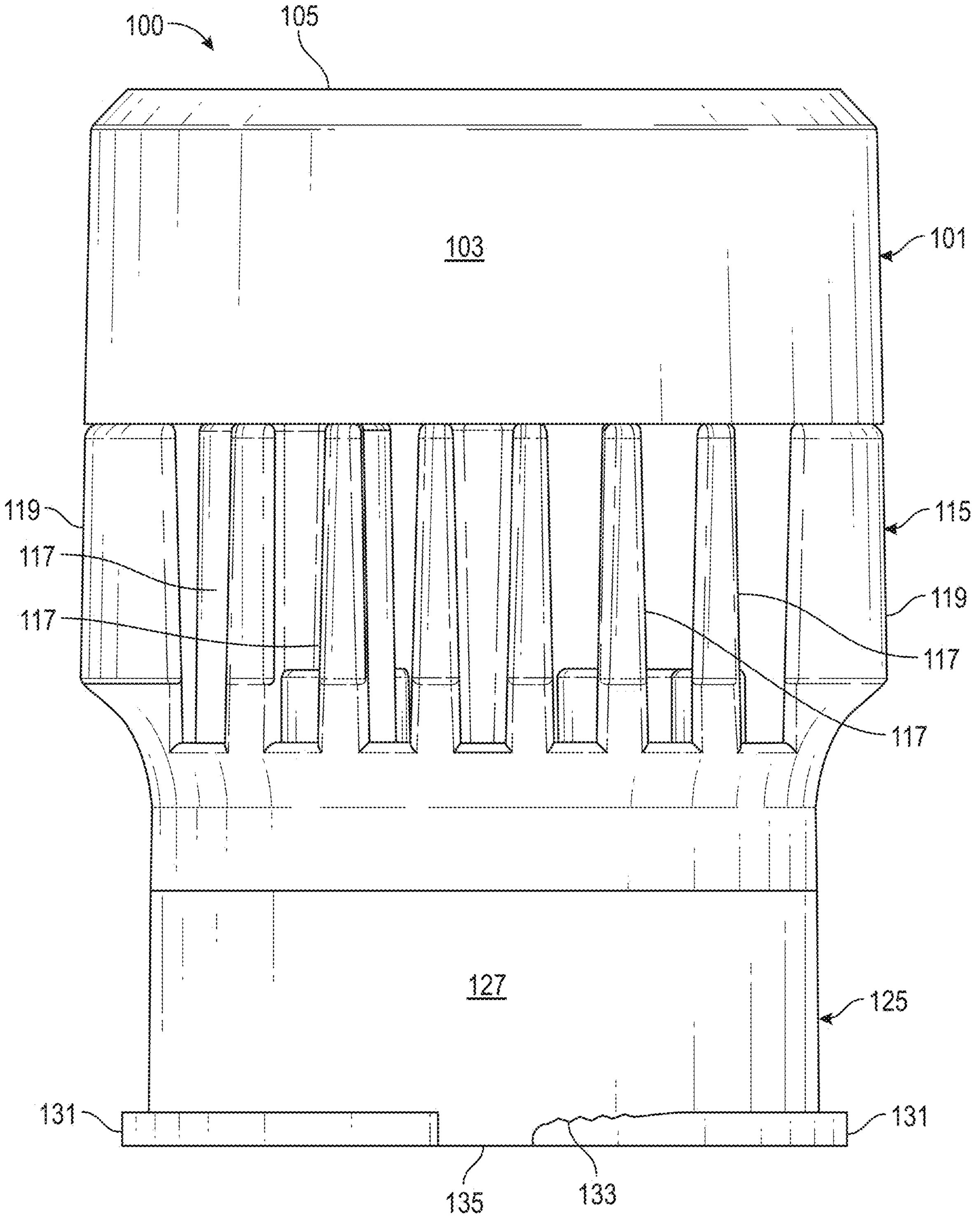
FIG. 5 illustrates a right-side view of the integrated-lighting-module of FIG. 1.

FIG. 5 illustrates a right-side view of integrated-lighting-module 100. Portions of driver cap 101, of heat sink module 115, and of holder 125 of integrated-lighting-module 100 may be seen in FIG. 5. Portions of side-wall 103 of driver cap 101 may be seen. Portions of fins 117 of heat sink module 115 may be seen. Portions of side wall 119 of heat sink module 115 may be seen. Portion of side-wall 127 of holder 125 may be seen in FIG. 5. Portions of twist-lock-flange 131 and twist-lock-teeth 133 of holder 125 may also be seen in FIG. 5. The view of FIG. 5 may be an opposing view as compared against the view of FIG. 4.

Figure 6:
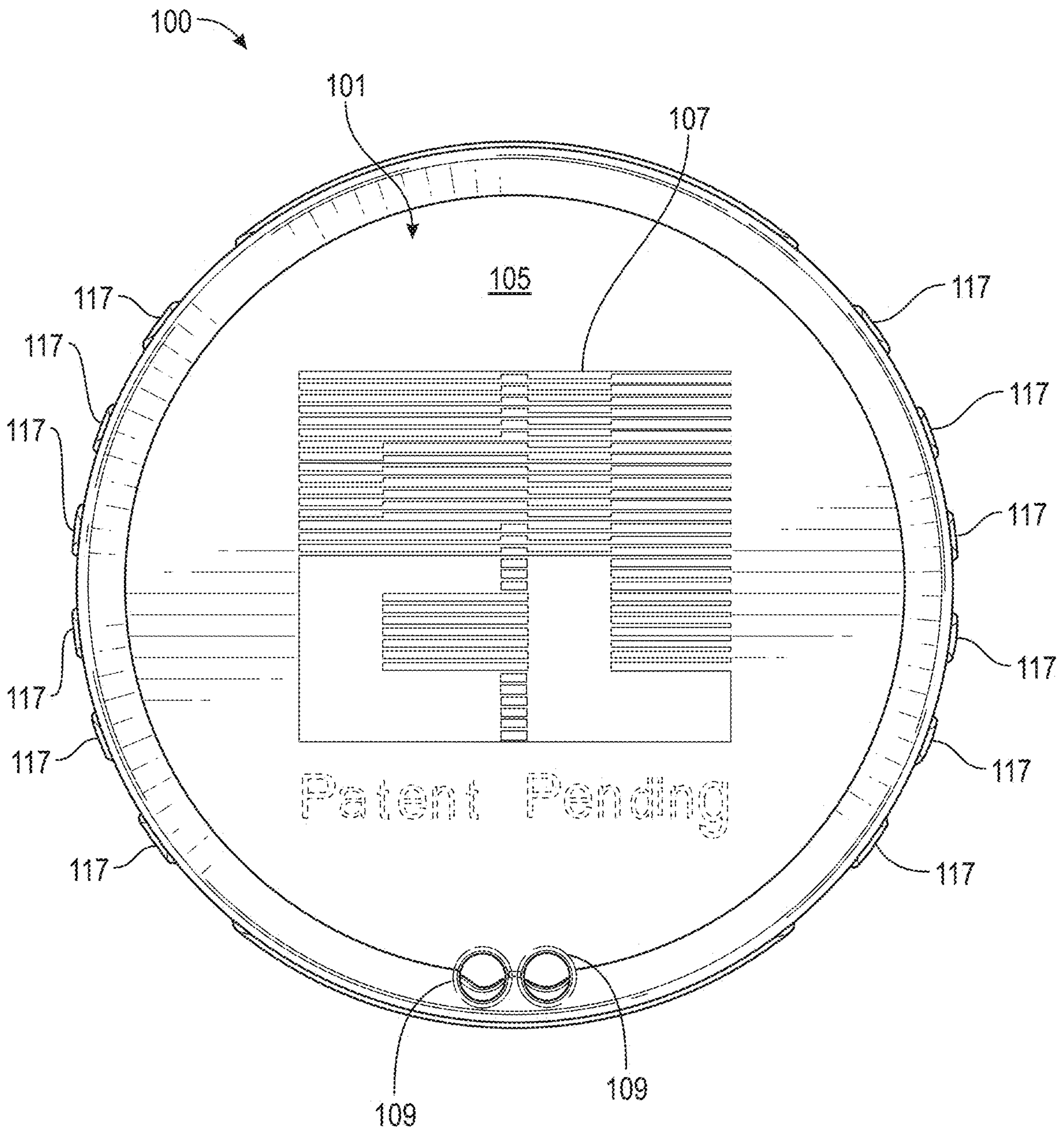
FIG. 6 illustrates a top view of the integrated-lighting-module of FIG. 1.

FIG. 6 illustrates a top view of integrated-lighting-module 100. Portions of driver cap 101 and of heat sink module 115 of integrated-lighting-module 100 may be seen in FIG. 6. Top 105 of driver cap 101 may be seen in FIG. 6. Apertures 109 of driver cap 101 may be seen in FIG. 6. Indicator 107 of driver cap 101 may be seen in FIG. 6. The outer edges of fins 117 of heat sink module 115 may be seen in FIG. 6, being wider (greater in diameter) than driver cap 101 and wider (greater in diameter) than holder 125. The outer edges of side wall 119 of heat sink module 115 may be seen in FIG. 6, being wider (greater in diameter) than driver cap 101 and wider (greater in diameter) than holder 125.

In some embodiments, first top 105 of driver cap 101 may comprise at least one aperture 109. In some embodiments, first top 105 of driver cap 101 may comprise at least one indicator 107. See e.g., FIG. 1 and FIG. 6.

Figure 7:
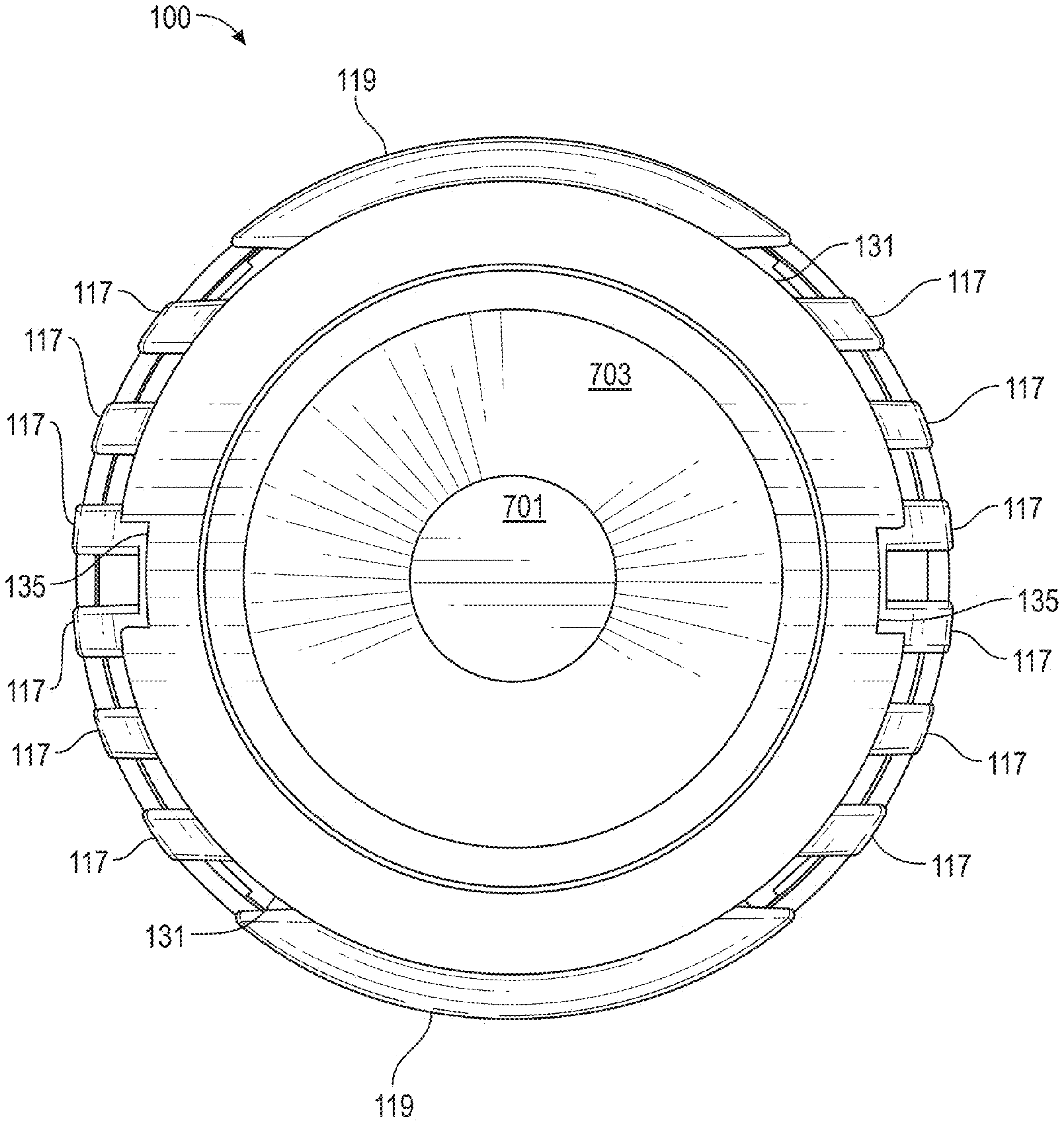
FIG. 7 illustrates a bottom view of the integrated-lighting-module of FIG. 1.

FIG. 7 illustrates a bottom view of integrated-lighting-module 100. Portions of holder 125, optical reflector 703, of LED light chip 701, and of heat sink module 115 of integrated-lighting-module 100 may be seen in FIG. 7. Bottom portions of twist-lock-flanges 131 of holder 125 may be seen in FIG. 7. Bottom portions of twist-lock-openings 135 of holder 125 may be seen in FIG. 7. The two twist-lock-openings 135 may be disposed opposite of each other, separating two different twist-lock-flanges 131. A bottom portion of optical reflector 703 may be seen in FIG. 7. In some embodiments, optical reflector 703 may reflect, direct, distribute, and/or spread out emitted light from LED light chip 701. A top center hole (top-hole 1131) of optical reflector 703 may be where emitted light from LED light chip 701 enters the bottom of optical reflector 703 (see FIG. 11 for top-hole 1131). The outer edges of fins 117 of heat sink module 115 may be seen in FIG. 7, being wider (greater in diameter) than driver cap 101 and wider (greater in diameter) than holder 125. The outer edges of side wall 119 of heat sink module 115 may be seen in FIG. 7, being wider (greater in diameter) than driver cap 101 and wider (greater in diameter) than holder 125. The view of FIG. 7 may be an opposing view as compared against the view of FIG. 6.

Figure 8:
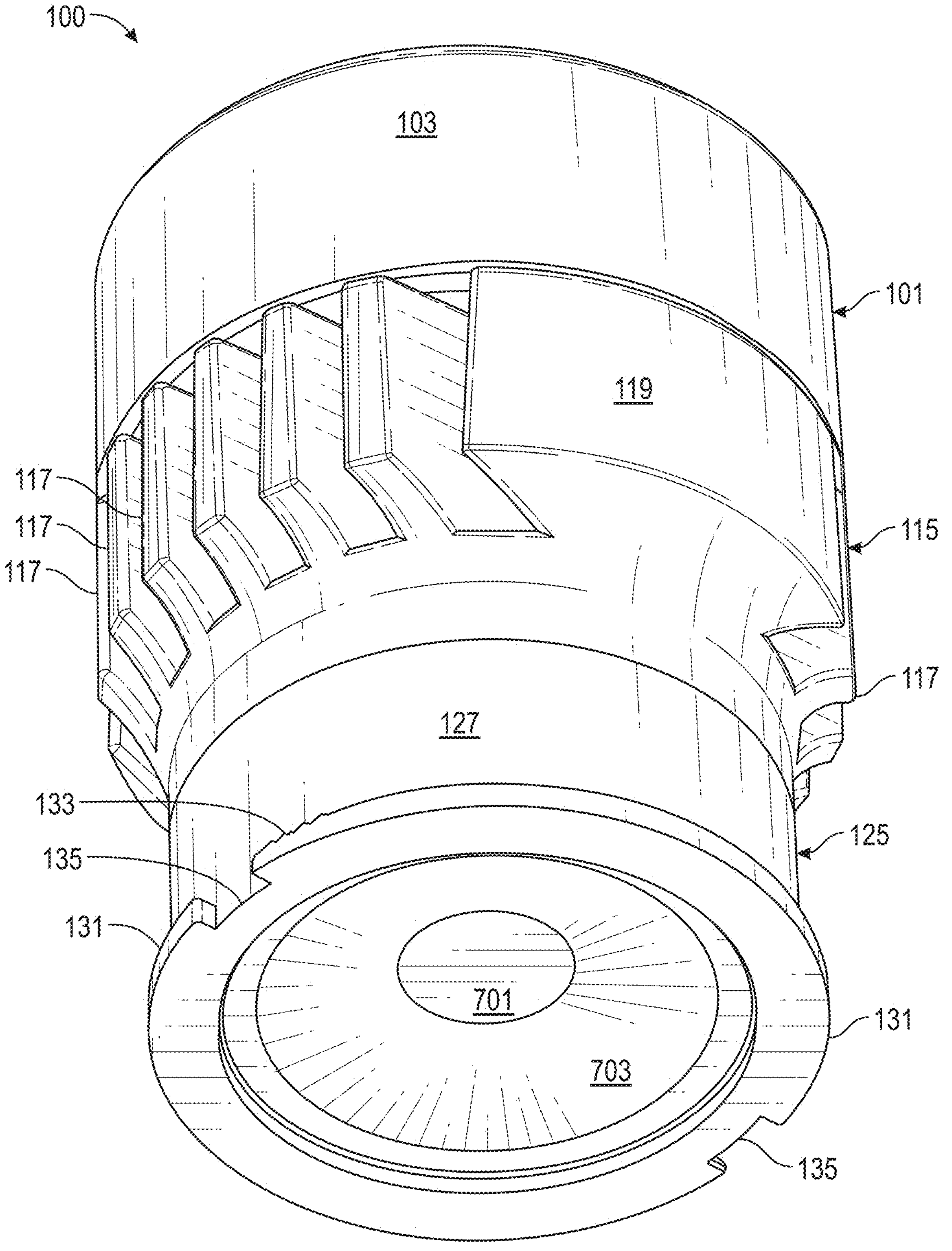
FIG. 8 illustrates a bottom perspective view of the integrated-lighting-module of FIG. 1.

FIG. 8 illustrates a bottom perspective view of integrated-lighting-module 100. Portions of driver cap 101, of heat sink module 115, of holder 125, of optical reflector 703, and of LED light chip 101, all of integrated-lighting-module 100, may be seen in FIG. 8.

Figure 9:
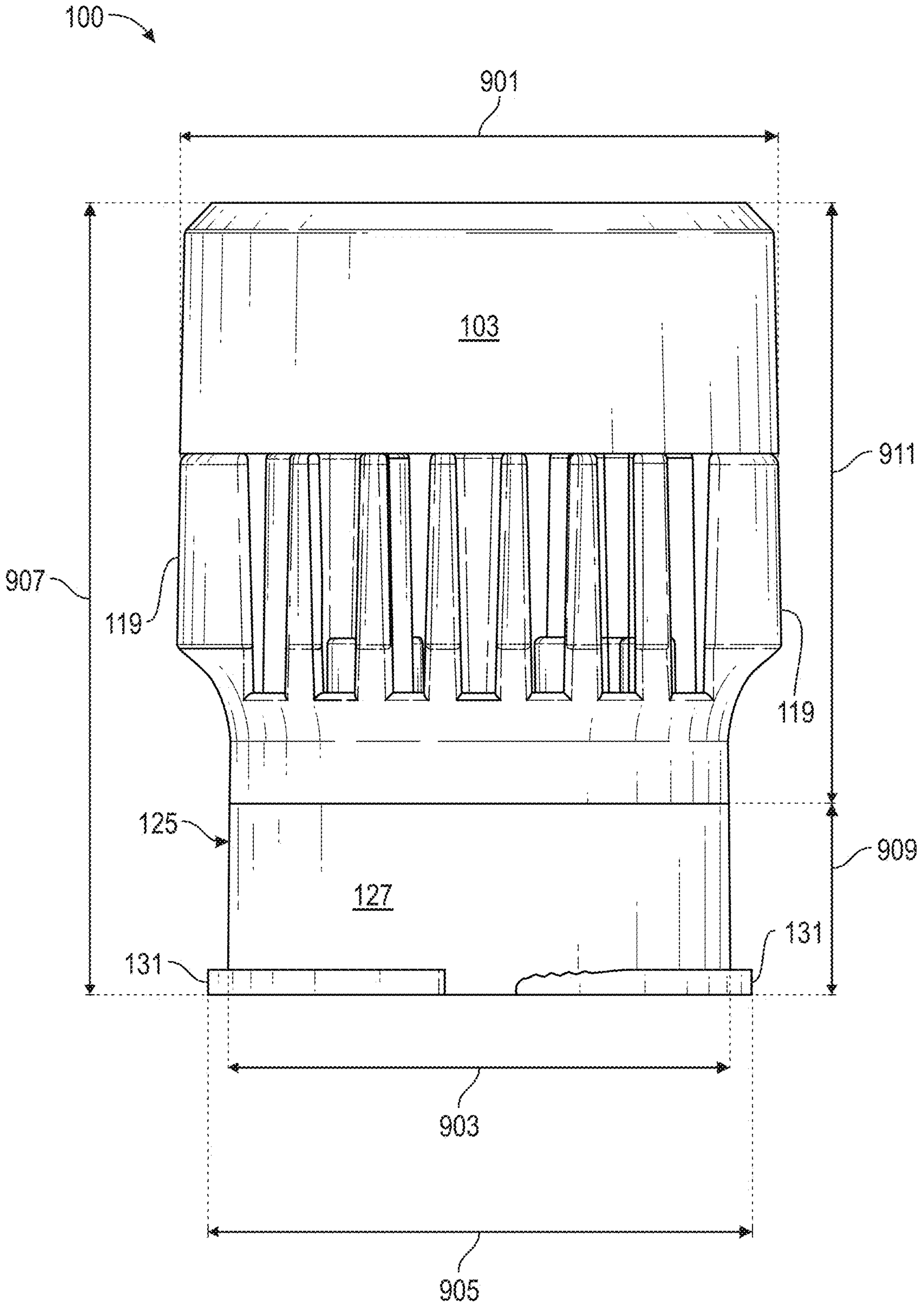
FIG. 9 illustrates the right-side view of the integrated-lighting-module of FIG. 1 while showing some dimensional relationships of the integrated-lighting-module.

FIG. 9 illustrates the right-side view of integrated-lighting-module 100 while showing some dimensional relationships of integrated-lighting-module 100. FIG. 9 may be substantially similar to identical to FIG. 5, except in FIG. 9 various dimensional call-outs and/or relationships may be shown. For example, and without limiting the scope of the present invention the following may be shown in FIG. 9: heat-sink-module-top-diameter 901, twist-lock-flange-outer-diameter 903, holder-side-wall-diameter 905, assembled-integrated-lighting-module-length 907, assembled-holder-length 909, and/or assembled-driver-cap-and-heat-sink-module-length 911.

Continuing discussing FIG. 9, in some embodiments, heat-sink-module-top-diameter 901 may be an outer (outside) diameter of heat-sink-module 115 as measured near a top of heat sink module 115. In some embodiments, heat-sink-module-top-diameter 901 may be 55.65 mm (millimeters), plus or minus 5 mm. (In some embodiments, 55.65 mm may be about 2.19 inches.) In some embodiments, holder-side-wall-diameter 903 may be an outer (outside) diameter of holder 125 as measured at side-wall 127 of holder 125. In some embodiments, holder-side-wall-diameter 903 may be 45.80 mm, plus or minus 5 mm. (45.80 mm may be about 1.80 inches.) In some embodiments, twist-lock-flange-outer-diameter 905 may be an outer (outside) diameter across twist-lock-flange 131 of holder 125. In some embodiments, twist-lock-flange-outer-diameter 905 may be 49.98 mm, plus or minus 5 mm. (49.98 mm may be about 1.97 inches.) In some embodiments, assembled-integrated-lighting-module-length 907 may be an overall length (height) of integrated-lighting-module 100, when integrated-lighting-module 100 may be in its assembled configuration. In some embodiments, assembled-integrated-lighting-module-length 907 may be 72.70 mm, plus or minus 5 mm. In some embodiments, assembled-holder-length 909 may be a length of holder 125, when holder 125 may be assembled into a given integrated-lighting-module 100 from a bottom of holder 125 towards its top (top 1141 shown in FIG. 11). In some embodiments, assembled-driver-cap-and-heat-sink-module-length 911 may be length from top 105 of driver cap 101 towards a bottom portion of heat sink module 115, below fins 117, when driver cap 101 and heat sink module 115 may be assembled into a given integrated-lighting-module 100. In some embodiments, heat-sink-module-top-diameter 901 may be greater than holder-side-wall-diameter 903; which may facilitate improved heat dissipation efficiency and/or overall improved performance. In some embodiments, a ratio of heat-sink-module-top-diameter 901 to holder-side-wall-diameter 903 may be greater than one up to and including 1.5. For example, and without limiting the scope of the present invention, a ratio of heat-sink-module-top-diameter 901 to holder-side-wall-diameter 903 may be from 1.21 to 1.22.

Figure 10:
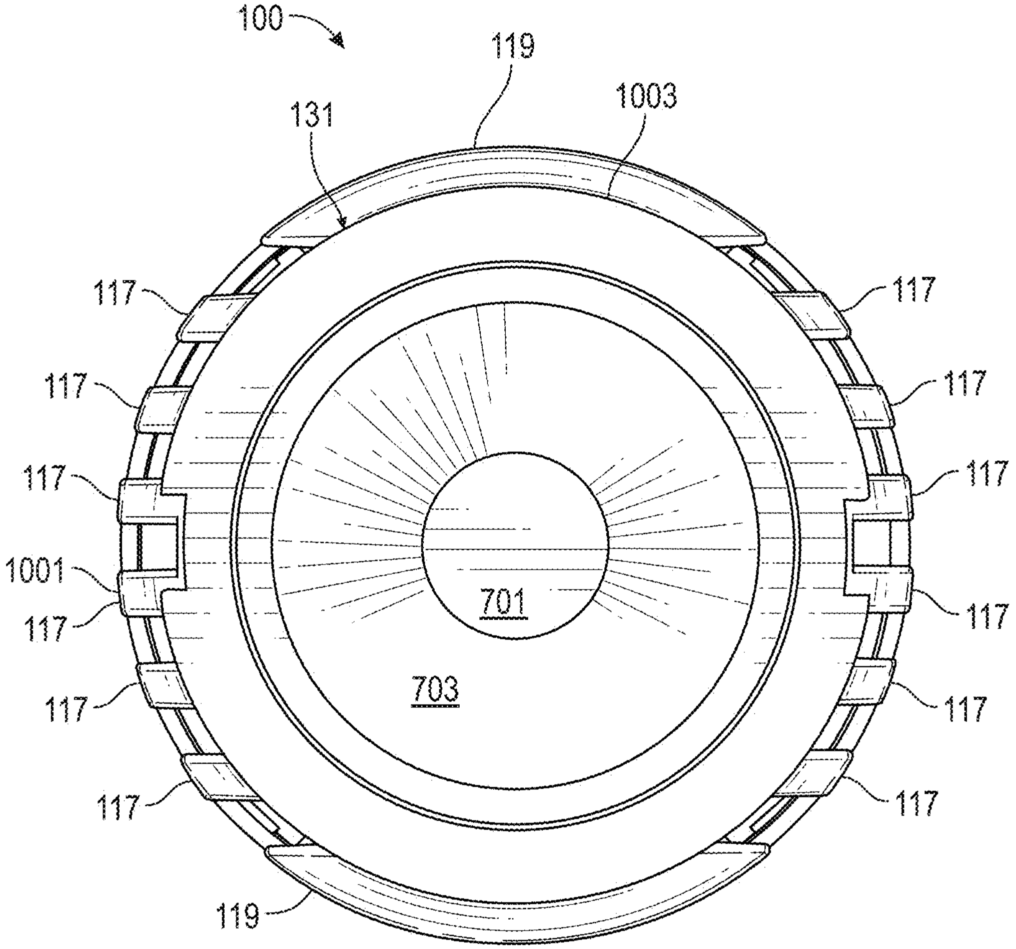
FIG. 10 illustrates the bottom view of the integrated-lighting-module of FIG. 1 while showing some dimensional relationships (e.g., radii) of the integrated-lighting-module.

FIG. 10 illustrates the bottom view of integrated-lighting-module 100 while showing some dimensional relationships (e.g., radii) of integrated-lighting-module 100. FIG. 10 may be substantially similar to FIG. 7, except in FIG. 10 two radius may be called out, fin-radius 1001 and flange-radius 1003. In some embodiments, fin-radius 1001 may be a radius as measured from out an outer fin 117 surface to a center of integrated-lighting-module 100; wherein the center is the center of the view of the figure shown in FIG. 10. In some embodiments, fin-radius 1001 may be 27.83 mm, plus or minus 2.5 mm. In some embodiments, flange-radius 1003 may be a radius from an outside edge of twist-lock-flange 131 to this center. In some embodiments, flange-radius 1003 may be 24.99 mm, plus or minus 2.5 mm.

In some embodiments, other dimensions for heat-sink-module-top-diameter 901, holder-side-wall-diameter 903, twist-lock-flange-outer-diameter 905, assembled-integrated-lighting-module-length 907, assembled-holder-length 909, assembled-driver-cap-and-heat-sink-module-length 911, fin-radius 1001, and/or flange-radius 1003 are contemplated. In some embodiments, dimensions for heat-sink-module-top-diameter 901, holder-side-wall-diameter 903, twist-lock-flange-outer-diameter 905, assembled-integrated-lighting-module-length 907, assembled-holder-length 909, assembled-driver-cap-and-heat-sink-module-length 911, fin-radius 1001, and/or flange-radius 1003 may be fixed and predetermined.

Figure 11:
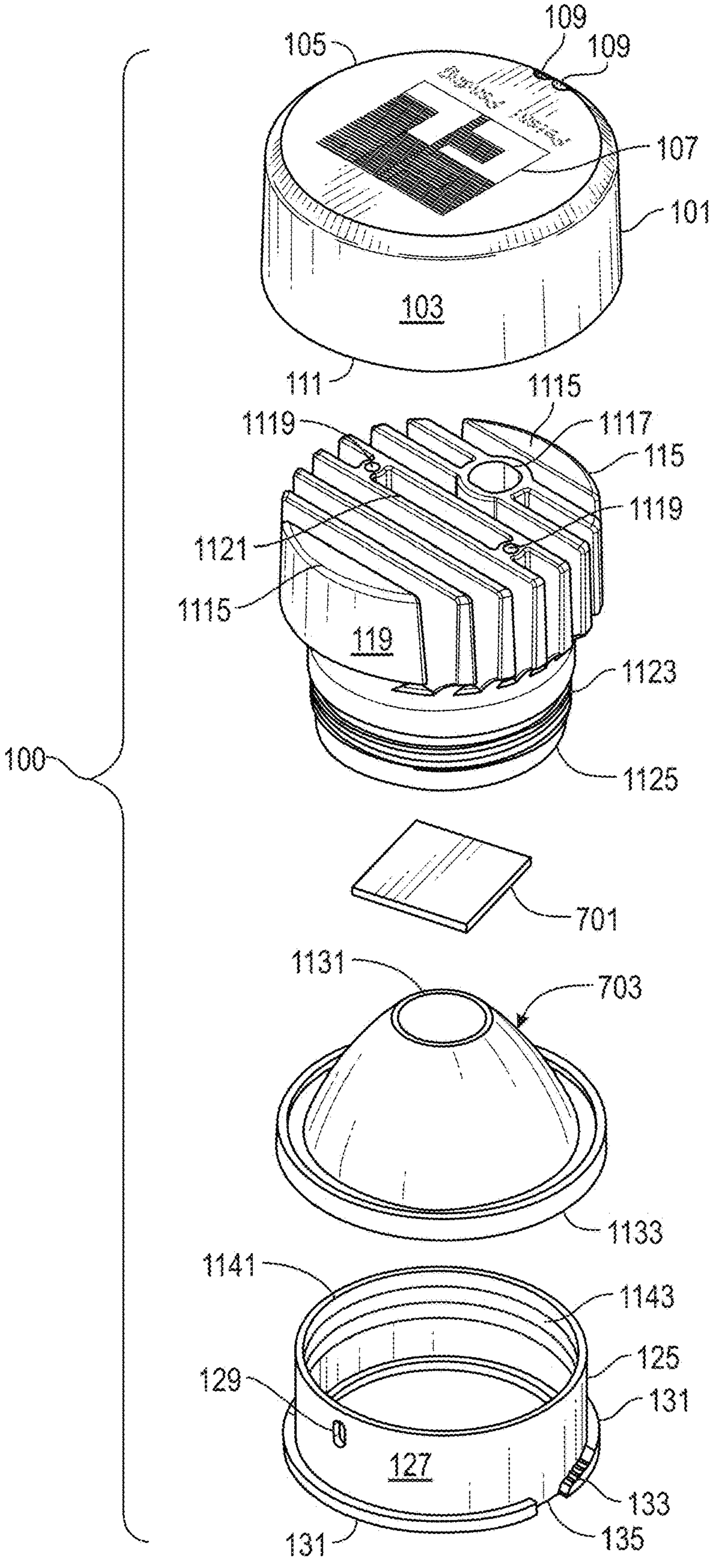
FIG. 11 illustrates an exploded top perspective view of the integrated-lighting-module of FIG. 1.

FIG. 11 illustrates an exploded top perspective view of integrated-lighting-module 100. FIG. 11 may show main sub-components separated from each other of integrated-lighting-module 100. FIG. 11 may show driver cap 101 separated from heat sink module 115. FIG. 11 may show heat sink module 115 separated from: LED light chip 701 (that may emit light), optical reflector 703, and holder 125.

Continuing discussing FIG. 11, in some embodiments, the substantially cylindrically shaped heat sink module 115 may have a top 1115 and a bottom 1125. In some embodiments, top 1115 may be disposed opposite from bottom 1125. In some embodiments, in top 1115 may be various holes and/or apertures, such as, but not limited to, aperture 1117, aperture(s) 1119, and/or aperture 1121. In some embodiments, apertures in top 1115, may be for receiving screws, bolts, wiring, cabling, and/or at least portions of electronic components. In some embodiments, aperture 1117, aperture(s) 1119, and/or aperture 1121 may be for receiving screws, bolts, wiring, cabling, and/or at least portions of electronic components. In some embodiments, at least one fin 117 may run substantially linearly (straight) across top 1115. In some embodiments, at least one fin 117 may run substantially linearly (straight) across top 1115, except where interrupted by an aperture (e.g., aperture 1117, aperture(s) 1119, and/or aperture 1121) and where two opposing regions of side wall 119 may descend from top 1115. In some embodiments, at least two fins 117 may run substantially parallel across top 1115. In some embodiments, at least two fins 117 may run substantially parallel across top 1115, except where interrupted by an aperture (e.g., aperture 1117, aperture(s) 1119, and/or aperture 1121) and where two opposing regions of side wall 119 may descend from top 1115. In some embodiments, the finned regions (of fins 117) of heat sink module 115, may occupy the majority of the upper portions of heat sink module 115. In some embodiments, bottom portions of heat sink module 115 may have no fins 117. In some embodiments, the upper finned regions of heat sink module 115 may have a greater diameter (e.g., heat-sink-module-top-diameter 901) than the none finned bottom portions of heat sink module 115 (e.g., hear or proximate to holder-side-wall-diameter 903). In some embodiments, a bottom portion of heat sink module 115 may have threading 1123. In some embodiments, threading 1123 may permit removable attachment of heat sink module 115 to optical reflector 703. In some embodiments, threading 1123 may permit removable attachment of heat sink module 115 to holder 125. In some embodiments, threading 1123 may wrap entirely around the bottom portion(s) of heat sink module 115.

Continuing discussing FIG. 11, in some embodiments, optical reflector 703 have a top (at top-hole 1131) and a bottom 1133, wherein the top may be disposed away from the bottom 1133. In some embodiments, 703 may be substantially conical in space, but without a cone's point; instead, a cone's point might reside may be replaced with top-hole 1131. In some embodiments, top-hole 1131 may permit at least some light emitted from LED light chip 701 to enter the underside (bottom) of optical reflector 703. In some embodiments, LED light chip 701 may be mounted at or proximate (near/adjacent) to top-hole 1131. In some embodiments, the underside (bottom) of optical reflector 703 may be substantially reflective and/or shiny, to facilitate reflecting at least some light out through bottom 1133, which may be substantially open. In some embodiments, optical reflector 703 may help to reflect, direct, distribute, and/or spread out at least some emitted light from LED light chip 701.

Continuing discussing FIG. 11, in some embodiments, a top 1141 of the substantially cylindrically shaped and hollow holder 125 may be shown. At least some interior surfaces of holder 125 may be seen in FIG. 11. In some embodiments, at least some portions of the interior surfaces of holder 125 may comprise internal-threading 1143. In some embodiments, 1143 may be complimentary to threading 1123 of heat sink module 115. In some embodiments, heat sink module 115 may be removably attached to holder 125. In some embodiments, threading 1123 of heat sink module 115 may be removably and complimentary threaded onto internal-threading 1143 of holder 125. In some embodiments, threading 1123 of heat sink module 115 may removably and complimentary thread onto thread lock notches 129 of holder 125. In some embodiments, holder 125 may have an upper opening at top 1141 with a (fixed and/or finite) diameter dimension selected from a range of one-half (0.5) inch to two and one-half (2.5) inches; wherein this upper opening may be in communication with at least some portion of heat sink module 115. In some embodiments, this diameter (of the upper opening at top 1141) may be selected from a range from one and one-half (1.5) inches to two and one-quarter (2.25) inches. In some embodiments, upper opening at top 1141 may be at least mostly/substantially circular.

In some embodiments, a given integrated-lighting-module 100 may comprise: a driver cap 101, a heat sink module 115, a LED light chip 701, an optical reflector 703, and a holder 125. See e.g., FIG. 11, FIG. 1, and/or FIG. 15.

In some embodiments, driver cap 101 may have first side walls 103, a first top 105 that caps the first side walls 103, and may be open at a first bottom 111. In some embodiments, first side walls 103 and first top 105 may substantially surround a first volume of driver cap 101, wherein the first volume may be configured to receive a driver. This first volume of driver cap 101 may be located beneath first top 105 and within first side walls 103. The driver may power LED light chip 701. See e.g., FIG. 11 and FIG. 1.

In some embodiments, heat sink module 115 may be finned on an upper portion for heat dissipation and heat sink module 115 may be non-finned on a bottom portion. In some embodiments, the upper portion of heat sink module 115 may have a larger diameter than the bottom portion of heat sink module 115. In some embodiments, the bottom portion of heat sink module 115 may curve and transition into the upper portion of heat sink module 115. In some embodiments, first bottom 111 of driver cap 101 may be attachable to a second top 1115, wherein second top 1115 may be top 1115 of heat sink module 115. See e.g., FIG. 11 and FIG. 1.

In some embodiments, the upper portion of heat sink module 115 may be finned with at least two fins 117. In some embodiments, at least two fins 117 may be substantially parallel and run substantially linearly across second top 1115 of heat sink module 115. In some embodiments, second top 1115 of heat sink module 115 may comprise at least one aperture (such as, but not limited to, aperture 1117, aperture 1119, and/or aperture 1121). In some embodiments, the at least one aperture (such as, but not limited to, aperture 1117, aperture 1119, and/or aperture 1121) may interrupt at least one fin 117 of heat sink module 115. In some embodiments, the bottom portion of heat sink module 115 may comprise threading 1123 for removable attachment to holder 125. See e.g., FIG. 11.

In some embodiments, LED light chip 701 may be configured to emit light. In some embodiments, optical reflector 703 may be substantially conical in shape for reflecting and directing at least some light from LED light chip 701 out of a second bottom 1133, wherein the second bottom 1133 is bottom 1133 of optical reflector 703. In some embodiments, LED light chip 701 may be disposed above top-hole 1131 of optical reflector 703 and within heat sink module 115, wherein top-hole 1131 may be located at a top of optical reflector 703. See e.g., FIG. 11 and FIG. 7.

In some embodiments, holder 125 may have second side-walls 127 that may substantially surround a second volume. In some embodiments, this second volume (of holder 125) may be configured to receive at least a portion of the bottom portion of heat sink module 115 (such as, but not limited a portion of heat sink module 115 with threading 1123). In some embodiments, holder 125 may be open at both a third top 1141 and at a third bottom, wherein third top 1141 is top 1141 of holder 125, wherein the third bottom is a bottom of holder 125. See e.g., FIG. 11.

In some embodiments, the third bottom of holder 125 may comprise two twist-lock-flanges 131 that may be configured for removable attachment to trim 1221, wherein each of the two twist-lock-flanges 131 is a flange. In some embodiments, the two twist-lock-flanges 131 may be separated from each other by two twist-lock-openings 135 that are breaks between the two twist-lock-flanges 131. In some embodiments, each of the two twist-lock-flanges 131 may begin with twist-lock-teeth 133, wherein the twist-lock-teeth 133 are configured to removably engage at least a portion of trim 1221. See e.g., FIG. 1, FIG. 7, FIG. 11, and FIG. 12A.

In some embodiments, second side-walls 127 of holder 125 may comprise at least one thread lock notch 129 that is a through hole passing through a portion of the second side-walls 127, wherein the at least one thread lock notch 129 is configured to receive at least one screw to secure a portion of optical reflector 703 against heat sink module 115. See e.g., FIG. 1 and FIG. 11.

In some embodiments, an interior surface of second side walls 127 of holder 125 may comprise internal-threading 1143 for removable attachment to heat sink module 115. In some embodiments, internal-threading 1143 of holder 125 may complimentary mate with threading 1123 of heat sink module 115 that is located on the bottom portion of heat sink module 115. See e.g., FIG. 11 and FIG. 1.

Figure 12A:
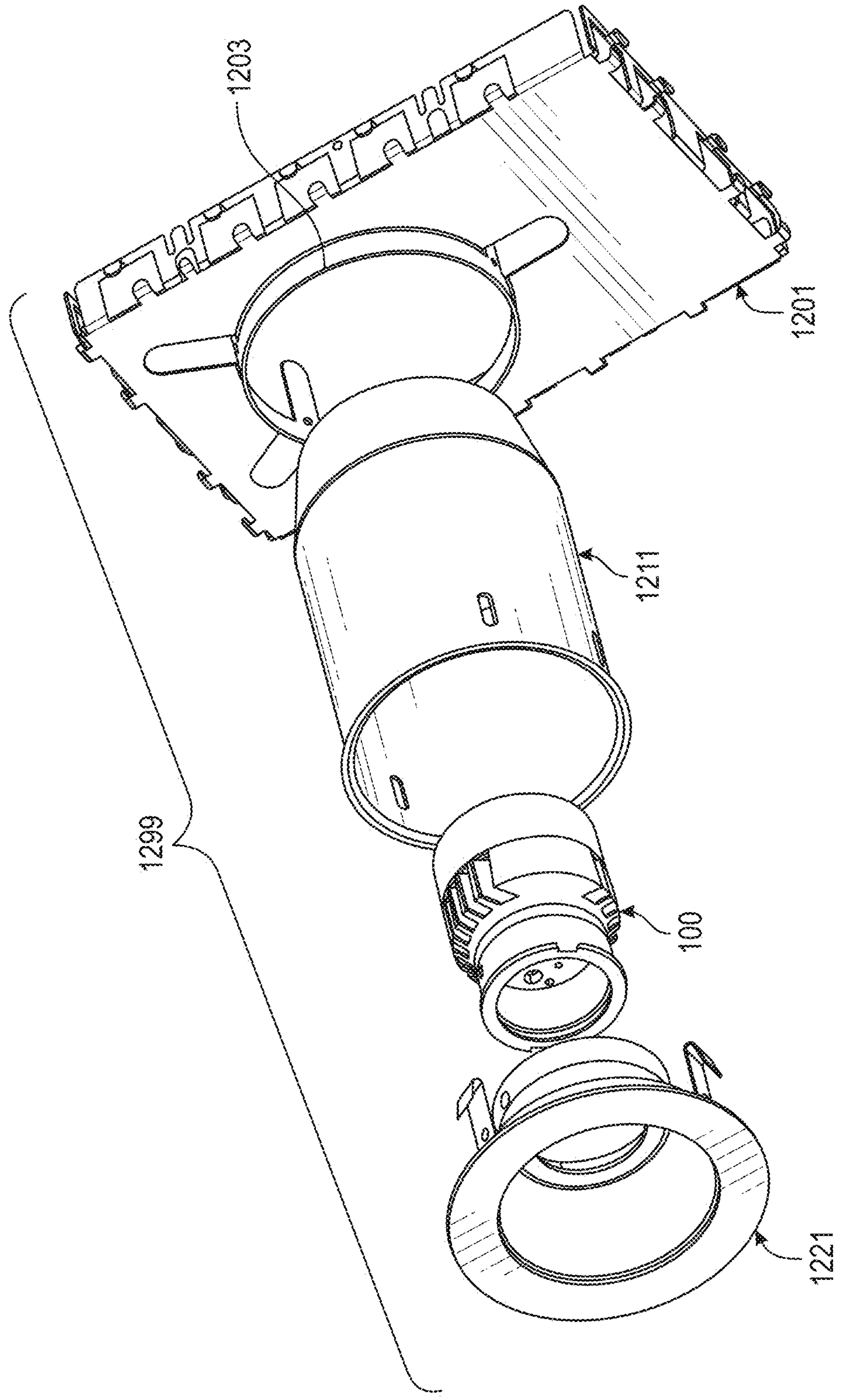
FIG. 12A illustrates an exploded bottom perspective view of the assembled integrated-lighting-module of FIG. 1 with respect to a frame, a can, and a trim.

FIG. 12A illustrates an exploded bottom perspective view of the assembled integrated-lighting-module 100 with respect to a frame 1201, a can 1211, and a trim 1221. FIG. 12A may depict an operational environment for the assembled integrated-lighting-module 100. In some embodiments, the assembled integrated-lighting-module 100 may be inserted into can 1211. In some embodiments, at least a portion of can 1211 may be fitted into a frame hole 1203, wherein the frame hole 1203 may be hole in frame 1201 for receiving at least a portion of can 1211. In some embodiments, the assembled integrated-lighting-module 100 (e.g., the twist-lock-teeth 133) may be attached (removably so in some embodiments) to trim 1221. Outer edges of the main flange of trim 1221 may cover over rough ceiling (or wall) holes. In some embodiments, trim 1221 may be of a fixed and predetermined size. In some embodiments, trim 1221 may be a "MR16" standard sized trim as that term may be used in the United States lighting industry. In some embodiments, trim 1221 may be other standard sizes. In some embodiments, FIG. 12A may show full assembly 1299 in an exploded state. In some embodiments, full assembly 1299 may comprise: frame 1201, can 1211, the assembled integrated-lighting-module 100, and trim 1221. In some embodiments, full assembly 1299 may be a lighting system.

Figure 12B:
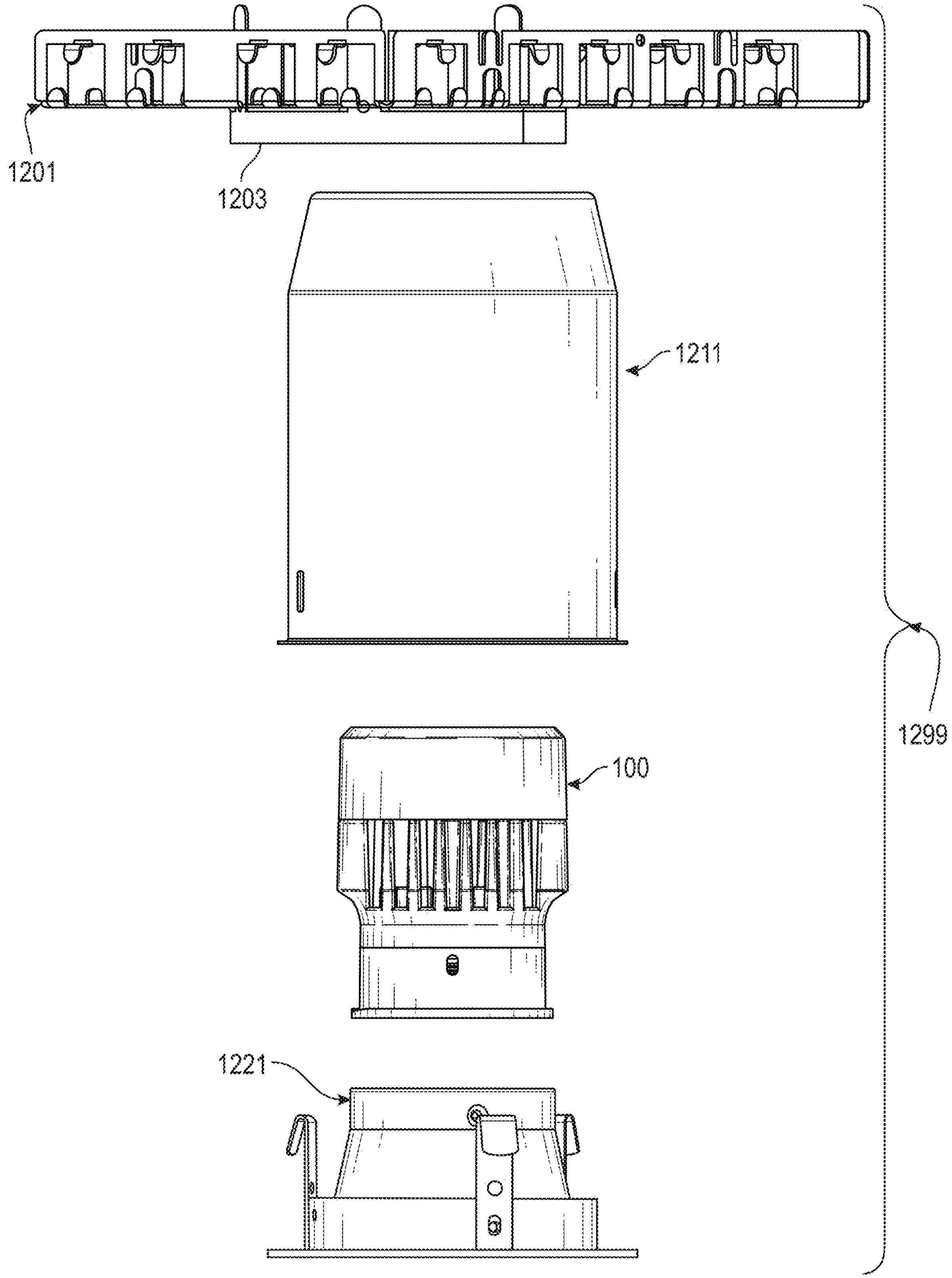
FIG. 12B illustrates an exploded side view (or rear view for view terminology of FIG. 3) of the assembled integrated-lighting-module of FIG. 1 with respect to the frame, the can, and the trim.

FIG. 12B illustrates an exploded side view (or rear view for view terminology of FIG. 3) of the assembled integrated-lighting-module 100 with respect to frame 1201, can 1211, and trim 1221. In some embodiments, FIG. 12B may show full assembly 1299 in an exploded state. As noted, in some embodiments, full assembly 1299 may comprise: frame 1201, can 1211, the assembled integrated-lighting-module 100, and trim 1221.

In some embodiments, a system for lighting may comprise at least one integrated-lighting-module 100 (e.g., assembled), and one or more of: at least one trim 1221, at least one can 1211, and/or at least one frame 1201.

In some embodiments, the invention may be characterized as a system for lighting. In some embodiments, the system may comprise integrated-lighting-module 100 and trim 1221. In some embodiments, trim 1221 may be sized as "MR16" which is a standard size of trim in the United States lighting industry. In some embodiments, trim 1221 may be other fixed and predetermined sizes. In some embodiments, the system may further comprise can 1211, wherein integrated-lighting-module 100 is received substantially within can 1211. In some embodiments, the system may further comprise frame 1201, wherein frame 1201 is configured to hold can 1211; wherein can 1211 is configured to hold the integrated-lighting-module 100. See e.g., FIG. 12A or FIG. 12B.

Figure 13A:
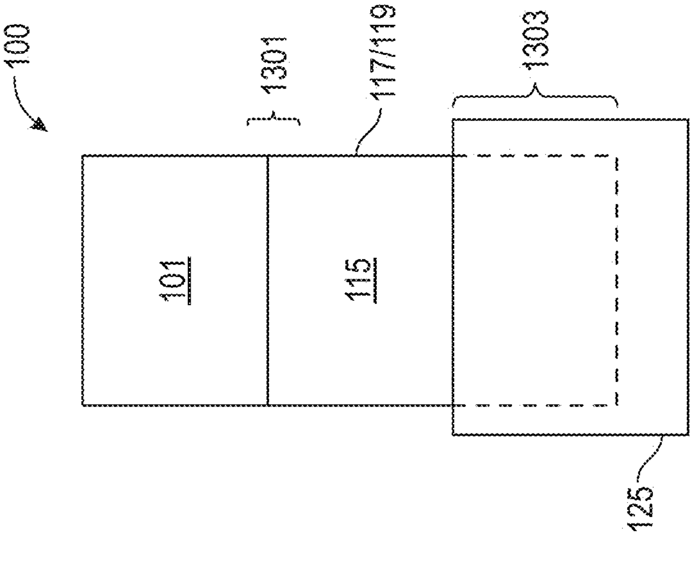
FIG. 13A may depict a schematic block diagram of a side view of an integrated-lighting-module with a focus on how a driver cap mates with (attaches to) a heat sink module; and how the heat sink module mates with (attaches to) a holder (optical reflector holder).
Figure 13B:
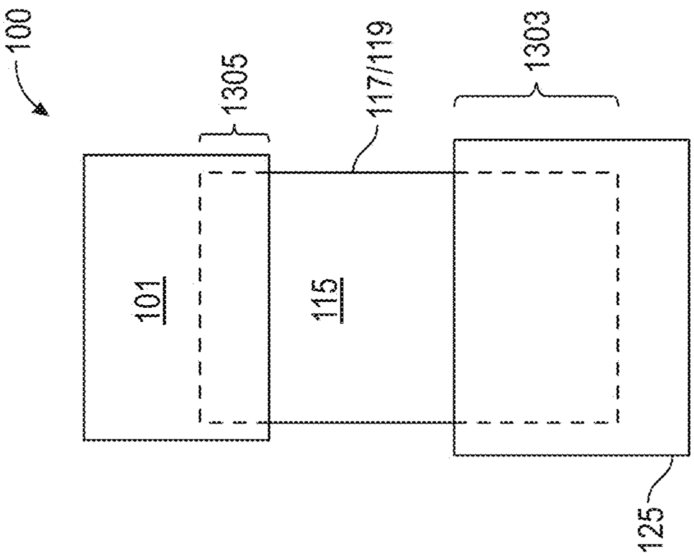
FIG. 13B may depict a schematic block diagram of a side view of an integrated-lighting-module with a focus on how a driver cap mates with (attaches to) a heat sink module; and how the heat sink module mates with (attaches to) a holder (optical reflector holder).
Figure 13C:
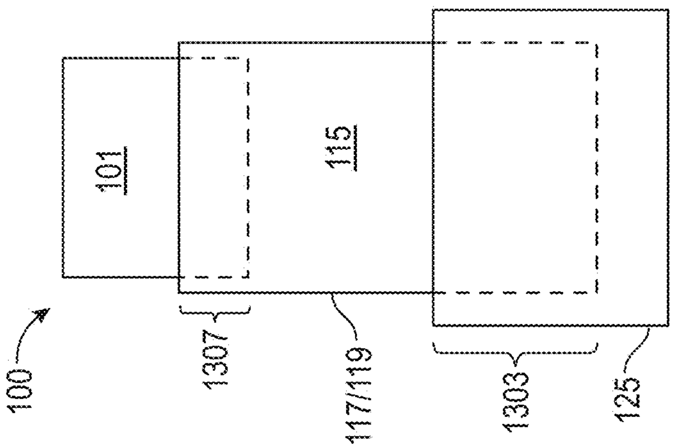
FIG. 13C may depict a schematic block diagram of a side view of an integrated-lighting-module with a focus on how a driver cap mates with (attaches to) a heat sink module; and how the heat sink module mates with (attaches to) a holder (optical reflector holder).
Figure 13D:
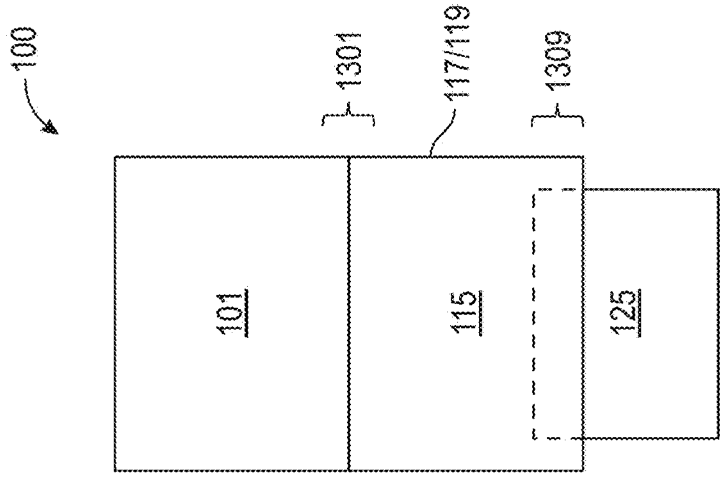
FIG. 13D may depict a schematic block diagram of a side view of an integrated-lighting-module with a focus on how a driver cap mates with (attaches to) a heat sink module; and how the heat sink module mates with (attaches to) a holder (optical reflector holder).
Figure 13E:
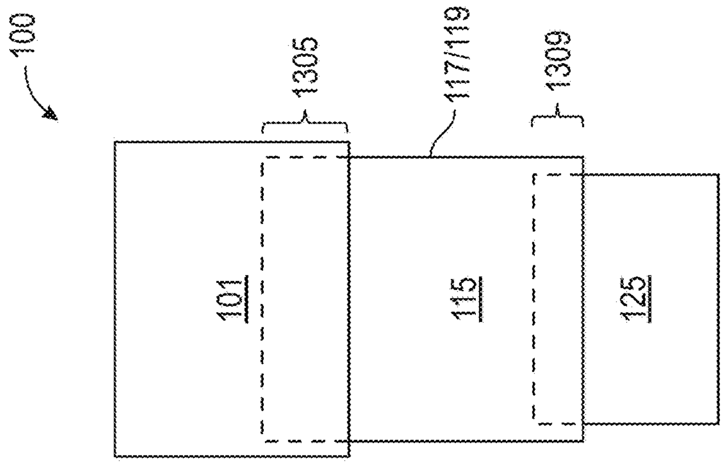
FIG. 13E may depict a schematic block diagram of a side view of an integrated-lighting-module with a focus on how a driver cap mates with (attaches to) a heat sink module; and how the heat sink module mates with (attaches to) a holder (optical reflector holder).
Figure 13F:
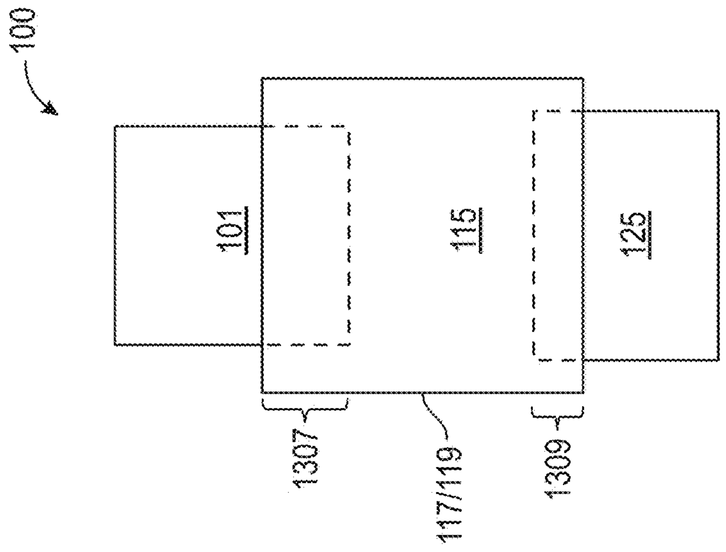
FIG. 13F may depict a schematic block diagram of a side view of an integrated-lighting-module with a focus on how a driver cap mates with (attaches to) a heat sink module; and how the heat sink module mates with (attaches to) a holder (optical reflector holder).
Figure 13G:
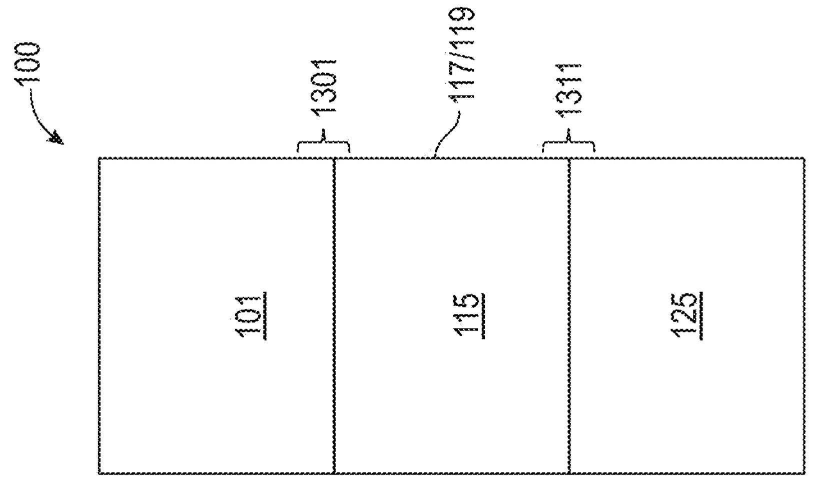
FIG. 13G may depict a schematic block diagram of a side view of an integrated-lighting-module with a focus on how a driver cap mates with (attaches to) a heat sink module; and how the heat sink module mates with (attaches to) a holder (optical reflector holder).
Figure 13H:
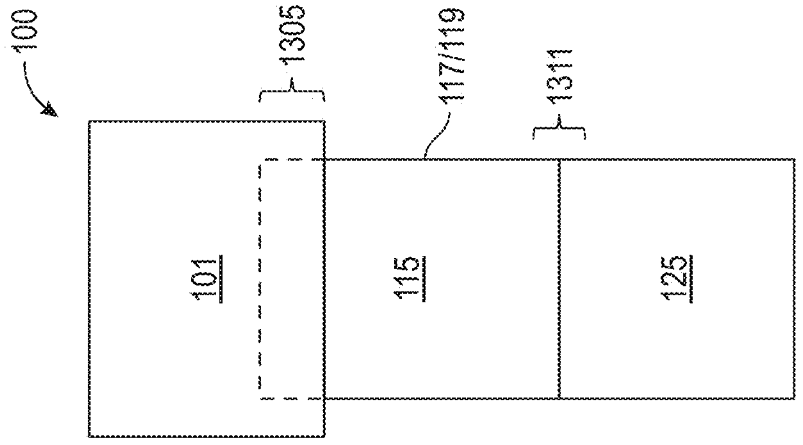
FIG. 13H may depict a schematic block diagram of a side view of an integrated-lighting-module with a focus on how a driver cap mates with (attaches to) a heat sink module; and how the heat sink module mates with (attaches to) a holder (optical reflector holder).
Figure 13I:
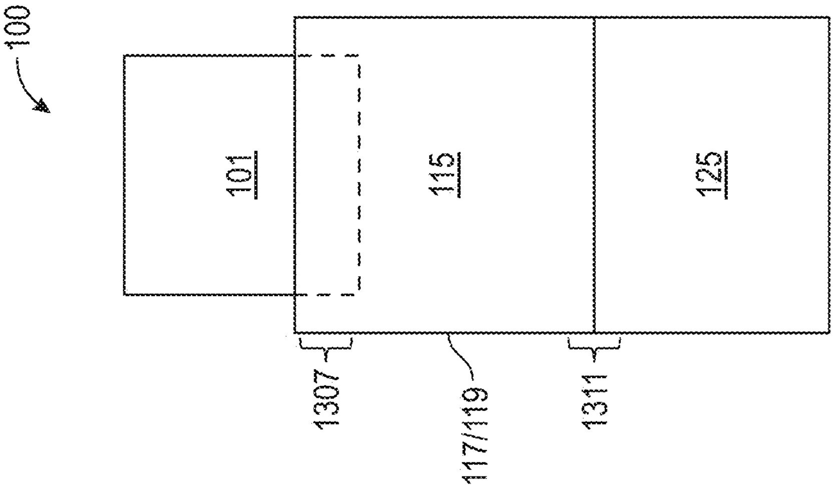
FIG. 13I may depict a schematic block diagram of a side view of an integrated-lighting-module with a focus on how a driver cap mates with (attaches to) a heat sink module; and how the heat sink module mates with (attaches to) a holder (optical reflector holder).

FIG. 13A through and including FIG. 13I may depict schematic block diagrams of side views of integrated-lighting-module 100 with a focus on how driver cap 101 mates with (attaches to) heat sink module 115; and how heat sink module 115 mates with (attaches to) holder 125. Because of this focus, some details of integrated-lighting-module 100 may be omitted in FIG. 13A through and including FIG. 13I, such as, but not limited to, heat sink module 115 fins and/or holder 125 external annular flange 131.

Note, broken lines (dashed lines) in FIG. 13A through FIG. 13I may indicate portions of a component/part that may reside within another/different component/part of a given (assembled) integrated-lighting-module 100 embodiment.

In some embodiments, an actual shape and/or a detailed shape of driver cap 101, heat sink module 115, and/or of holder 125 from FIG. 13A through and including FIG. 13I may be substantially as shown in FIG. 1 through and including FIG. 11.

Figure 16C:
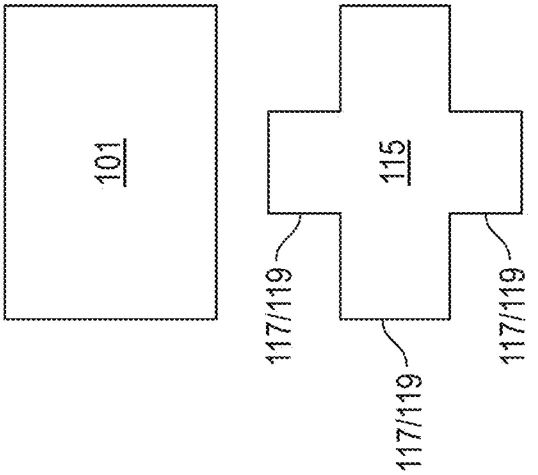
FIG. 16C may depict a schematic block diagram of a side view of a driver cap and of a heat sink module; wherein an overall shapes relationship between the given driver cap and its associated heat sink module is shown.
Figure 16B:
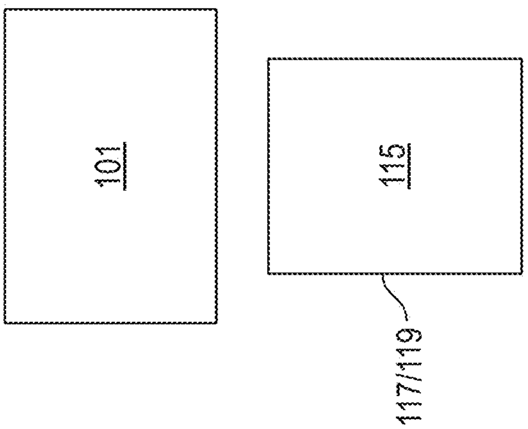
FIG. 16B may depict a schematic block diagram of a side view of a driver cap and of a heat sink module; wherein an overall shapes relationship between the given driver cap and its associated heat sink module is shown.
Figure 16A:
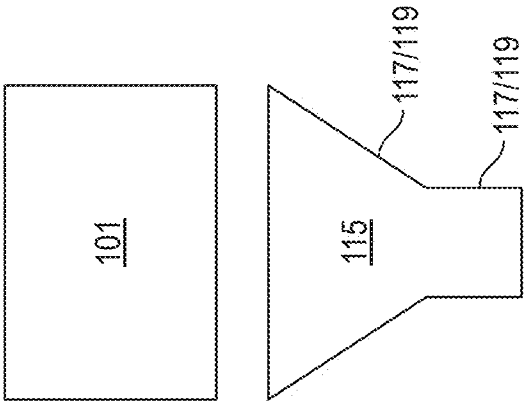
FIG. 16A may depict a schematic block diagram of a side view of a driver cap and of a heat sink module; wherein an overall shapes relationship between the given driver cap and its associated heat sink module is shown.

In some embodiments, an actual shape and/or a detailed shape of driver cap 101, heat sink module 115, and/or of holder 125 from FIG. 13A through and including FIG. 13I may be substantially as shown in FIG. 16A through and including FIG. 16C.

FIG. 13A may show an integrated-lighting-module 100 embodiment with both communication-region-between-driver-cap-and-heat-sink-module 1301 and communication-region-between-heat-sink-module-and-holder 1303. FIG. 13A may show communication-region-between-driver-cap-and-heat-sink-module 1301, which may be a region between driver cap 101 and that of heat sink module 115 where driver cap 101 and heat sink module 115 may be in (physical) communication with each other. In some embodiments, communication-region-between-driver-cap-and-heat-sink-module 1301 may be a region between driver cap 101 and that of heat sink module 115 where driver cap 101 and heat sink module 115 may be (physically) attached to each other. In some embodiments, communication-region-between-driver-cap-and-heat-sink-module 1301 may show that an outside diameter of a bottom region of driver cap 101 and an outside diameter of a top region of heat sink module 115 may be substantially similar (the same) with each other.

FIG. 13A may show communication-region-between-heat-sink-module-and-holder 1303, which may be a region between heat sink module 115 and that of holder 125 where heat sink module 115 and holder 125 may be in (physical) communication with each other. In some embodiments, communication-region-between-heat-sink-module-and-holder 1303 may be a region between heat sink module 115 and that of holder 125 where heat sink module 115 and holder 125 may be (physically) attached to each other. In some embodiments, communication-region-between-heat-sink-module-and-holder 1303 may show that an outside diameter of a bottom region of heat sink module 115 fits within an inside diameter of a top region of holder 125.

FIG. 13B may show an integrated-lighting-module 100 embodiment with both communication-region-between-driver-cap-and-heat-sink-module 1305 and communication-region-between-heat-sink-module-and-holder 1303. FIG. 13B may show communication-region-between-driver-cap-and-heat-sink-module 1305, which may be a region between driver cap 101 and that of heat sink module 115 where driver cap 101 and heat sink module 115 may be in (physical) communication with each other. In some embodiments, communication-region-between-driver-cap-and-heat-sink-module 1305 may be a region between driver cap 101 and that of heat sink module 115 where driver cap 101 and heat sink module 115 may be (physically) attached to each other. In some embodiments, communication-region-between-driver-cap-and-heat-sink-module 1305 may show that an outside diameter of a top region of heat sink module 115 fits within an inside diameter of a bottom region of driver cap 101. FIG. 13B may also show communication-region-between-heat-sink-module-and-holder 1303, which may be as shown and described in FIG. 13A.

FIG. 13C may show an integrated-lighting-module 100 embodiment with both communication-region-between-driver-cap-and-heat-sink-module 1307 and communication-region-between-heat-sink-module-and-holder 1303. FIG. 13C may show communication-region-between-driver-cap-and-heat-sink-module 1307, which may be a region between driver cap 101 and that of heat sink module 115 where driver cap 101 and heat sink module 115 may be in (physical) communication with each other. In some embodiments, communication-region-between-driver-cap-and-heat-sink-module 1307 may be a region between driver cap 101 and that of heat sink module 115 where driver cap 101 and heat sink module 115 may be (physically) attached to each other. In some embodiments, communication-region-between-driver-cap-and-heat-sink-module 1307 may show that an outside diameter of a bottom region of driver cap 101 fits within an inside diameter of a top region of heat sink module 115. FIG. 13C may also show communication-region-between-heat-sink-module-and-holder 1303, which may be as shown and described in FIG. 13A.

FIG. 13D may show an integrated-lighting-module 100 embodiment with both communication-region-between-driver-cap-and-heat-sink-module 1301 and communication-region-between-heat-sink-module-and-holder 1309. FIG. 13D may show communication-region-between-heat-sink-module-and-holder 1309, which may be a region between heat sink module 115 and that of holder 125 where heat sink module 115 and holder 125 may be in (physical) communication with each other. In some embodiments, communication-region-between-heat-sink-module-and-holder 1309 may be a region between heat sink module 115 and that of holder 125 where heat sink module 115 and holder 125 may be (physically) attached to each other. In some embodiments, communication-region-between-heat-sink-module-and-holder 1309 may show that an outside diameter of a top region of holder 125 fits within an inside diameter of a bottom region of heat sink module 115. FIG. 13D may also show communication-region-between-driver-cap-and-heat-sink-module 1301, which may be as shown and described in FIG. 13A.

FIG. 13E may show an integrated-lighting-module 100 embodiment with both communication-region-between-driver-cap-and-heat-sink-module 1305 (e.g., as shown and discussed for FIG. 13B) and with communication-region-between-heat-sink-module-and-holder 1309 (e.g., as shown and discussed for FIG. 13D).

FIG. 13F may show an integrated-lighting-module 100 embodiment with both communication-region-between-driver-cap-and-heat-sink-module 1307 (e.g., as shown and discussed for FIG. 13C) and with communication-region-between-heat-sink-module-and-holder 1309 (e.g., as shown and discussed for FIG. 13D).

FIG. 13G may show an integrated-lighting-module 100 embodiment with both communication-region-between-driver-cap-and-heat-sink-module 1301 and communication-region-between-heat-sink-module-and-holder 1311. FIG. 13G may show communication-region-between-heat-sink-module-and-holder 1311, which may be a region between heat sink module 115 and that of holder 125 where heat sink module 115 and heat sink module 115 may be in (physical) communication with each other. In some embodiments, communication-region-between-heat-sink-module-and-holder 1311 may be a region between heat sink module 115 and that of holder 125 where heat sink module 115 and holder 125 may be (physically) attached to each other. In some embodiments, communication-region-between-heat-sink-module-and-holder 1311 may show that an outside diameter of a bottom region of heat sink module 115 and an outside diameter of a top region of holder 125 may be substantially similar (the same) with each other. FIG. 13G may also show communication-region-between-driver-cap-and-heat-sink-module 1301, which may be as shown and described in FIG. 13A.

FIG. 13H may show an integrated-lighting-module 100 embodiment with both communication-region-between-driver-cap-and-heat-sink-module 1305 (e.g., as shown and discussed for FIG. 13B) and with communication-region-between-heat-sink-module-and-holder 1311 (e.g., as shown and discussed for FIG. 13G).

FIG. 13I may show an integrated-lighting-module 100 embodiment with both communication-region-between-driver-cap-and-heat-sink-module 1307 (e.g., as shown and discussed for FIG. 13C) and with communication-region-between-heat-sink-module-and-holder 1311 (e.g., as shown and discussed for FIG. 13G).

In some embodiments, a largest outside diameter of a given integrated-lighting-module 100, may be from a portion/region of one or more of: driver cap 101, heat sink module 115, and/or holder 125. See e.g., FIG. 13A through and including FIG. 13I.

In some embodiments, a smallest outside diameter of a given integrated-lighting-module 100, may be from a portion/region of one or more of: driver cap 101, heat sink module 115, and/or holder 125. See e.g., FIG. 13A through and including FIG. 13I.

In some embodiments, in communication-region-between-heat-sink-module-and-holder 1303, at least some portion of the bottom region of heat sink module 115 may have outside threading 1123; and at least some portion of the top region of holder 125 may have inside threading 1143. In some embodiments, threadings 1123 and 1143 may be complimentary and/or removably attach to each other. See e.g., FIG. 13A to FIG. 13C, FIG. 11, and FIG. 15.

In some embodiments, in communication-region-between-driver-cap-and-heat-sink-module 1305, at least some portion of the top region of heat sink module 115 may have outside threading; and at least some portion of the bottom region of driver cap 101 may have inside threading. In some embodiments, these threadings may be complimentary and/or removably attach to each other. See e.g., FIG. 13B, FIG. 13E, and/or FIG. 13H.

In some embodiments, in communication-region-between-driver-cap-and-heat-sink-module 1307, at least some portion of the bottom region of driver cap 101 may have outside threading; and at least some portion of the top region of heat sink module 115 may have inside threading. In some embodiments, these two threadings may be complimentary and/or removably attach to each other. See e.g., FIG. 13C, FIG. 13F, and/or FIG. 13I.

In some embodiments, in communication-region-between-heat-sink-module-and-holder 1309, at least some portion of the top region of holder 125 may have outside threading; and at least some portion of the bottom region of heat sink module 115 may have inside threading. In some embodiments, these threadings may be complimentary and/or removably attach to each other. See e.g., FIG. 13D to FIG. 13F.

In some embodiments, the outside diameters and/or the inside diameters of regions 1301 to 1311 may be selected from a range of one-half (0.5) inch to two and a half (2.5) inches. In some embodiments, the outside diameters and/or the inside diameters of regions 1301 to 1311 may be selected from a range of one and one quarter (1.25) inch to one and three quarter (1.75) inches. In some embodiments, the outside diameters and/or the inside diameters of regions 1301 to 1311 may be selected from a range of one and one-half (1.50) inches to two and one-quarter (2.25) inches. In some embodiments, a given diameter itself may be finite and fixed (non-variable).

In some embodiments, the physical communication and/or the attachment between a bottom region of driver cap 101 and a top region of heat sink module 115 may be selected from one or more of: a mating threaded connection; a snap fit; a press fit; an interference fit; a friction fit; a tongue and groove connection; an alternating tab/tooth-and-gap connection; a mechanical fastener; a clip; a screw; a bolt; a rivet; a nail; a tack; a staple; a brad; a pin; a rod; a linkage; a chain; a hinge; a weld; a heat weld; a tack weld; an ultrasonic weld; a solvent bond; adhesive; glue; epoxy; Velcro (or Velcro like); tape; portions thereof; combinations thereof; and/or the like.

In some embodiments, the physical communication and/or the attachment between a bottom region of heat sink module 115 and a top region of holder 125 may be selected from one or more of: a mating threaded connection; a snap fit; a press fit; an interference fit; a friction fit; a tongue and groove connection; an alternating tab/tooth-and-gap connection; a mechanical fastener; a clip; a screw; a nail; a tack; a staple; a brad; a pin; a rod; a weld; a heat weld; a tack weld; an ultrasonic weld; a solvent bond; adhesive; glue; epoxy; Velcro (or Velcro like); portions thereof; combinations thereof; and/or the like.

In some embodiments, the regions of communications between components/parts associated with reference numerals 1301, 1303, 1305, 1307, 1309, and/or 1311 may be selected from one or more of: a mating threaded connection; a snap fit; a press fit; an interference fit; a friction fit; a tongue and groove connection; an alternating tab/tooth-and-gap connection; a mechanical fastener; a clip; a screw; a nail; a tack; a staple; a brad; a pin; a rod; a weld; a heat weld; a tack weld; an ultrasonic weld; a solvent bond; adhesive; glue; epoxy; Velcro (or Velcro like); portions thereof; combinations thereof; and/or the like.

Figure 14C:
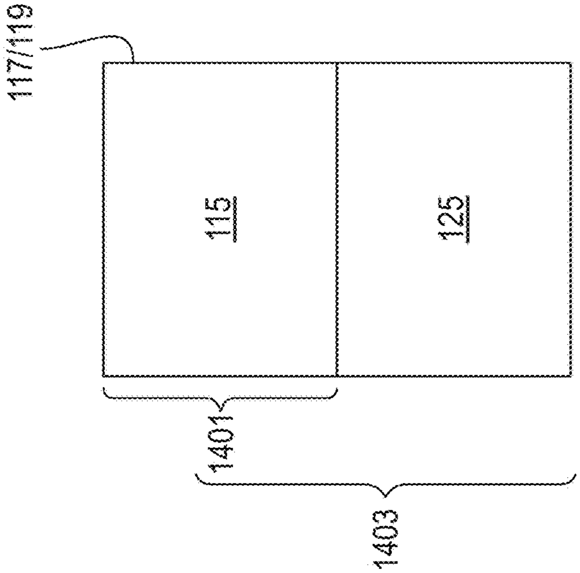
FIG. 14C may depict a schematic block diagram of a side view of a heat sink module and a holder (when assembled to each other), with a focus on where a LED light chip and/or an optical reflector may reside therein.
Figure 14B:
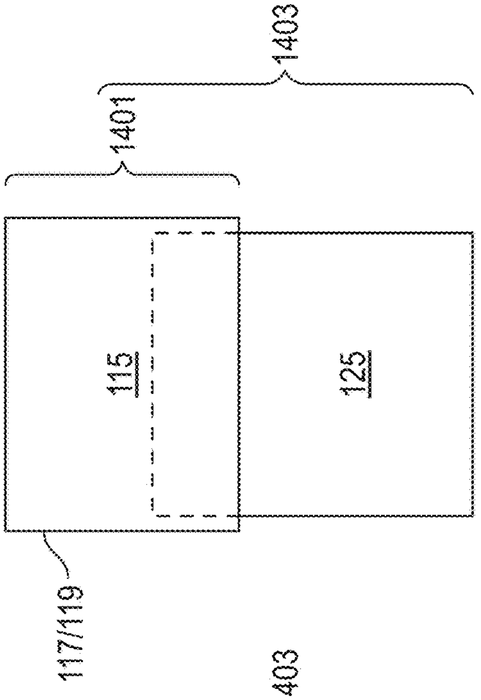
FIG. 14B may depict a schematic block diagram of a side view of a heat sink module and a holder (when assembled to each other), with a focus on where a LED light chip and/or an optical reflector may reside therein.
Figure 14A:
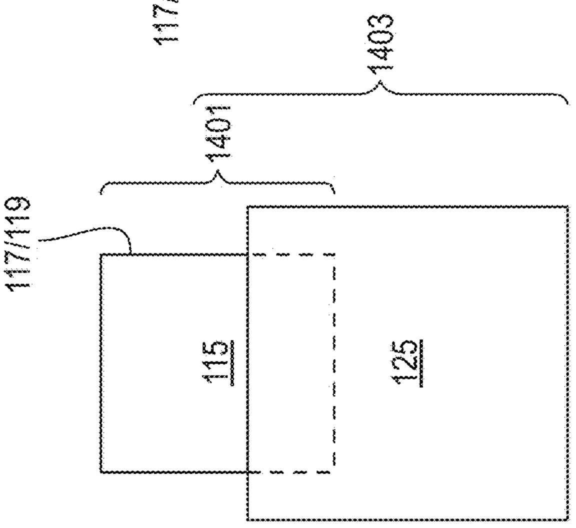
FIG. 14A may depict a schematic block diagram of a side view of a heat sink module and a holder (when assembled to each other), with a focus on where a LED light chip and/or an optical reflector may reside therein.

FIG. 14A through and including FIG. 14C may depict schematic block diagrams of side views of heat sink module 115 and holder 125 (when assembled to each other), with a focus on where LED light chip 701 and/or optical reflector 703 may reside therein. In some embodiments, reference numeral 1401 may be a region-for-housing LED light chip 701. In some embodiments, reference numeral 1403 may be a region-for-housing optical reflector 703. In some embodiments, region-for-housing-LED-chip 1401 may be entirely within heat sink module 115. In some embodiments, region-for-housing-LED-chip 1401 may be at least mostly below (underneath) fin(s) 117 and surrounded by sides of heat sink module 115. In some embodiments, a bottom portion of heat sink module 115 may extend into a top portion of holder 125 (see e.g., FIG. 14A and/or communication-region-between-heat-sink-module-and-holder 1303 in FIG. 13A). In some embodiments, a top portion of holder 125 may extend into a bottom portion of heat sink module 115 (see e.g., FIG. 14B and/or communication-region-between-heat-sink-module-and-holder 1309 in FIG. 13D). In some embodiments, a bottom portion of heat sink module 115 may butt up against a top portion of holder 125 (see e.g., FIG. 14C and/or communication-region-between-heat-sink-module-and-holder 1311 in FIG. 13G). In some embodiments, a bottom portion of heat sink module 115 may have an outside diameter that may be about the same as the outside diameter of a top portion of holder 125 (see e.g., FIG. 14C and/or communication-region-between-heat-sink-module-and-holder 1311 in FIG. 13G). In some embodiments, region-for-housing-reflector 1403 may be entirely within holder 125. In some embodiments, region-for-housing-reflector 1403 may be within holder 125 and within heat sink module 115. In some embodiments, region-for-housing-reflector 1403 may be mostly within holder 125 and partially within heat sink module 115. In some embodiments, region-for-housing-LED-chip 1401 may be located above region-for-housing-reflector 1403. In some embodiments, region-for-housing-reflector 1403 may be located below region-for-housing-LED-chip 1401. See e.g., FIG. 14A to FIG. 14C.

In some embodiments, when integrated-lighting-module 100 may be in its assembled configuration, LED light chip 701 (from its top or its bottom) may be located closer to a top of heat sink module 115 than to a bottom of holder 125. See e.g., FIG. 14A to FIG. 14C.

In some embodiments, when integrated-lighting-module 100 may be in its assembled configuration, a top of optical reflector 703 may be located closer to a top of heat sink module 115 than to a bottom of holder 125. See e.g., FIG. 14A to FIG. 14C.

Figure 15:
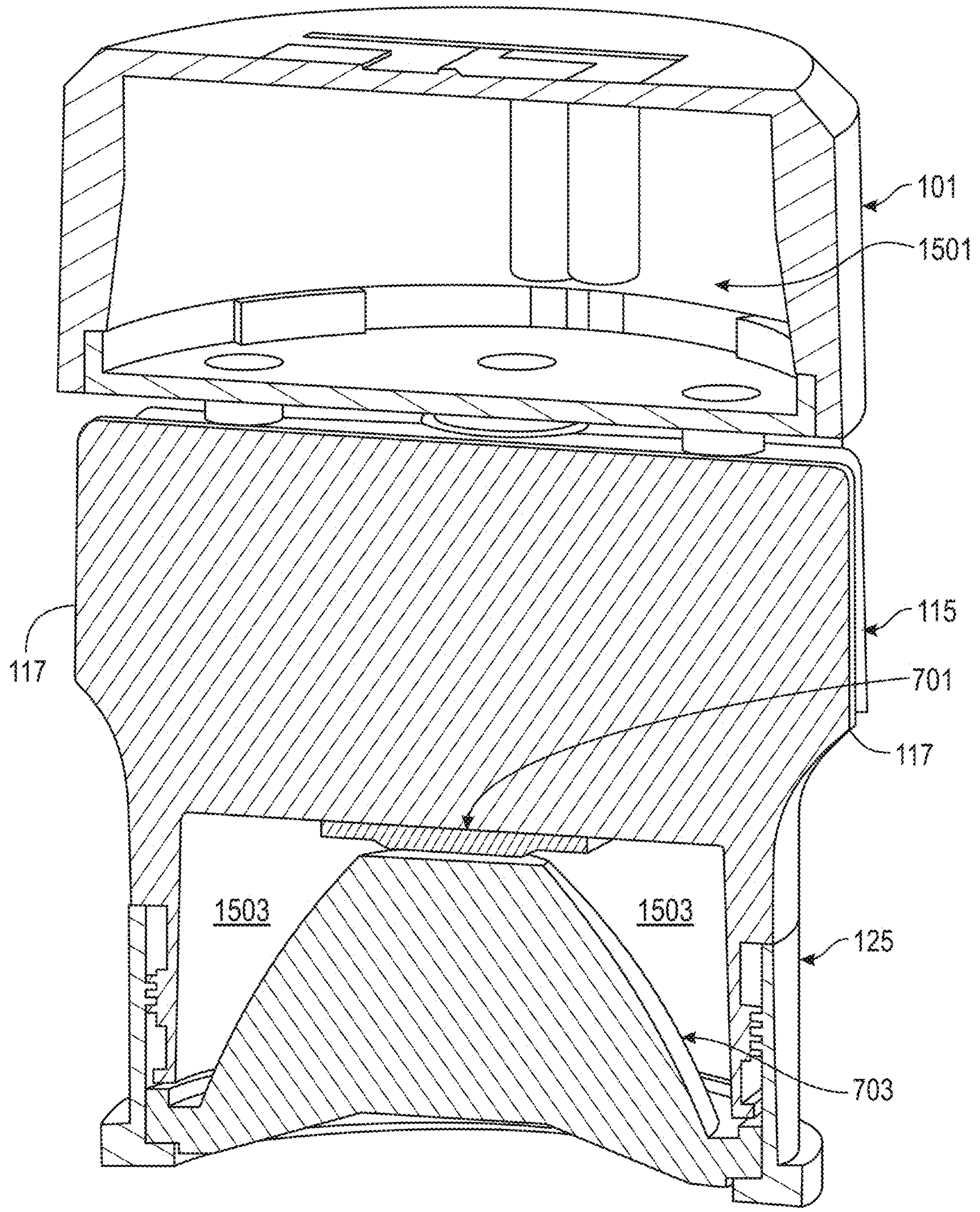
FIG. 15 may be a lengthwise (top to bottom) cross-sectional diagram through a given integrated-lighting-module.

FIG. 15 may be a lengthwise (top to bottom) cross-sectional diagram through a given integrated-lighting-module 100. In some embodiments, a plane of this cross-section of FIG. 15 may be substantially parallel with a major/main plane of a fin 117 of heat sink module 115. In some embodiments, volume 1501 may be a volume within/inside of driver cap 101. In some embodiments, volume 1501 may be configured to house and/or receive at least one (electronic) driver. For these reasons, in some embodiments, volume 1501 may be referred to a driver-volume 1501. In some embodiments, volume 1503 may be volume within/inside of a bottom region of heat sink module 115 and within/inside a top region of holder 125. In some embodiments, volume 1503 may be bounded on its top by heat sink module 115 (such as, but not limited to, fin(s) 117). In some embodiments, volume 1503 may be bounded on its sides by sides of heat sink module 115 and/or by sides of holder 125. In some embodiments, volume 1503 may be at least mostly open on its bottom (e.g., to provide for light emission/escape). In some embodiments, volume 1503 may be configured to house and/or receive at least one LED light chip 701 and/or at least one optical reflector 703. In some embodiments, volume 1503 may provide region-for-housing-LED-chip 1401 and region-for-housing-reflector 1403. In some embodiments, prior to attaching holder 125 to heat sink module 115, LED light chip 701 may be attached to a bottom interior of heat sink module 115 within volume 1503; and then optical reflector 703 may be added to (inserted) into volume 1503, below LED light chip 701; and then lastly holder 125 may be attached to heat sink module 115.

In some embodiments, (at least one) LED light chip 701 may be radially surrounded by portions of heat sink module 115. In some embodiments, (at least one) LED light chip 701 may be attached to heat sink module 115. In some embodiments, (at least one) LED light chip 701 may be attached a bottom portion of heat sink module 115. In some embodiments, (at least one) LED light chip 701 may be attached a central portion of heat sink module 115. In some embodiments, (at least one) LED light chip 701 may be attached a bottom central portion of heat sink module 115. See e.g., FIG. 15 and FIG. 11.

In some embodiments, when integrated-lighting-module 100 may be in its assembled configuration, LED light chip 701 (from its top or its bottom) may be located closer to a bottom of holder 125 than to a top of heat sink module 115. See e.g., FIG. 15.

In some embodiments, when integrated-lighting-module 100 may be in its assembled configuration, a top of optical reflector 703 may be located closer to a bottom of holder 125 than to a top of heat sink module 115. See e.g., FIG. 15.

FIG. 16A through and including FIG. 16C may depict schematic block diagrams of side views of driver caps 101 and of heat sink modules 115, with each such figure showing a single driver cap 101 paired with a single heat sink module 115; wherein these figures on showing an overall shapes relationship between a given driver cap 101 and its heat sink module 115. Because of this focus, some details of driver cap 101 and/or of heat sink module 115 may be omitted in FIG. 16A through and including FIG. 16C, such as, but not limited to, heat sink module 115 fins. Note, FIG. 16A through and including FIG. 16C also show the given driver cap 101 and its associated heat sink module 115 dissembled from each other; however, during intended use the given driver cap 101 and its associated heat sink module 115 would be attached to each other (e.g., as shown in FIG. 1, FIG. 13A to FIG. 13I, FIG. 12, and/or FIG. 15).

Discussing FIG. 16A, in some embodiments, an outside diameter of side-walls 103 of driver cap 101 may be substantially (mostly) similar (or the same) as an outside diameter of a top (upper) region of heat sink module 115 (see also region 1301 of FIG. 13A for this same/similar outside diameter configuration between driver cap 101 and heat sink module 115). In some embodiments, the outside diameter of heat sink module 115 may become smaller from the top of 115 to the bottom of 115. In some embodiments, a bottom portion of heat sink module 115 may have a smaller outside diameter than a top (upper) region of heat sink module 115 has. In some embodiments, a bottom portion of heat sink module 115 may have uniform and non-variable outside diameter (e.g., with a right cylinder shape) that may be smaller than the outside diameter of a top (upper) region of heat sink module 115. In some embodiments, heat sink module 115 may have a general shape (e.g., not necessarily including shapes of fin(s) 117) that may be at least substantially similar to a funnel and/or a conical frustum. In some embodiments, an upper portion of heat sink module 115 may have a general shape (e.g., not necessarily including shapes of fin(s) 117) that may be at least substantially similar to a funnel and/or a conical frustum; and a bottom portion of heat sink module 115 may have shape that may be at least substantially similar to a right cylinder; and the upper portion of heat sink module 115 may be attached to the bottom portion of heat sink module 115. In some embodiments, the upper portion of heat sink module 115 and the bottom portion of heat sink module 115 may be different portions of a single/same article of manufacture. In some embodiments, a transition from a largest outside diameter of heat sink module 115 to a smallest outside diameter of heat sink module 115 may be smooth, gradual, and/or linear. See e.g., FIG. 16A. (In some embodiments, a bottom of heat sink module 115 may be at least mostly open, to provide some access to volume 1503, see e.g., FIG. 15.)

Discussing FIG. 16B, in some embodiments, an outside diameter of side-walls 103 of driver cap 101 may be larger than an outside diameter of heat sink module 115 (see also region 1305 of FIG. 13B for this same/similar outside diameter configuration between driver cap 101 and heat sink module 115). In some embodiments, a transition from a larger outside diameter of driver cap 101 to a smaller outside diameter of heat sink module 115 may be abrupt as in a step from one outside diameter to another. In some embodiments, an outside diameter of heat sink module 115 may be uniform and non-variable along an overall length (height) of heat sink module 115. In some embodiments, heat sink module 115 may have a general shape (e.g., not necessarily including shapes of fin(s) 117) that may be at least substantially similar to a right cylinder. See e.g., FIG. 16B.

Discussing FIG. 16C, in some embodiments, an outside diameter of side-walls 103 of driver cap 101 may be substantially (mostly) similar (or the same) as an outside diameter of a portion of heat sink module 115 that is not closest to driver cap 101. In some embodiments, a portion of heat sink module 115 that may be closest to driver cap 101 may have an outside diameter that is smaller than the outside diameter of driver cap 101. In some embodiments, a top (upper) portion of heat sink module 115 that may be closest to driver cap 101 may have an outside diameter that is smaller than the outside diameter of driver cap 101. In some embodiments, a portion of heat sink module 115 that may be furthest from driver cap 101 may have an outside diameter that is smaller than the outside diameter of driver cap 101. In some embodiments, a bottom portion of heat sink module 115 that may be furthest from driver cap 101 may have an outside diameter that is smaller than the outside diameter of driver cap 101. In some embodiments, a middle portion of heat sink module 115 (with respect to a length/height of heat sink module 115) may have an outside diameter that is at least substantially (mostly) the same as the outside diameter of driver cap 101. In some embodiments, the top (upper) portion, the middle portion, and the bottom portion of heat sink module 115 may be all of a single integral article of manufacture. In some embodiments, a transition from a largest outside diameter of heat sink module 115 to a smallest (or smaller) outside diameter of heat sink module 115 may be abrupt as in a step from one outside diameter to another. See e.g., FIG. 16C.

Note, FIG. 17A through FIG. 17H show various shapes of heat sink modules 115, wherein these heat sink module shapes shown in FIG. 17A to FIG. 17H may be pre-existing, i.e., prior art. However, attachment and/or use of these heat sink module shapes with driver 101, holder 125, LED light chip 701, optical reflector 703, and/or a trim may be novel and non-obvious.

Figure 17A:
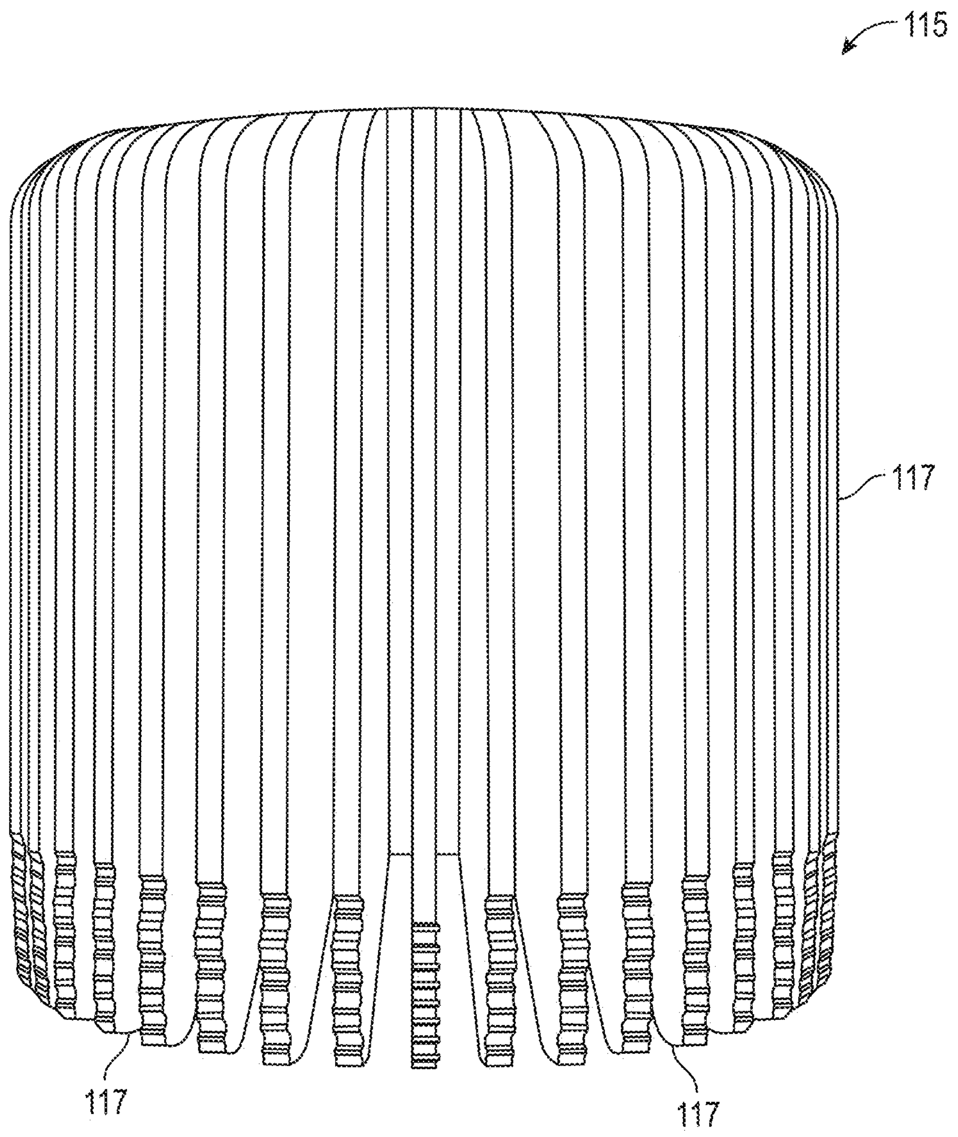
FIG. 17A (Prior Art)
FIG. 17A (prior art) shows a general side view of a heat sink module that may be substantially cylindrical in its outer shape/appearance.

FIG. 17A shows a general side view of a heat sink module 115 that may be substantially cylindrical in its outer shape/appearance. In some embodiments, substantially cylindrical heat sink module 115 may have a fixed, finite, and/or common/same outer diameter all along a length/height of substantially cylindrical heat sink module 115. In some embodiments, a top portion/region of substantially cylindrical heat sink module 115 may be configured for attachment to driver cap 101. In some embodiments, a bottom portion/region of substantially cylindrical heat sink module 115 may be configured for attachment to holder 125. In some embodiments, this substantially cylindrical heat sink module 115 may have a plurality of fins 117. In some embodiments, the plurality of fins 117 may extend radially outwards away from a common longitudinal center/axis of substantially cylindrical heat sink module 115. In some embodiments, plurality of fins 117 may run from a bottom to a top of substantially cylindrical heat sink module 115. In some embodiments, at least a portion of plurality of fins 117 may be threaded for attachment to driver cap 101. In some embodiments, at least a portion of an exterior portion of plurality of fins 117 may be threaded for attachment to holder 125. In some embodiments, a bottom interior of substantially cylindrical heat sink module 115 may be at least mostly hollow and configured for receiving LED light chip 701 and/or optical reflector 703.

Figure 17B:
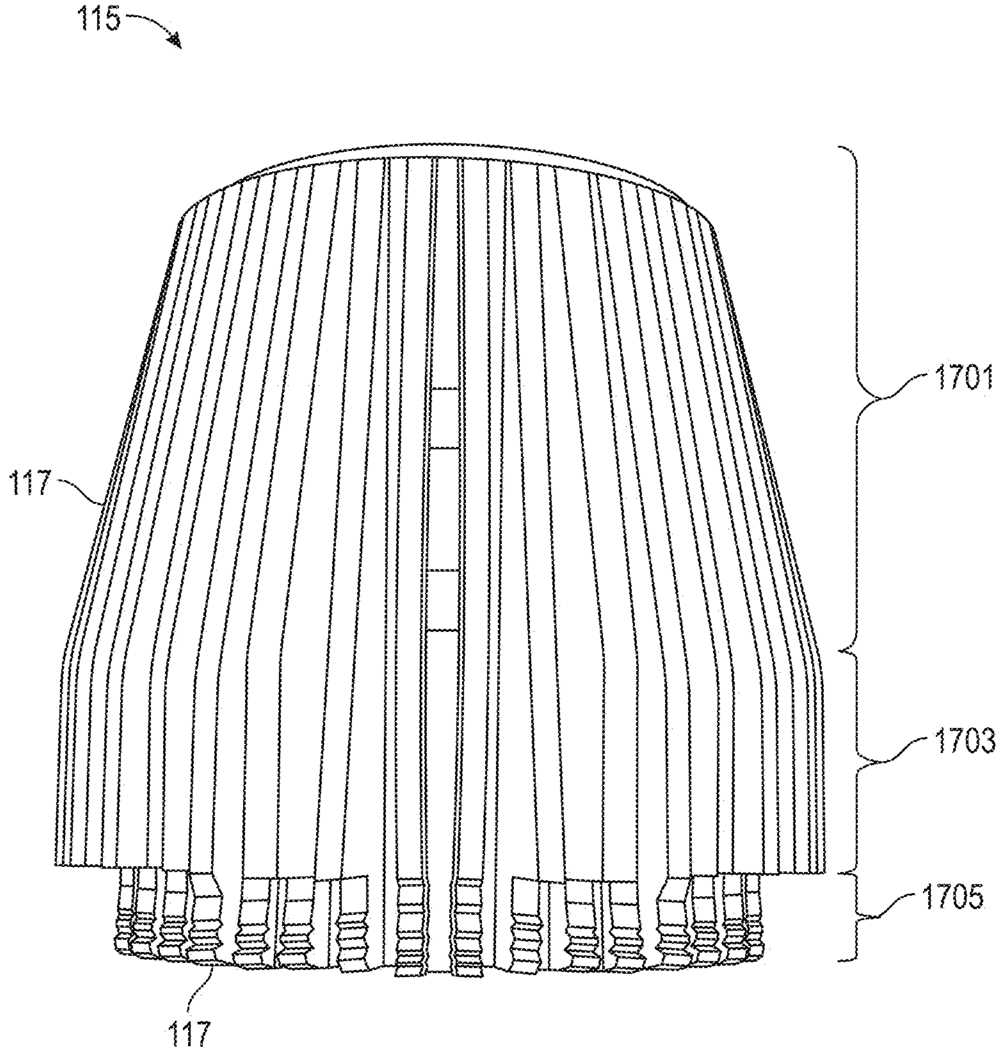
FIG. 17B (Prior Art)
FIG. 17B (prior art) shows a general side view of a heat sink module that may have a particular outer shape/appearance.

FIG. 17B shows a general side view of a heat sink module 115 that may have a particular outer shape/appearance. In some embodiments, the outer shape/appearance of heat sink module 115 may comprise three distinct regions, each of its own particular geometry, upper-region 1701, middle-region 1703, and bottom-region 1705. In some embodiments, upper-region 1701 may have an outer shape/appearance that may be substantially shaped as a conical frustrum. In some embodiments, middle-region 1703 may have an outer shape/appearance that may be substantially shaped as a right cylinder. In some embodiments, bottom-region 1705 may have an outer shape/appearance that may be substantially shaped as a conical frustrum and/or substantially shaped as a right cylinder. In some embodiments, middle-region 1703 may be disposed between upper-region 1701 and bottom-region 1705. In some embodiments, a top of middle-region 1703 may be attached/connected to a bottom of upper-region 1701. In some embodiments, a bottom of middle-region 1703 may be attached/connected to a top of bottom-region 1705. In some embodiments, upper-region 1701, middle-region 1703, and bottom-region 1705 may be integral with each other, i.e., as a single article of manufacture. In some embodiments, a widest outside diameter of heat sink module 115 may be at a bottom of upper-region 1701 and/or at middle-region 1703. In some embodiments, a smallest outside diameter of heat sink module 115 may be at a top of upper-region 1701. In some embodiments, an outside diameter of bottom-region 1705 may be less than an outside diameter of middle-region 1703. In some embodiments, a widest diameter of upper-region 1701 may be located closer to a bottom of heat sink module 115; whereas, a narrowest diameter of upper-region 1701 may be located closer to a top of heat sink module 115 (note, this may be an opposite orientation as compared to heat sink module 115 of FIG. 17D). Continuing discussing FIG. 17B, in some embodiments, with respect to an overall length/height of heat sink module 115, bottom-region 1705 may be shortest and upper-region 1701 may be longest. In some embodiments, with respect to the overall length/height of heat sink module 115, middle-region 1703 may be longer than bottom-region 1705 but shorter than upper-region 1701. In some embodiments, a transition from middle-region 1703 to bottom-region 1705 may be as a step, i.e., abrupt. In some embodiments, a transition from the larger outer diameter of middle-region 1703 to the smaller outer diameter of bottom-region 1705 may be as a step, i.e., abrupt. In some embodiments, heat sink module 115 may comprise a plurality of fins 117. In some embodiments, upper-region 1701, middle-region 1703, and/or bottom-region 1705 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of heat sink module 115. In some embodiments, at least a portion of plurality of fins 117 may be threaded for attachment to driver cap 101. In some embodiments, at least a portion of an exterior portion of plurality of fins 117 may be threaded for attachment to holder 125. In some embodiments, at least a portion of an exterior portion of plurality of fins 117 of bottom-region 1705 may be threaded for attachment to holder 125. In some embodiments, a bottom interior of heat sink module 115 may be at least mostly hollow and configured for receiving LED light chip 701 and/or optical reflector 703.

Figure 17C:
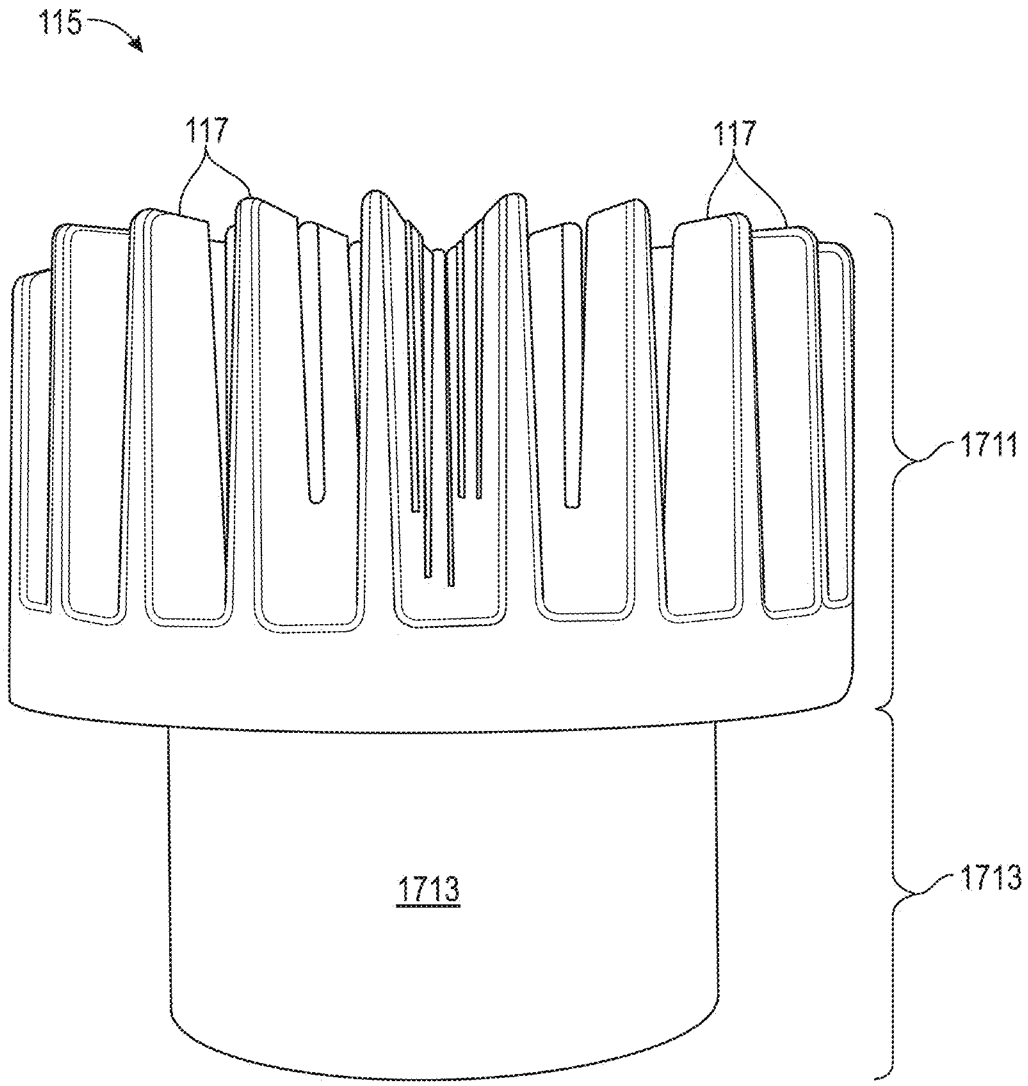
FIG. 17C (Prior Art)
FIG. 17C (prior art) shows a general side view of a heat sink module that may have a particular outer shape/appearance.

FIG. 17C shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 and lower-region 1713 may have similar heights as each other. In some embodiments, a transition from upper-region 1711 to lower-region 1713 may be as a step, i.e., abrupt. In some embodiments, a transition from the larger outer diameter of upper-region 1711 to the smaller outer diameter of lower-region 1713 may be as a step, i.e., abrupt. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Figure 17D:
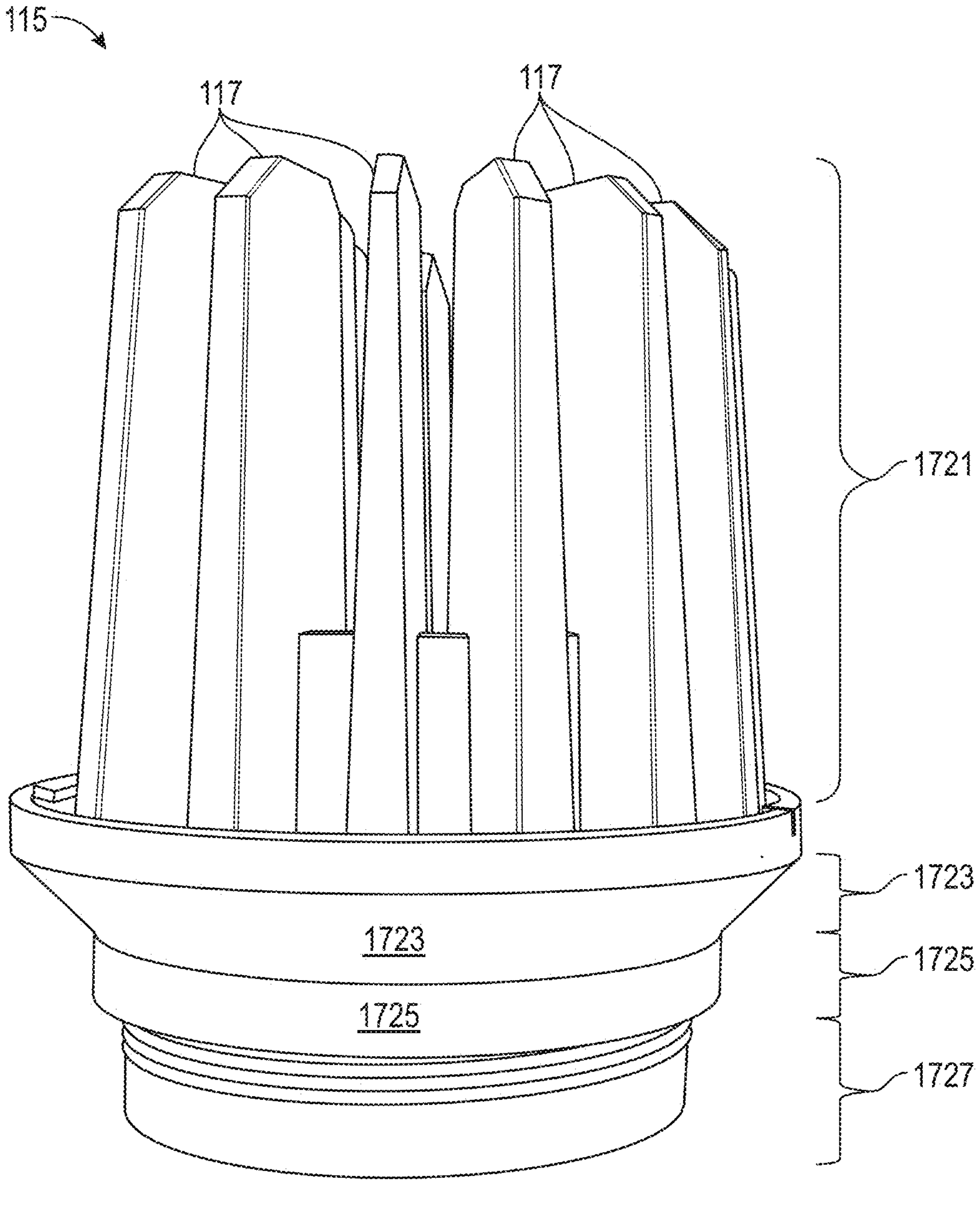
FIG. 17D (Prior Art)
FIG. 17D (prior art) shows a general side view of a heat sink module that may have a particular outer shape/appearance.

FIG. 17D shows a general side view of a heat sink module 115 that may have a particular outer shape/appearance. In some embodiments, the outer shape/appearance of heat sink module 115 may comprise three distinct regions, each of its own particular geometry, upper-finned-region 1721, conical-frustrum-region 1723, cylindrical-region 1725, and bottom-threaded-region 1727. In some embodiments, upper-finned-region 1721 may have an outer shape/appearance that may be substantially shaped as a first right cylinder (with a predetermined taper in some embodiments). In some embodiments, conical-frustrum-region 1723 may have an outer shape/appearance that may be substantially shaped as a conical frustrum. In some embodiments, cylindrical-region 1725 may have an outer shape/appearance that may be substantially shaped as a second right cylinder. In some embodiments, bottom-threaded-region 1727 may have an outer shape/appearance that may be substantially shaped as a third right cylinder. In some embodiments, conical-frustrum-region 1723 may be disposed between upper-finned-region 1721 and bottom-threaded-region 1727. In some embodiments, cylindrical-region 1725 may be disposed between upper-finned-region 1721 and bottom-threaded-region 1727. In some embodiments, conical-frustrum-region 1723 and cylindrical-region 1725 may be disposed between upper-finned-region 1721 and bottom-threaded-region 1727. In some embodiments, conical-frustrum-region 1723 may be disposed between upper-finned-region 1721 and cylindrical-region 1725. In some embodiments, cylindrical-region 1725 may be disposed between conical-frustrum-region 1723 and bottom-threaded-region 1727. In some embodiments, a top of conical-frustrum-region 1723 may be attached/connected to a bottom of upper-finned-region 1721. In some embodiments, a bottom of conical-frustrum-region 1723 may be attached/connected to a top of cylindrical-region 1725. In some embodiments, a top of cylindrical-region 1725 may be attached/connected to a bottom of conical-frustrum-region 1723. In some embodiments, a bottom of cylindrical-region 1725 may be attached/connected to a top of bottom-threaded-region 1727. In some embodiments, upper-finned-region 1721, conical-frustrum-region 1723, cylindrical-region 1725, and bottom-threaded-region 1727 may be integral with each other, i.e., as a single article of manufacture. In some embodiments, a widest outside diameter of heat sink module 115 may be at a top of conical-frustrum-region 1723. In some embodiments, a smallest outside diameter of heat sink module 115 may be at bottom-threaded-region 1727. In some embodiments, an outside diameter of bottom-threaded-region 1727 may be less than an outside diameter of cylindrical-region 1725. In some embodiments, a widest diameter of conical-frustrum-region 1723 may be located closer to a top of heat sink module 115; whereas, a narrowest diameter of conical-frustrum-region 1723 may be located closer to a bottom of heat sink module 115 (note, this may be an opposite orientation as compared to heat sink module 115 of FIG. 17B). Continuing discussing FIG. 17D, in some embodiments, with respect to an overall length/height of heat sink module 115, cylindrical-region 1725 may be shortest and upper-finned-region 1721 may be longest. In some embodiments, with respect to the overall length/height of heat sink module 115, conical-frustrum-region 1723 may be longer than cylindrical-region 1725 but shorter than upper-finned-region 1721. In some embodiments, with respect to the overall length/height of heat sink module 115, bottom-threaded-region 1727 may be longer than cylindrical-region 1725 but shorter than upper-finned-region 1721. In some embodiments, a transition from upper-finned-region 1721 to conical-frustrum-region 1723 may be as a step, i.e., abrupt. In some embodiments, a transition from a smaller outer diameter of upper-finned-region 1721 to a larger outer diameter of conical-frustrum-region 1723 may be as a step, i.e., abrupt. In some embodiments, a transition from conical-frustrum-region 1723 to cylindrical-region 1725 may not be as a step; but rather, may be smooth and seamless because an outside diameter of cylindrical-region 1725 may be substantially similar to a bottom outside diameter of conical-frustrum-region 1723. In some embodiments, a transition from cylindrical-region 1725 to bottom-threaded-region 1727 may be as a step, i.e., abrupt. In some embodiments, a transition from a larger outer diameter of cylindrical-region 1725 to a smaller outer diameter of bottom-threaded-region 1727 may be as a step, i.e., abrupt. In some embodiments, heat sink module 115 may comprise a plurality of fins 117. In some embodiments, the plurality of fins 117 may extend radially outwards away from a common longitudinal center/axis of heat sink module 115. In some embodiments, upper-finned-region 1721 may comprise at least a portion of plurality of fins 117. In some embodiments, conical-frustrum-region 1723, cylindrical-region 1725, and bottom-threaded-region 1727 may be free of (without) plurality of fins 117. In some embodiments, plurality of fins 117 may run from a bottom to a top of upper-finned-region 1721. In some embodiments, plurality of fins 117 may run from near the bottom to the top of upper-finned-region 1721. In some embodiments, at least a portion of plurality of fins 117 may be threaded for attachment to driver cap 101. In some embodiments, at least a portion of an exterior portion of bottom-threaded-region 1727 may be threaded for attachment to holder 125. In some embodiments, a bottom interior of heat sink module 115 may be at least mostly hollow and configured for receiving LED light chip 701 and/or optical reflector 703.

Figure 17E:
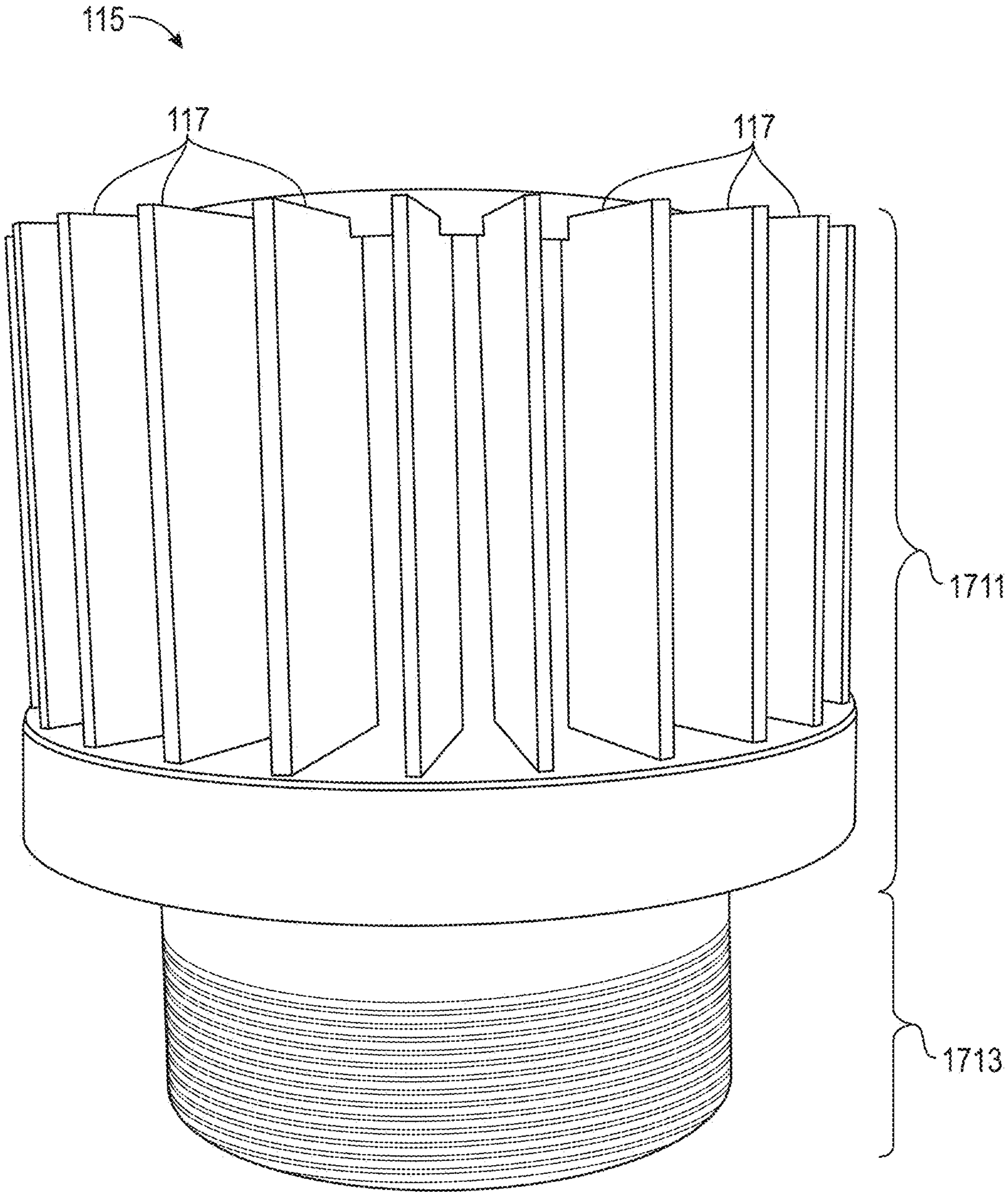
FIG. 17E (Prior Art)
FIG. 17E (prior art) shows a general side view of a heat sink module that may have a particular outer shape/appearance.

FIG. 17E shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 may be taller/longer than lower-region 1713. In some embodiments, a transition from upper-region 1711 to lower-region 1713 may be as a step, i.e., abrupt. In some embodiments, a transition from the larger outer diameter of upper-region 1711 to the smaller outer diameter of lower-region 1713 may be as a step, i.e., abrupt. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, plurality of fins 117 may run from near the bottom to the top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Figure 17F:
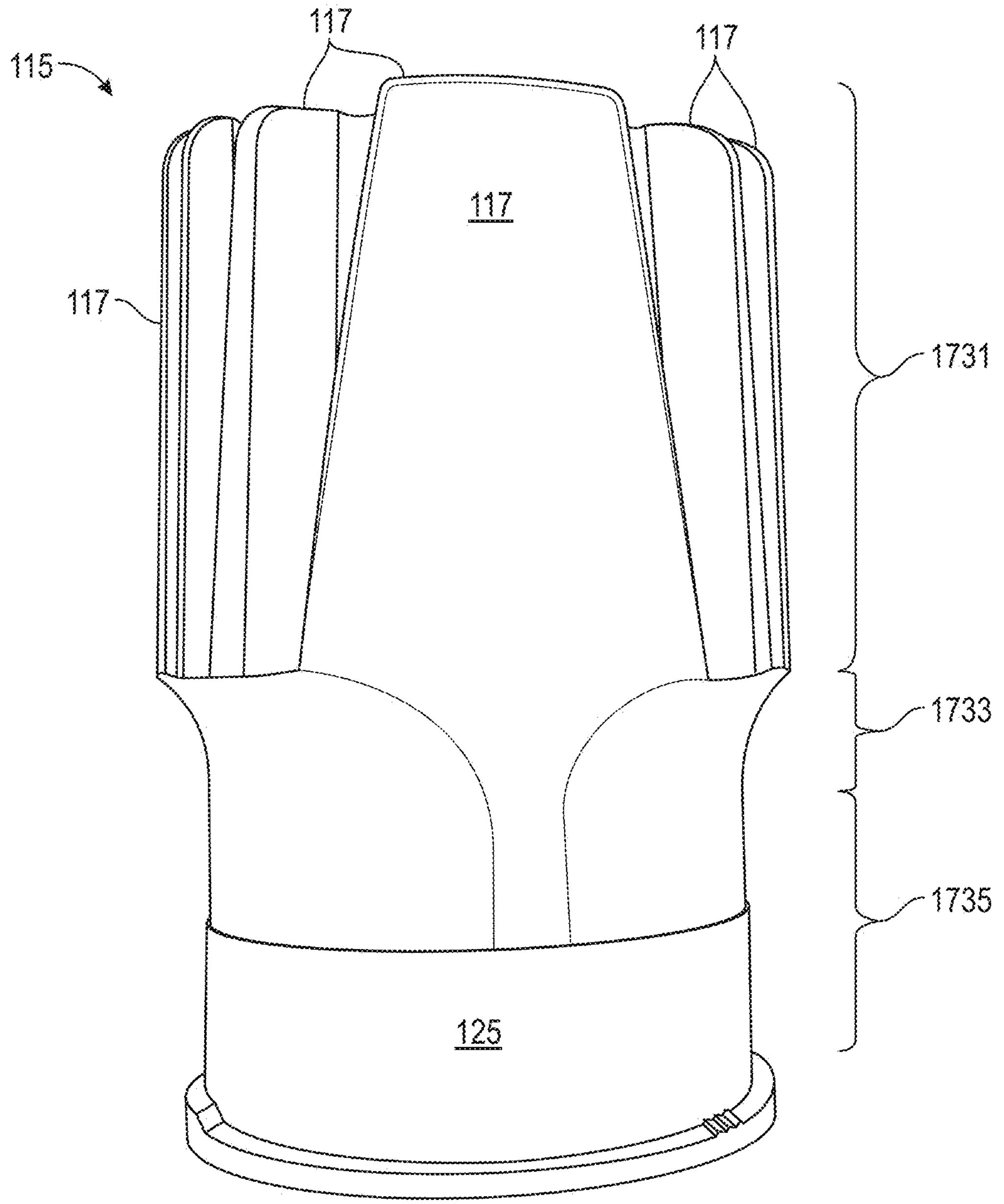
FIG. 17F (Prior Art)
FIG. 17F (prior art) shows a general side view of a heat sink module that may have a particular outer shape/appearance.
Figure 17G:
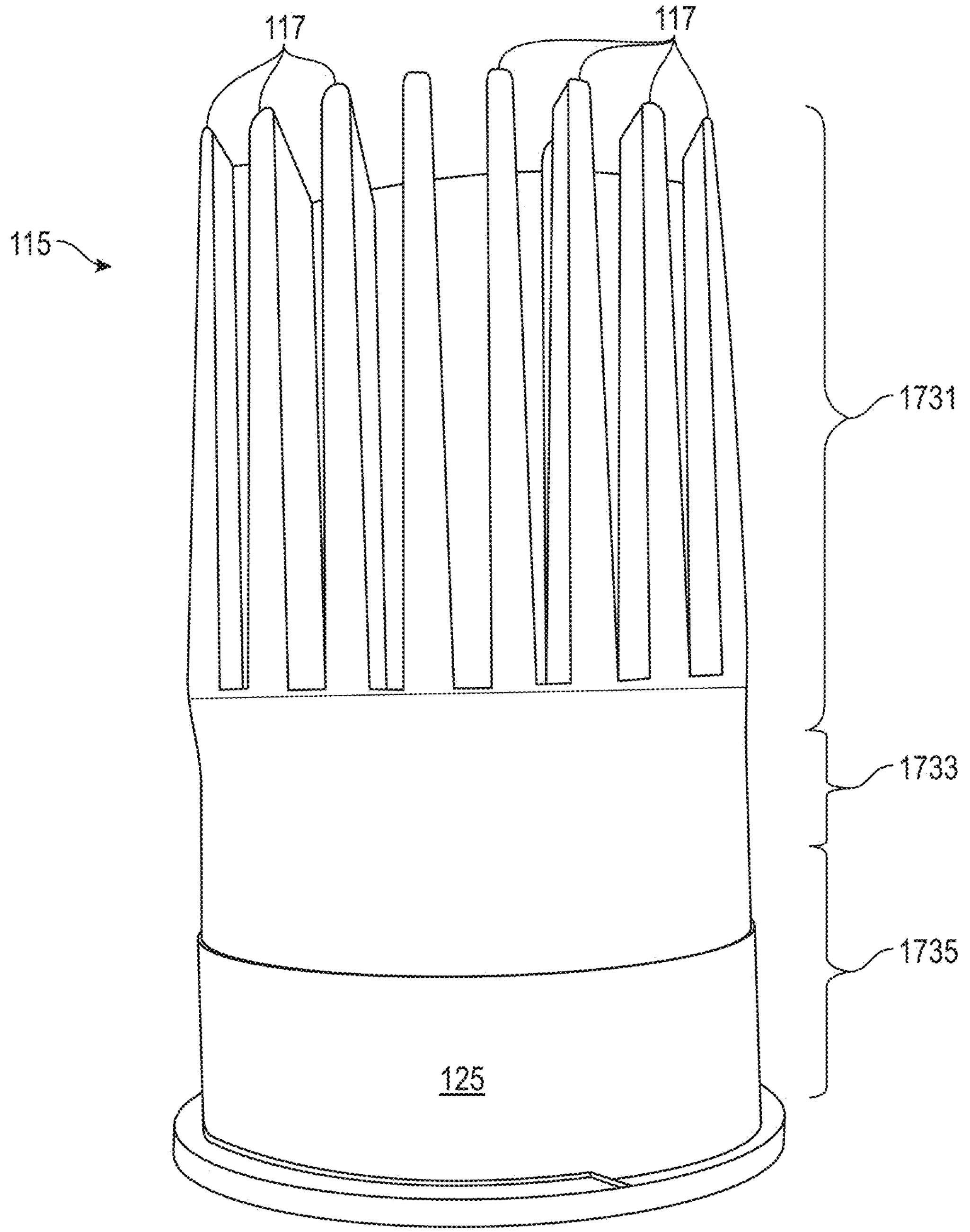
FIG. 17G (Prior Art)
FIG. 17G (prior art) shows another side view of the same heat sink module of FIG. 17F.

FIG. 17F shows a general side view of a heat sink module 115 that may have a particular outer shape/appearance. FIG. 17G shows another side view of the same heat sink module 115 of FIG. 17F. Note, FIG. 17F and FIG. 17G show different side views of a given heat sink module 115 (wherein FIG. 17F and FIG. 17G are rotated about ninety (90) degrees from each other with respect to a common longitudinal center/axis of heat sink module 115). In some embodiments, the outer shape/appearance of heat sink module 115 may comprise three distinct regions, each of its own particular geometry, finned-upper-region 1731, middle-transition-region 1733, and bottom-region 1735. In some embodiments, finned-upper-region 1731 may have an outer shape/appearance that may be substantially shaped as a right cylinder (that may taper towards the top in some embodiments). In some embodiments, middle-transition-region 1733 may have an outer shape/appearance that may be substantially shaped as conical frustrum from two opposing sides (see e.g., FIG. 17F) and that may be substantially shaped as a right cylinder from the other two remaining opposing sides (see e.g., FIG. 17G). In some embodiments, bottom-region 1735 may have an outer shape/appearance that may be substantially shaped as a right cylinder. In some embodiments, middle-transition-region 1733 may be disposed between finned-upper-region 1731 and bottom-region 1735. In some embodiments, a top of middle-transition-region 1733 may be attached/connected to a bottom of finned-upper-region 1731. In some embodiments, a bottom of middle-transition-region 1733 may be attached/connected to a top of bottom-region 1735. In some embodiments, finned-upper-region 1731, middle-transition-region 1733, and bottom-region 1735 may be integral with each other, i.e., as a single article of manufacture. In some embodiments, a widest outside diameter of heat sink module 115 may be at a bottom of finned-upper-region 1731 and/or at a top of middle-transition-region 1733. In some embodiments, a smallest outside diameter of heat sink module 115 may be at a bottom of bottom-region 1735. In some embodiments, an outside diameter of bottom-region 1735 may be less than an outside diameter of finned-upper-region 1731. In some embodiments, a widest diameter of middle-transition-region 1733 may be located closer to a top of heat sink module 115; whereas, a narrowest diameter of middle-transition-region 1733 may be located closer to a bottom of heat sink module 115. In some embodiments, with respect to an overall length/height of heat sink module 115, middle-transition-region 1733 may be shortest and finned-upper-region 1731 may be longest. In some embodiments, with respect to the overall length/height of heat sink module 115, bottom-region 1735 may be longer than middle-transition-region 1733 but shorter than finned-upper-region 1731. In some embodiments, a transition from finned-upper-region 1731 to middle-transition-region 1733 may not be as a step; but rather, may be smooth and seamless as an outside diameter of a bottom of finned-upper-region 1731 may be substantially similar to an outside diameter of a top of middle-transition-region 1733. In some embodiments, a transition from middle-transition-region 1733 to bottom-region 1735 may not be as a step; but rather, may be smooth and seamless as an outside diameter of a bottom of middle-transition-region 1733 may be substantially similar to an outside diameter of a top of bottom-region 1735. In some embodiments, middle-transition-region 1733 may be a region where finned-upper-region 1731 transitions into bottom-region 1735. In some embodiments, heat sink module 115 may comprise a plurality of fins 117. In some embodiments, finned-upper-region 1731 may comprise at least a portion of plurality of fins 117. In some embodiments, middle-transition-region 1733 and bottom-region 1735 may be free of (without) plurality of fins 117. In some embodiments, major planes of the plurality of fins 117 may be at least substantially parallel with each other. In some embodiments, plurality of fins 117 may run from a bottom to a top of finned-upper-region 1731. In some embodiments, at least an exterior portion of plurality of fins 117 may be threaded for attachment to driver cap 101. In some embodiments, at least a portion of bottom-region 1735 (exterior or interior) may be threaded for attachment to holder 125. In some embodiments, a bottom interior of heat sink module 115 may be at least mostly hollow and configured for receiving LED light chip 701 and/or optical reflector 703.

Figure 17H:
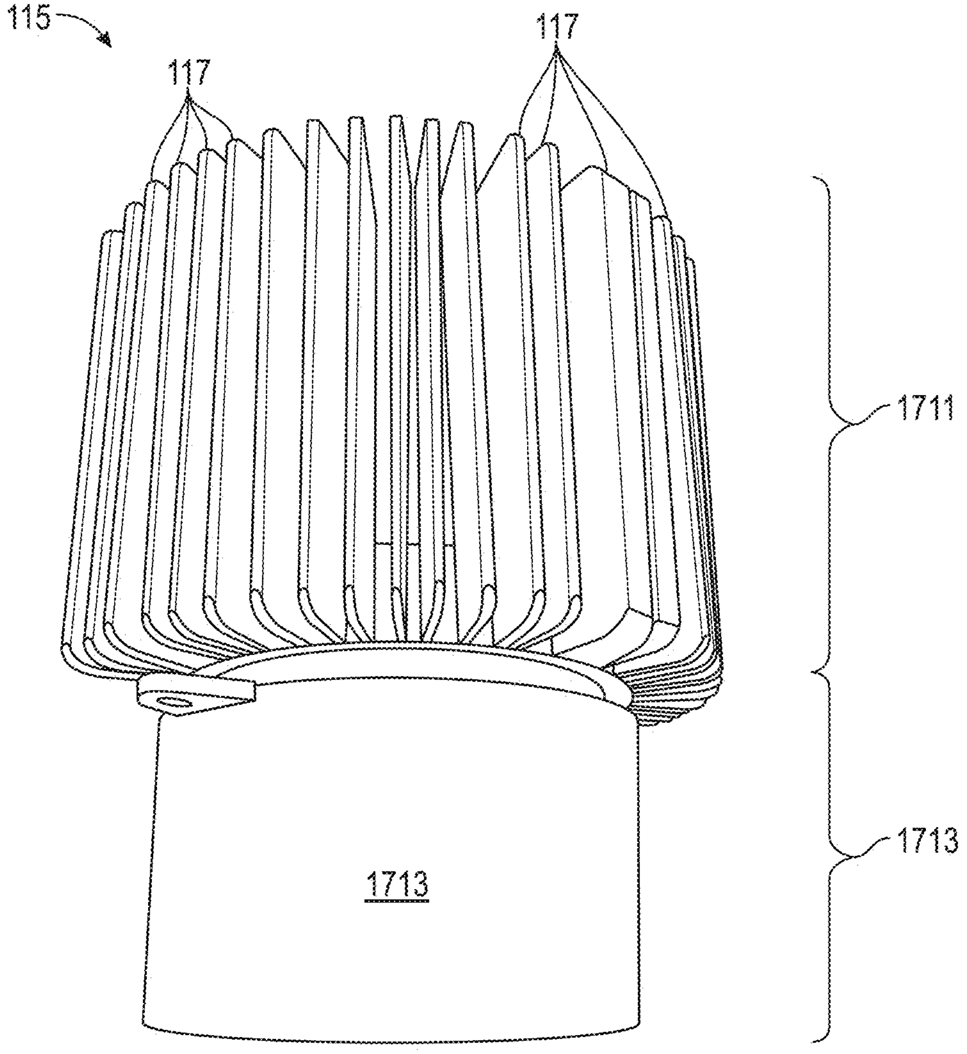
FIG. 17H (Prior Art)
FIG. 17H (prior art) shows a general side view of a heat sink module that may have a particular outer shape/appearance.

FIG. 17H shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 may be taller/longer than lower-region 1713. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Note, in some embodiments, attachment between heat sink modules 115 of FIG. 17A to FIG. 17H to driver caps 101 and/or to holders 125 may be as shown and described in FIG. 1 to FIG. 11, FIG. 13A to FIG. 13I, FIG. 14A to FIG. 14C, FIG. 15, and/or FIG. 16A to FIG. 16C.

Figure 18A:
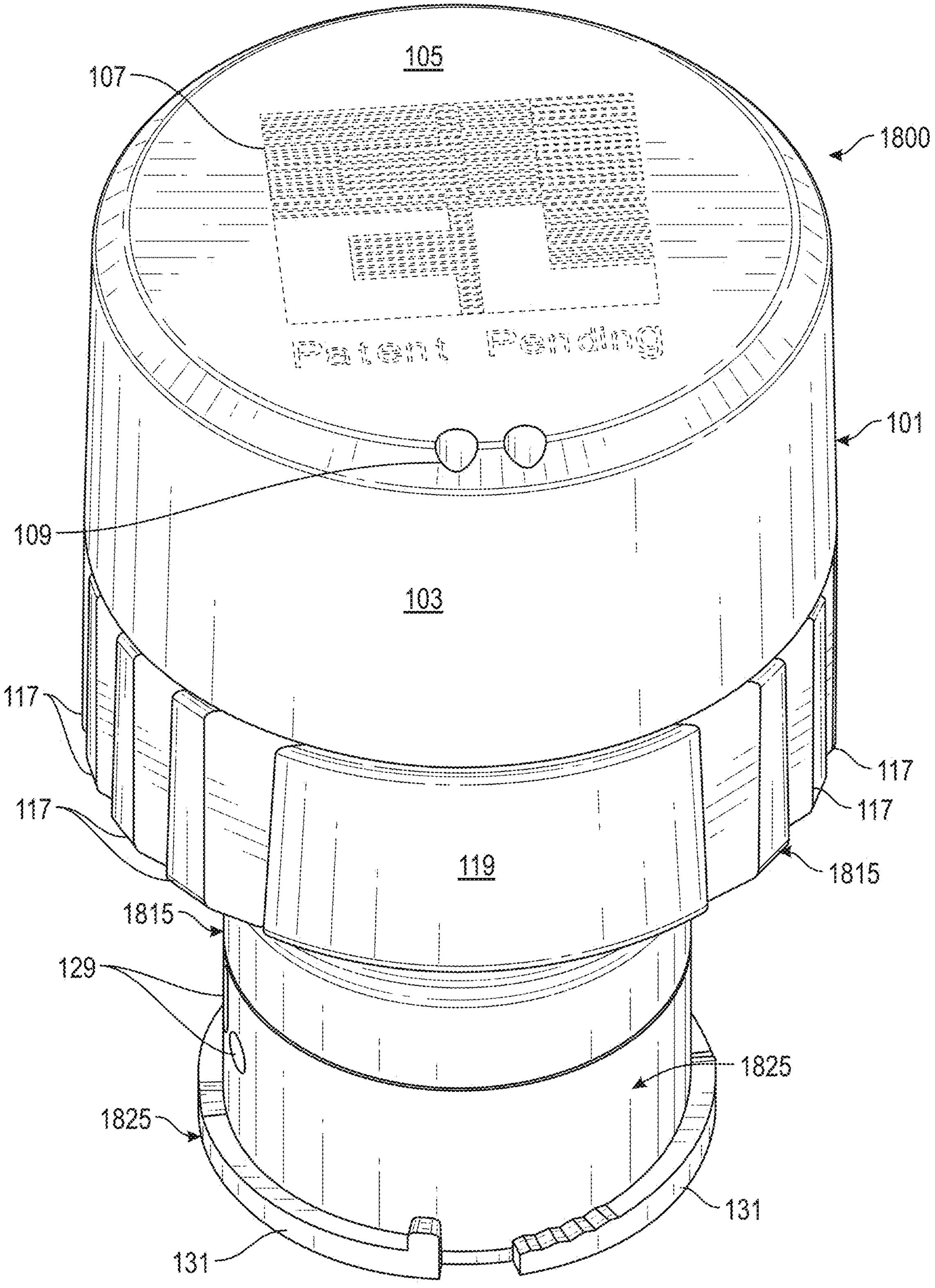
FIG. 18A is a top perspective view of an integrated lighting module according to at least one embodiment.

FIG. 18A shows a top-down perspective view of an integrated-lighting-module 1800. In some embodiments, integrated-lighting-module 1800 may be substantially similar to integrated-lighting-module 100 in function but where the heat sink module 1815 of integrated-lighting-module 1800 may taper to smaller outside diameter at its bottom as compared to heat sink module 115 of integrated-lighting-module 100; and/or the holder 1825 of integrated-lighting-module 1800 may have a smaller outside diameter at compared to holder 125 of integrated-lighting-module 100. In some embodiments, a height of heat sink module 1815 may be the same or shorter than a height of heat sink module 115. In some embodiments, a height of holder 1825 may be the same or shorter than a height of holder 125. In some embodiments, integrated-lighting-module 1800 may comprise: driver cap 101, heat sink module 1815, and holder 1825. In some embodiments, integrated-lighting-module 1800 may comprise: driver cap 101, heat sink module 1815, holder 1825, and reflector 703. In some embodiments, integrated-lighting-module 1800 may comprise: driver cap 101, heat sink module 1815, holder 1825, reflector 703, and LED light chip 701. In some embodiments, integrated-lighting-module 1800 may comprise: driver cap 101, heat sink module 1815, holder 1825, reflector 703, LED light chip 701, and a driver (for LED light chip 701). Note, a driver (e.g., driver 2011) may be shown in FIG. 20B, FIG. 21A, FIG. 22A, and/or in FIG. 22B. Additionally, driver(s) as discussed herein may be preexisting drivers of LEDs and as such are incorporated by reference. Note, the term "driver" may also sometimes be replaced with the term "transformer." Herein, "driver" and "transformer" may be used interchangeably. In some embodiments, a driver may be a power supply for a given LED; and/or may be convert between AC (alternating) and DC (direct current).

Continuing discussing FIG. 18A, in some embodiments, heat sink module 1815 may be substantially (mostly) similar to heat sink module 115 in terms of function (e.g., as a heat sink), except heat sink module 1815 may taper more towards its bottom resulting in an outside diameter at its bottom that is smaller than the outside diameter at the bottom of heat sink module 115. In some embodiments, heat sink module 1815 may comprise side wall 119 and at least one fin 117; just as heat sink module 115 may comprise side wall 119 and at least one fin 117. In some embodiments, heat sink module 1815 and/or heat sink module 115 may be at least substantially (mostly) internally solid. To the extent prior discussions of heat sink module 115 do not conflict with a discussion of heat sink module 1815, the prior discussions of heat sink module 115 may be applied to heat sink module 1815.

Continuing discussing FIG. 18A, in some embodiments, holder 1825 may be substantially (mostly) similar to holder 125 in terms of function (e.g., as a means to house, hold, and/or retain reflector 703 between a portion of the holder and a bottom portion of the heat sink module), except holder 1825 may have a smaller outside diameter than the outside diameter of holder 125. In some embodiments, holder 1825 may comprise side-wall 127 (second side-wall 127), thread lock notch(es) 129, twist-lock-flange 131, twist-lock-teeth 133, and twist-lock-opening(s) 135; just as holder 125 may comprise side-wall 127 (second side-wall 127), thread lock notch(es) 129, twist-lock-flange 131, twist-lock-teeth 133, and twist-lock-opening(s) 135. In some embodiments, holder(s) 1825 and/or 125 may be substantially hollow cylindrical members with a flange 131 at one of its two opposing main openings and no flange at the other of the two opposing main openings; and at least some internal (inside) surface(s) (in the hollow cavity of holder(s) 1825 and/or 125) may have female threading for complementary (removable) mating with male threads on an exterior bottom portion of heat sink module 1815 and/or heat sink module 115, respectively. To the extent prior discussions of holder 125 do not conflict with a discussion of holder 1825, the prior discussions of holder 125 may be applied to holder 1825.

Figure 18B:
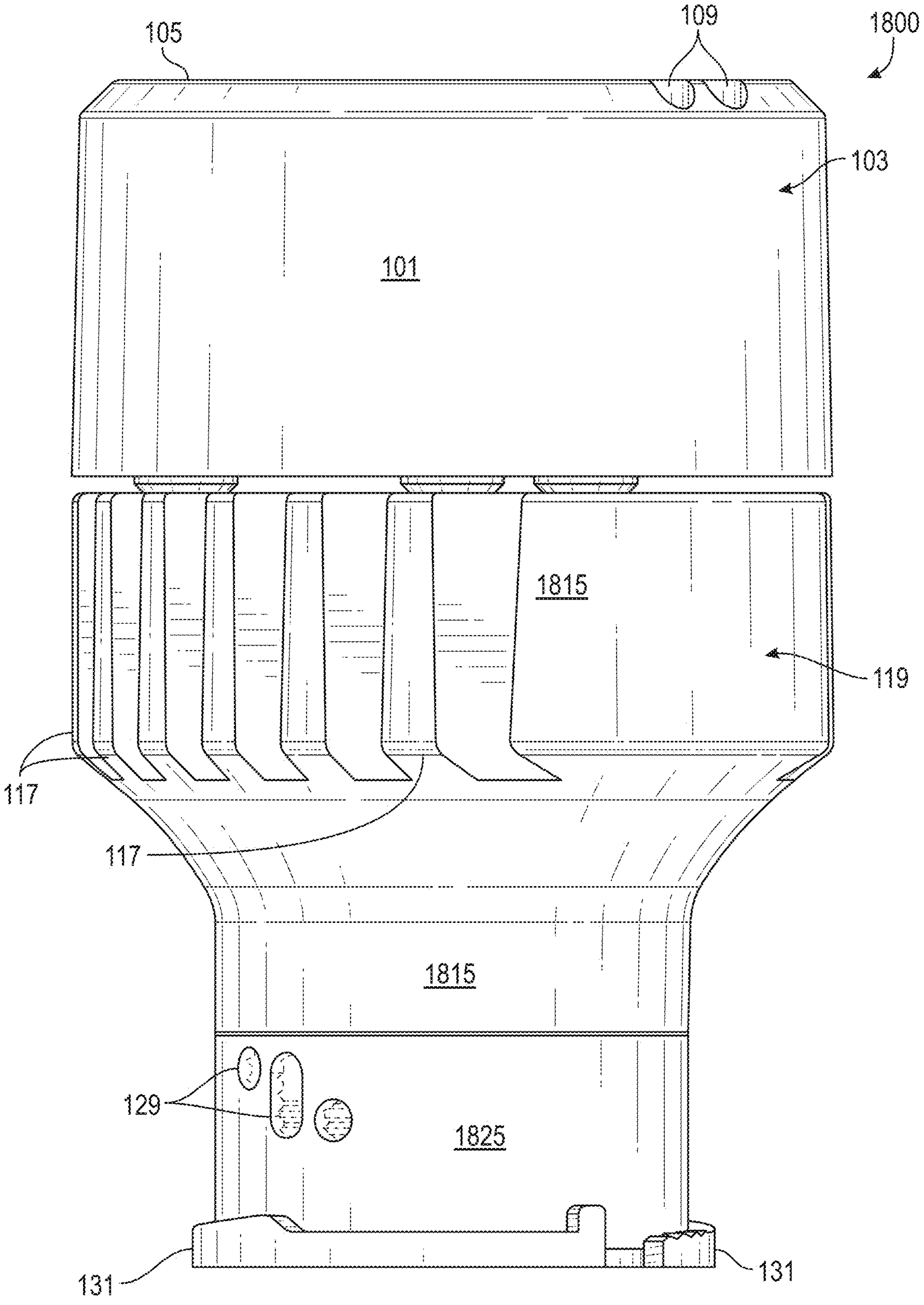
FIG. 18B is a front view of the integrated lighting module shown in FIG. 18A.
Figure 18C:
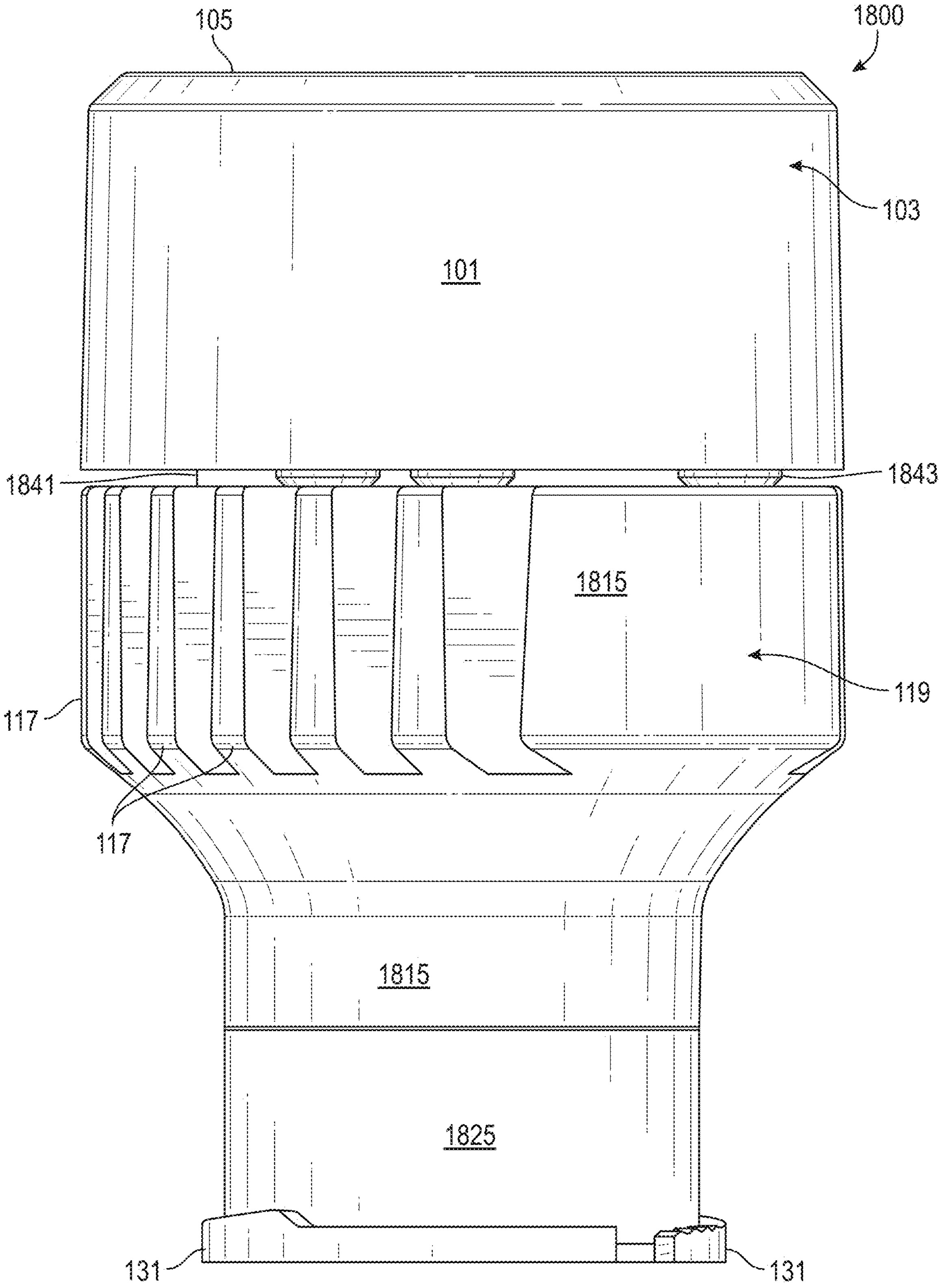
FIG. 18C is a rear (back) view of the integrated lighting module shown in FIG. 18A.
Figure 18D:
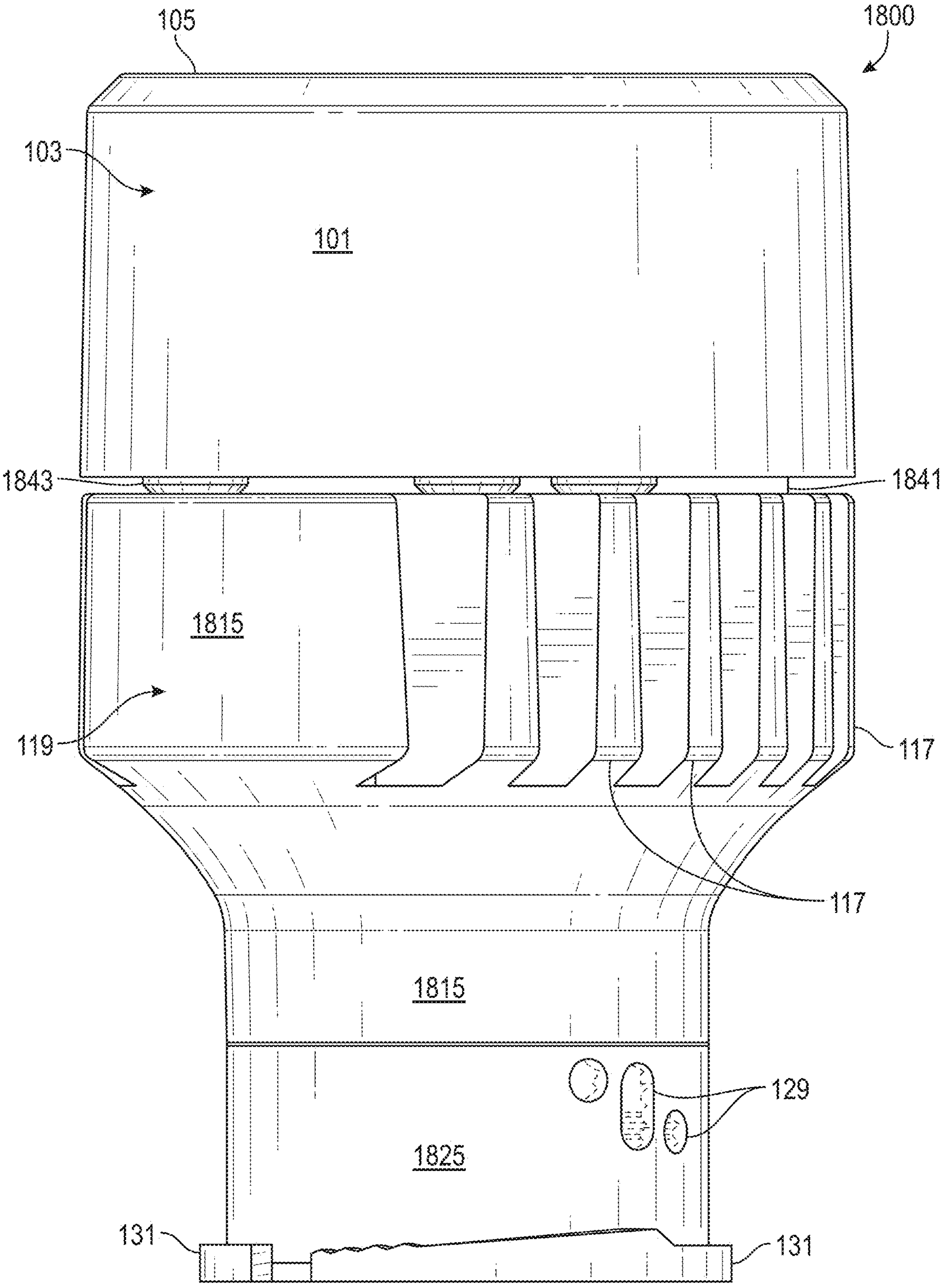
FIG. 18D is a left-side view of the integrated lighting module shown in FIG. 18A.
Figure 18E:
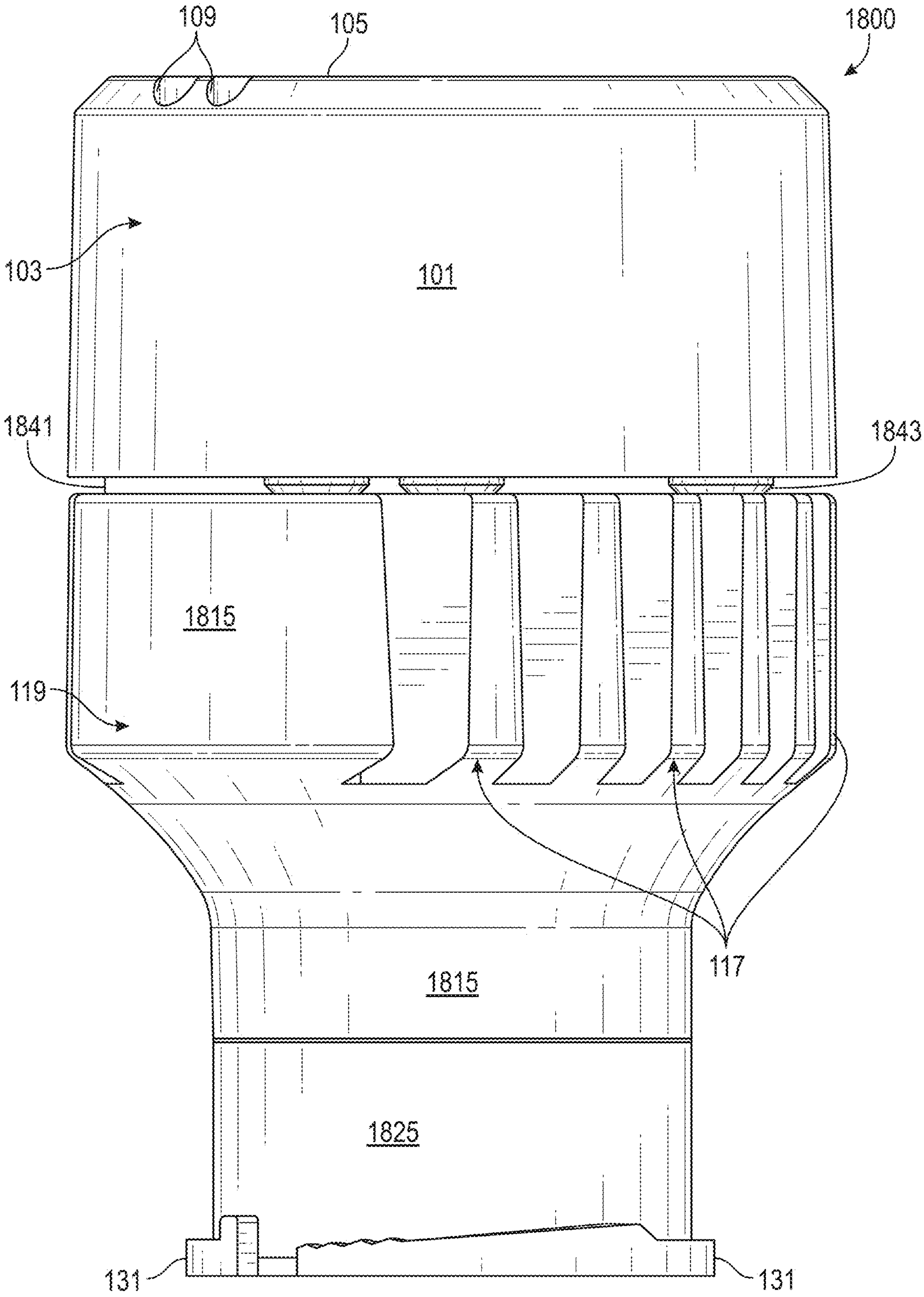
FIG. 18E is a right-side view of the integrated lighting module shown in FIG. 18A.

FIG. 18B is a front view of integrated-lighting-module 1800. FIG. 18C is a rear (back) view of integrated-lighting-module 1800. FIG. 18D is a left-side view of integrated-lighting-module 1800. FIG. 18E is a right-side view of integrated-lighting-module 1800. In some embodiments, bottom 111 of driver cap 101 may not physically contact nor touch a top of heat sink module 1815, with respect to an assembled integrated-lighting-module 1800. In some embodiments, bottom 111 may be physically separated from the top of heat sink module 1815, with by a gap 1841. In some embodiments, gap 1841 may be an air gap. In some embodiments, gap 1841 may help to isolate heat generated from a driver located within driver cap 101 from negatively impacting operation of LED light chip 701, wherein LED light chip 701 (in some embodiments) may be housed within the bottom and non-finned portion of heat sink module 1815. In some embodiments, gap 1841 may be fixed, non-variable, and/or uniform between bottom 111 and the top of heat sink module 1815. In some embodiments, gap 1841 may be ¼ (0.25) of an inch or less. In some embodiments, gap 1841 may be ⅛ (0.125) of an inch or less. In some embodiments, gap 1841 may be 1/16 (0.0625) of an inch or less. In some embodiments, gap 1841 may be 1/32 (0.03125) of an inch or less. In some embodiments, gap 1841 may be a fixed distance selected from a range of: ¼ (0.25) of an inch to 1/32 (0.03125) of an inch. In some embodiments, gap 1841 may be a fixed distance selected from a range of: seven (7) millimeters (mm) to one (1) mm.

Continuing discussing FIGS. 18B to 18E, in some embodiments, gap 1841 may be formed and/or maintained by one or more spacer(s) 1843 that may be disposed (located) between bottom 111 and the top of heat sink module 1815. In some embodiments, integrated-lighting-module 1800 and/or driver cap 101 may comprise one or more spacer(s) 1843. In some embodiments, integrated-lighting-module 1800 and/or driver cap 101 may comprise at least one spacer 1843. In some embodiments, integrated-lighting-module 1800 and/or driver cap 101 may comprise two or more spacers 1843. In some embodiments, integrated-lighting-module 1800 and/or driver cap 101 may comprise three spacers 1843. In some embodiments, spacers 1843 may be equidistant from each other. In some embodiments, spacer(s) 1843 may extend (protrude) downwards from a direction of bottom 111 towards the top of heat sink module 1815 and spacer(s) 1843 may physically bridge gap 1841 to make physical contact with the top of heat sink module 1815. In some embodiments, residing within a given spacer 1843 may be at least a portion of a mechanical fastener, such as, but not limited to, a screw; wherein such a mechanical fastener may secure driver cap 101 to heat sink module 1815, but while maintaining gap 1841.

Figure 18F:
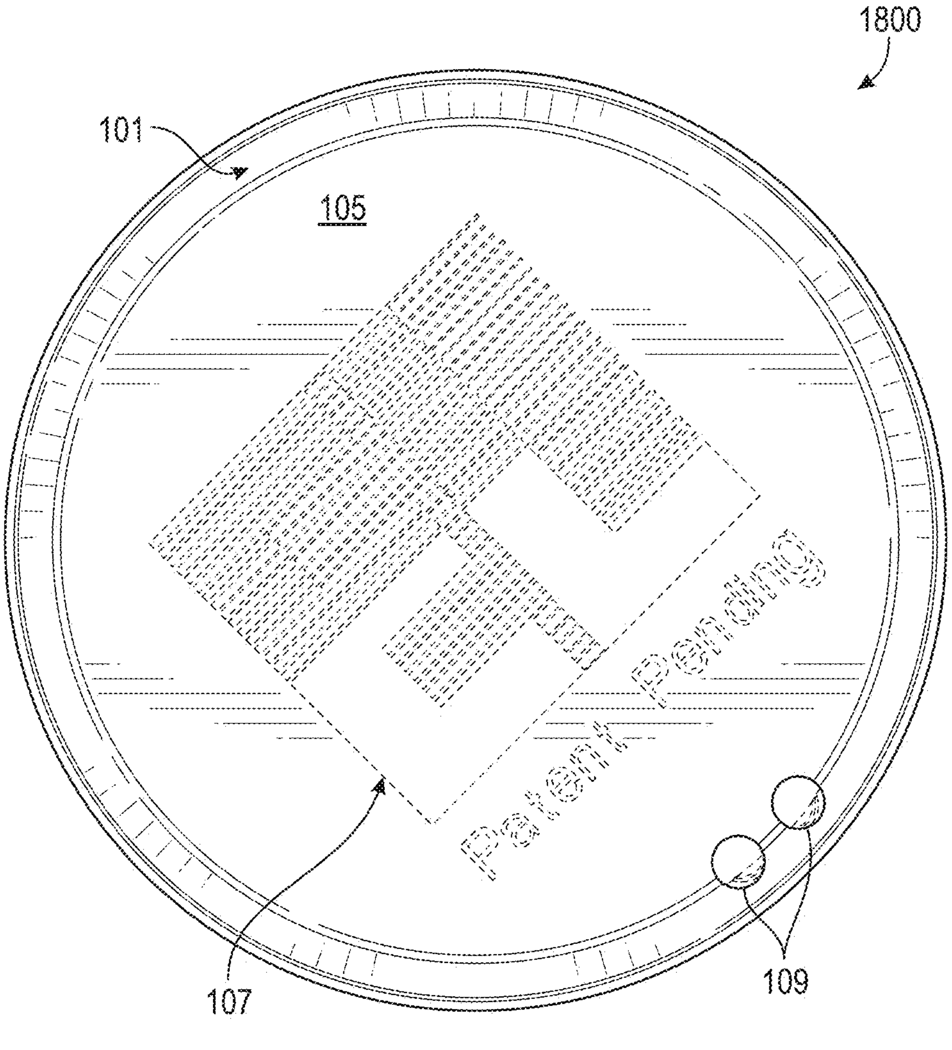
FIG. 18F is a top view of the integrated lighting module shown in FIG. 18A.
Figure 18G:
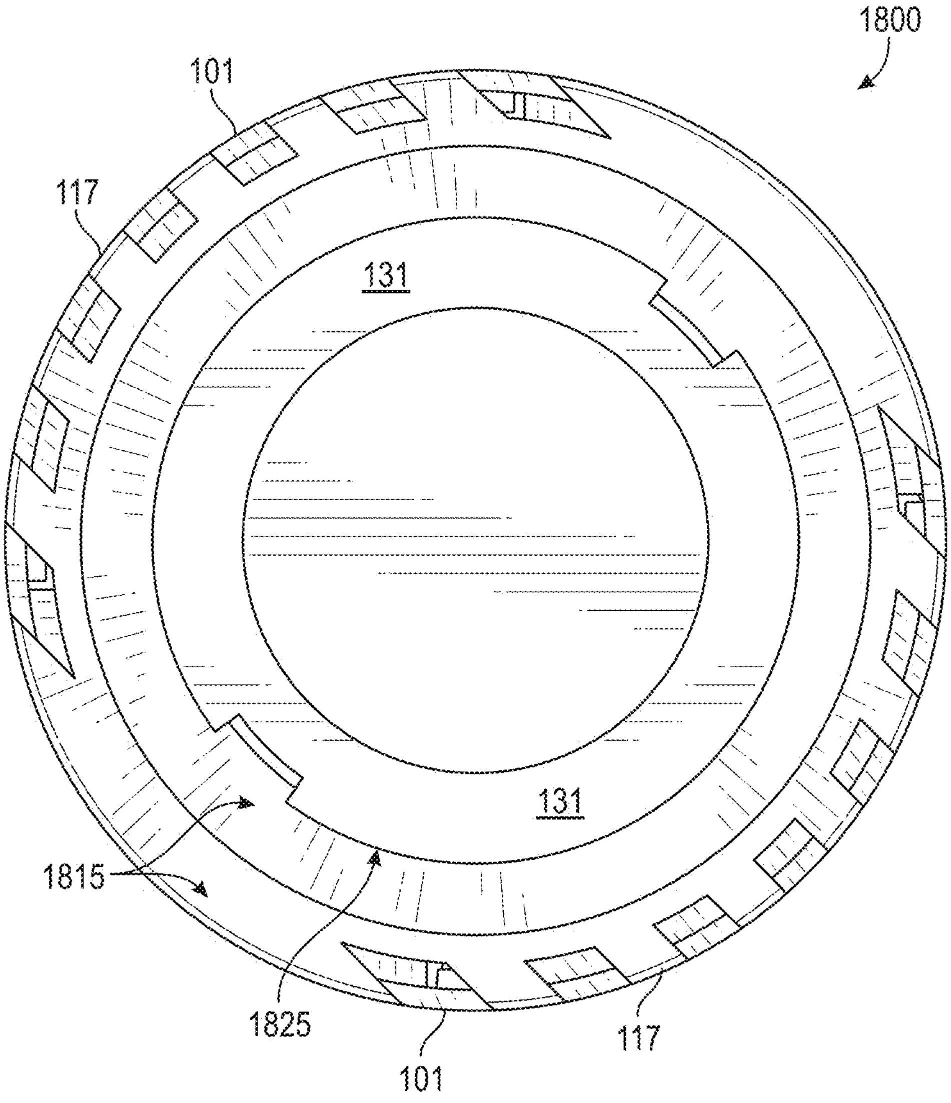
FIG. 18G is a bottom view of the integrated lighting module shown in FIG. 18A.

FIG. 18F is a top view of integrated-lighting-module 1800 and may be at least substantially similar in both function and in appearance to the top view of integrated-lighting-module 100 shown in FIG. 6. FIG. 18G is a bottom view of integrated-lighting-module 1800 and may be at least substantially similar in function to the bottom view of integrated-lighting-module 100 shown in FIG. 7.

Figure 18H:
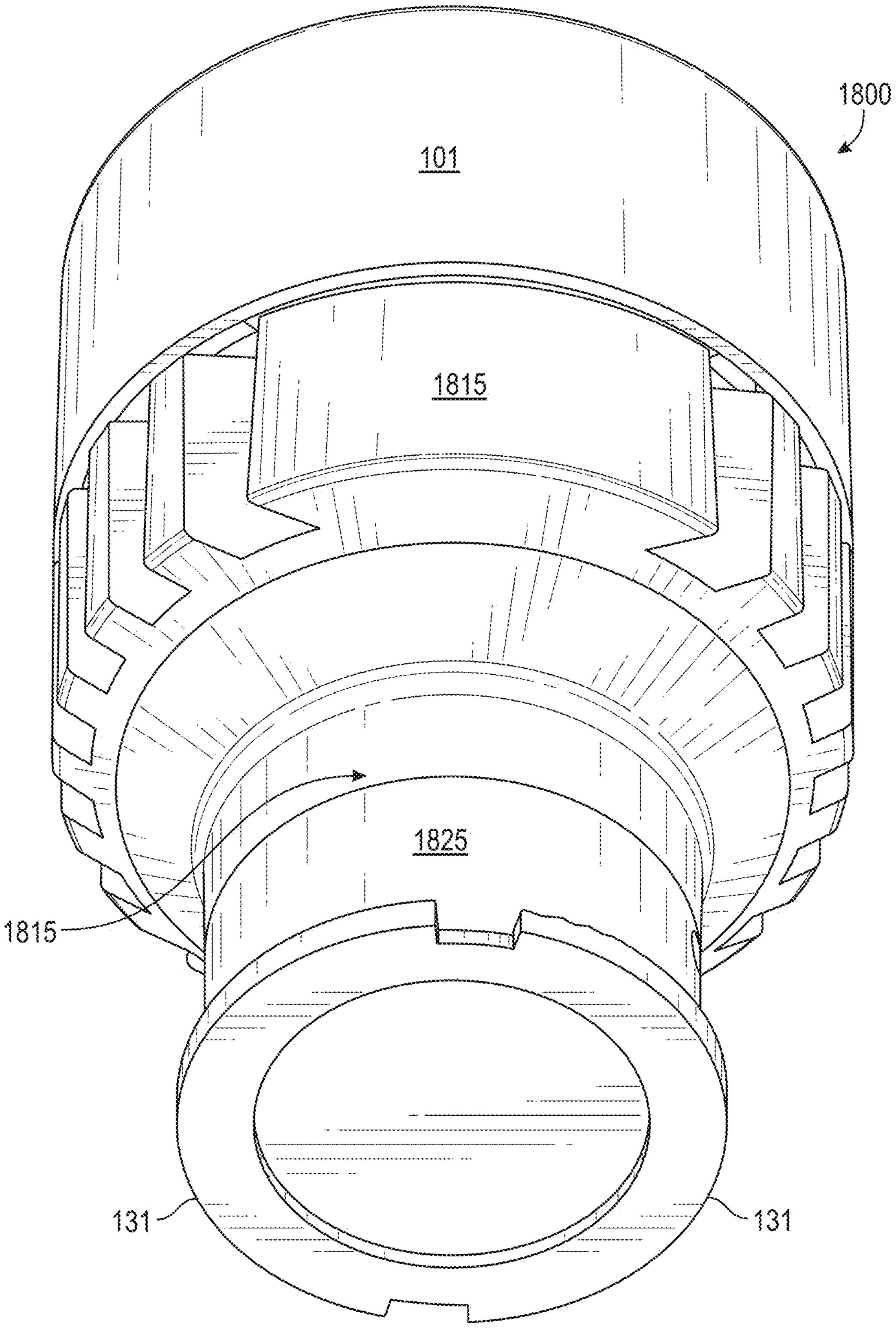
FIG. 18H is a bottom perspective view of the integrated lighting module shown in FIG. 18A.

FIG. 18H is a bottom perspective view of integrated-lighting-module 1800 and may be at least substantially similar in function to the bottom perspective view of integrated-lighting-module 100 shown in FIG. 8. FIG. 18H (and FIG. 18G) show how the outside diameter of holder 1825 is smaller than that of the outside diameter of holder 125. FIG. 18H (and FIG. 18G) show how the bottom of heat sink module 1815 tapers to a narrower (smaller) outside diameter at its bottom as compared to the comparatively larger outside diameter of the bottom of heat sink module 115.

Figure 20A:
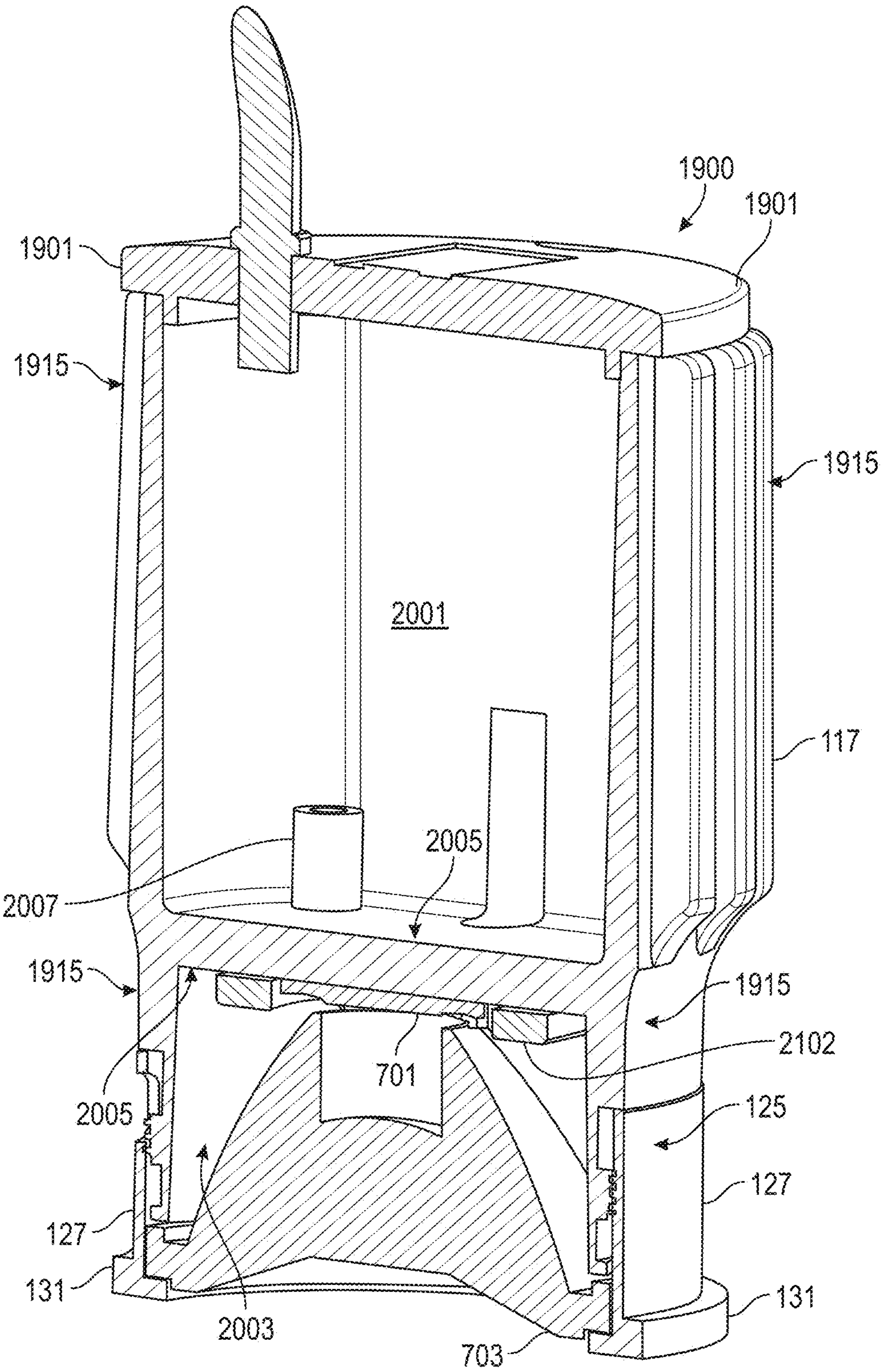
FIG. 20A is a cross-sectional view through the integrated lighting module shown in FIG. 19A, but without showing its driver within a volume (upper-cavity) of its heat sink.
Figure 20B:
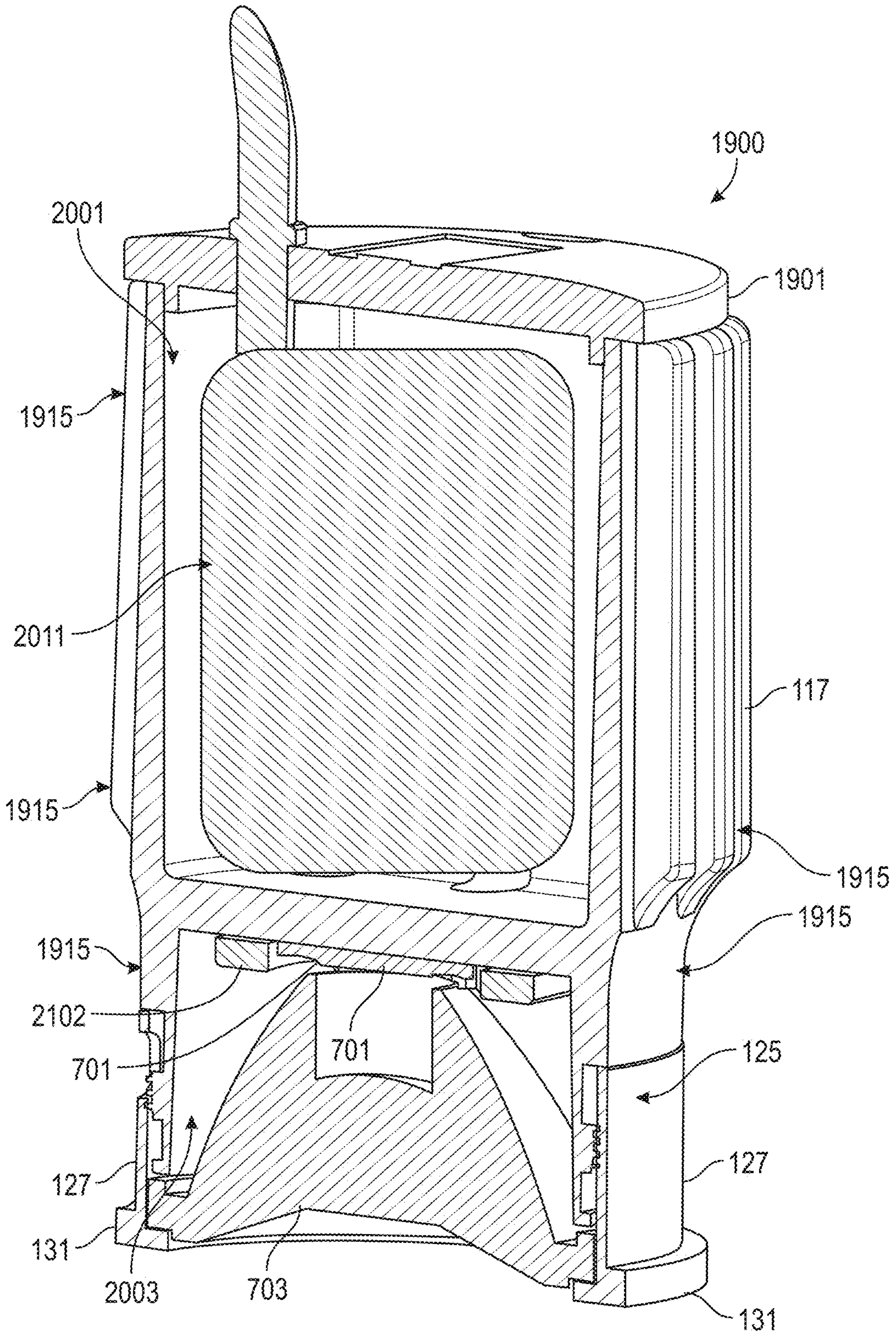
FIG. 20B is a cross-sectional view through the integrated lighting module shown in FIG. 19A, but now with showing its driver within the volume (upper-cavity) of its heat sink.
Figure 21:
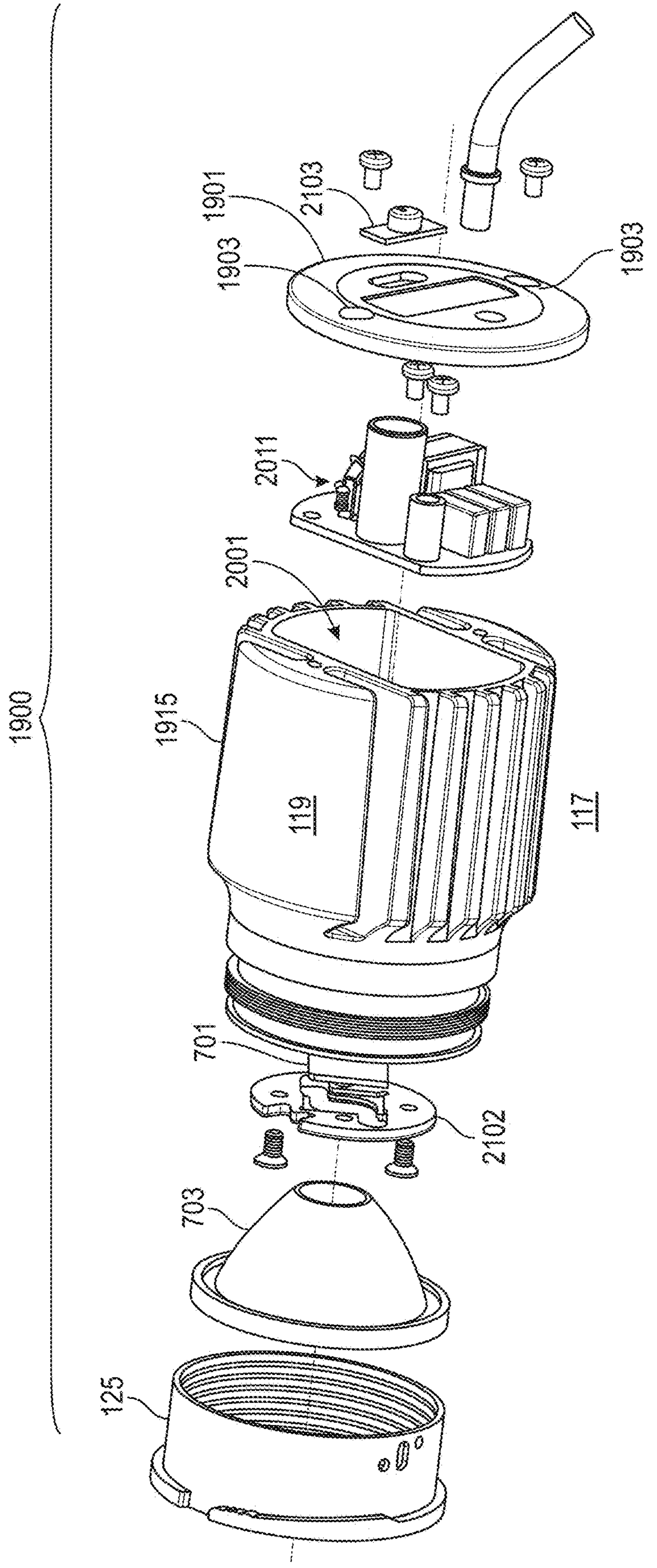
FIG. 21 is an exploded perspective view of the integrated lighting module shown in FIG. 19A.

With respect to some embodiments of integrated-lighting-module 100 and/or of integrated-lighting-module 1800, its driver may be located within (inside of) its driver cap 101. Whereas, in some embodiments, with respect to an integrated-lighting-module 1900, its driver 2011 may be located within (inside of) its heat sink 1915. Integrated-lighting-module 1900 is shown in FIG. 19A through FIG. 21. FIGS. 19A through 19H show integrated-lighting-module 1900 in an intended assembled configuration; FIGS. 20A and 20B show integrated-lighting-module 1900 in cross-section (from top to bottom); and FIG. 21 shows integrated-lighting-module 1900 in an exploded (dissembled) configuration. In some embodiments, in integrated-lighting-module 1900, the driver cap 101 is entirely omitted and replaced with heat sink module 1915 and with a lid 1901.

Figure 19A:
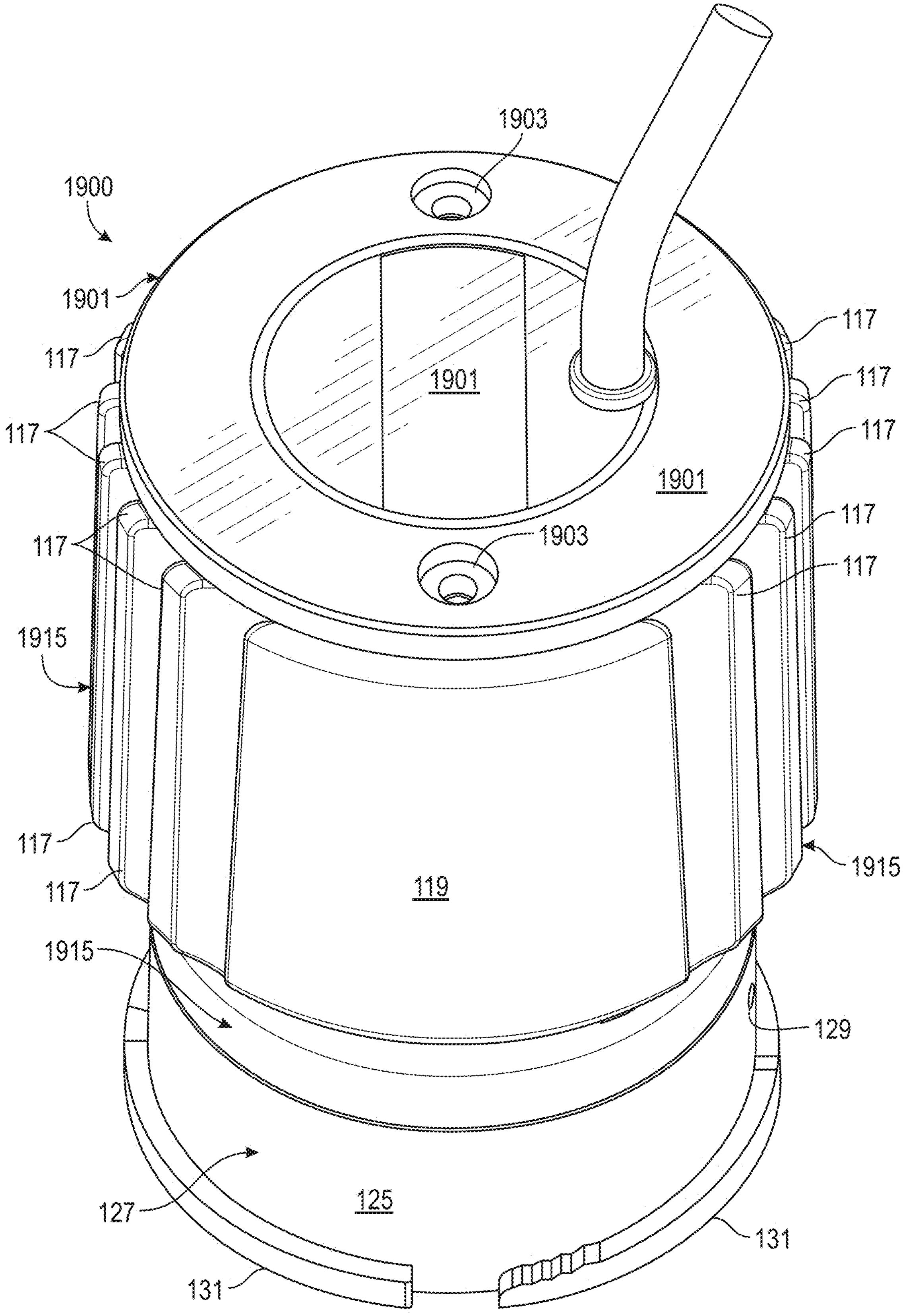
FIG. 19A is a top perspective view of an integrated lighting module according to at least one embodiment.
Figure 19B:
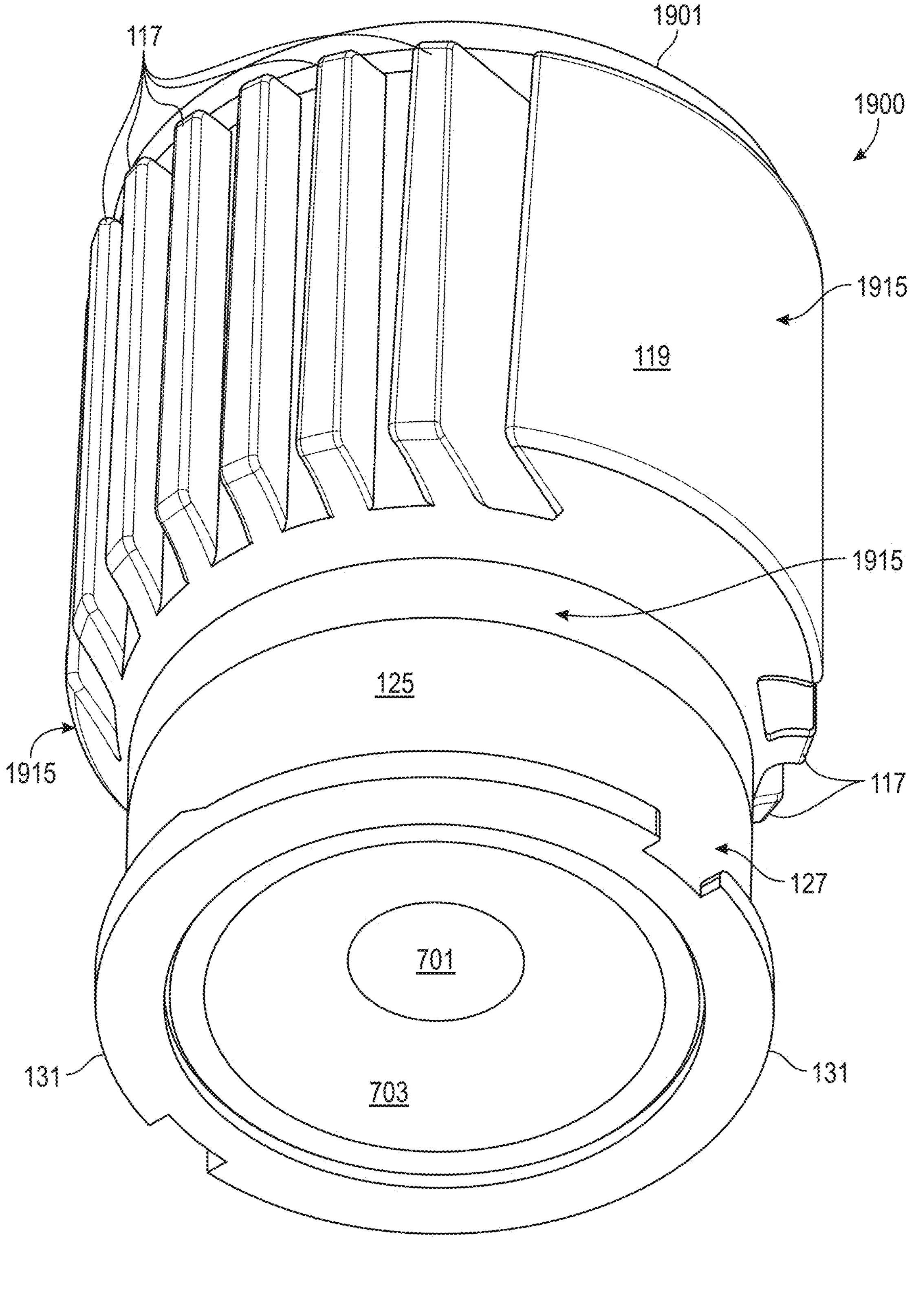
FIG. 19B is a bottom perspective view of the integrated lighting module shown in FIG. 19A.
Figure 19C:
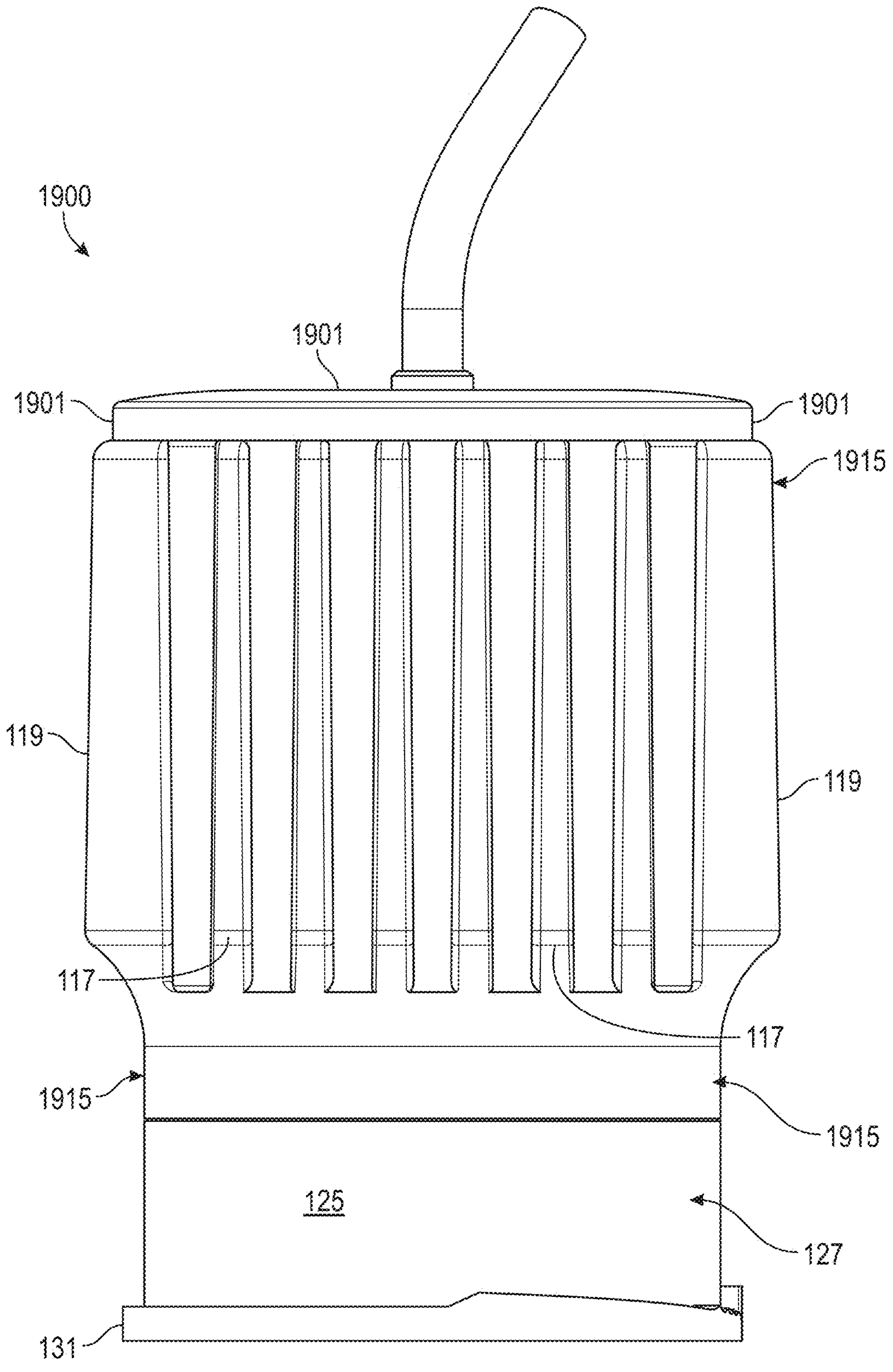
FIG. 19C is a front view of the integrated lighting module shown in FIG. 19A.
Figure 19D:
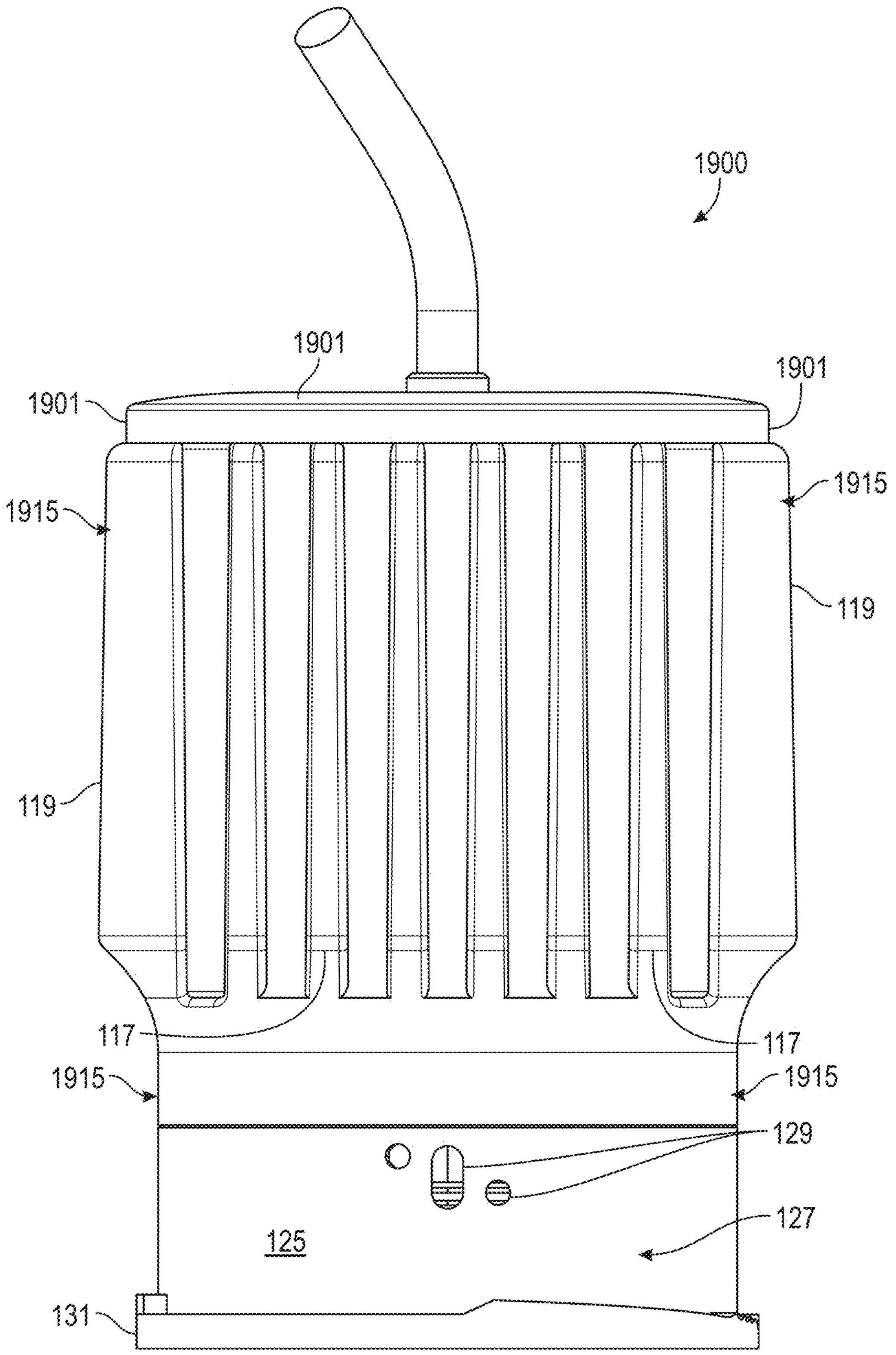
FIG. 19D is a rear (back) view of the integrated lighting module shown in FIG. 19A.
Figure 19E:
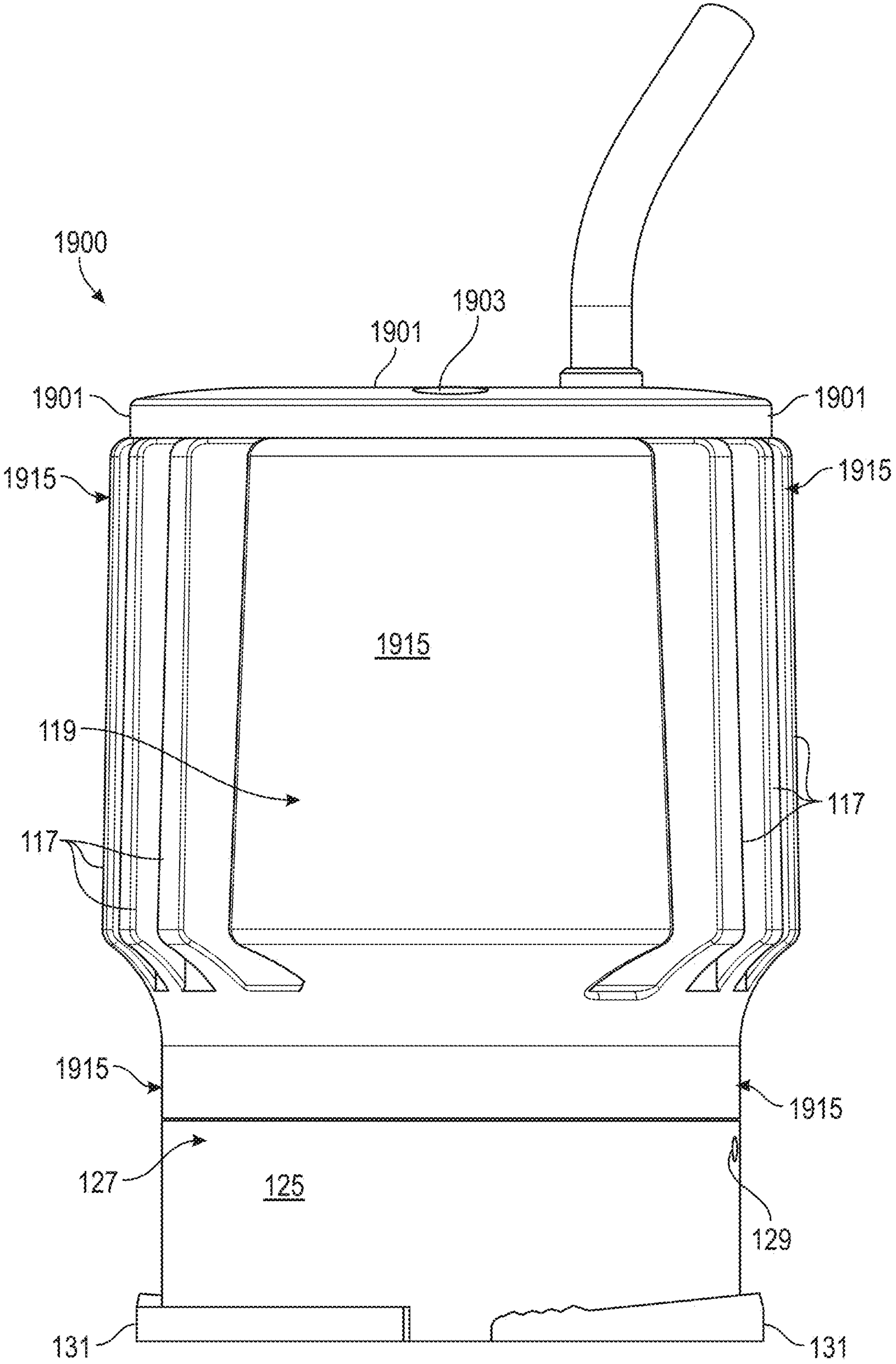
FIG. 19E is a left-side view of the integrated lighting module shown in FIG. 19A.
Figure 19F:
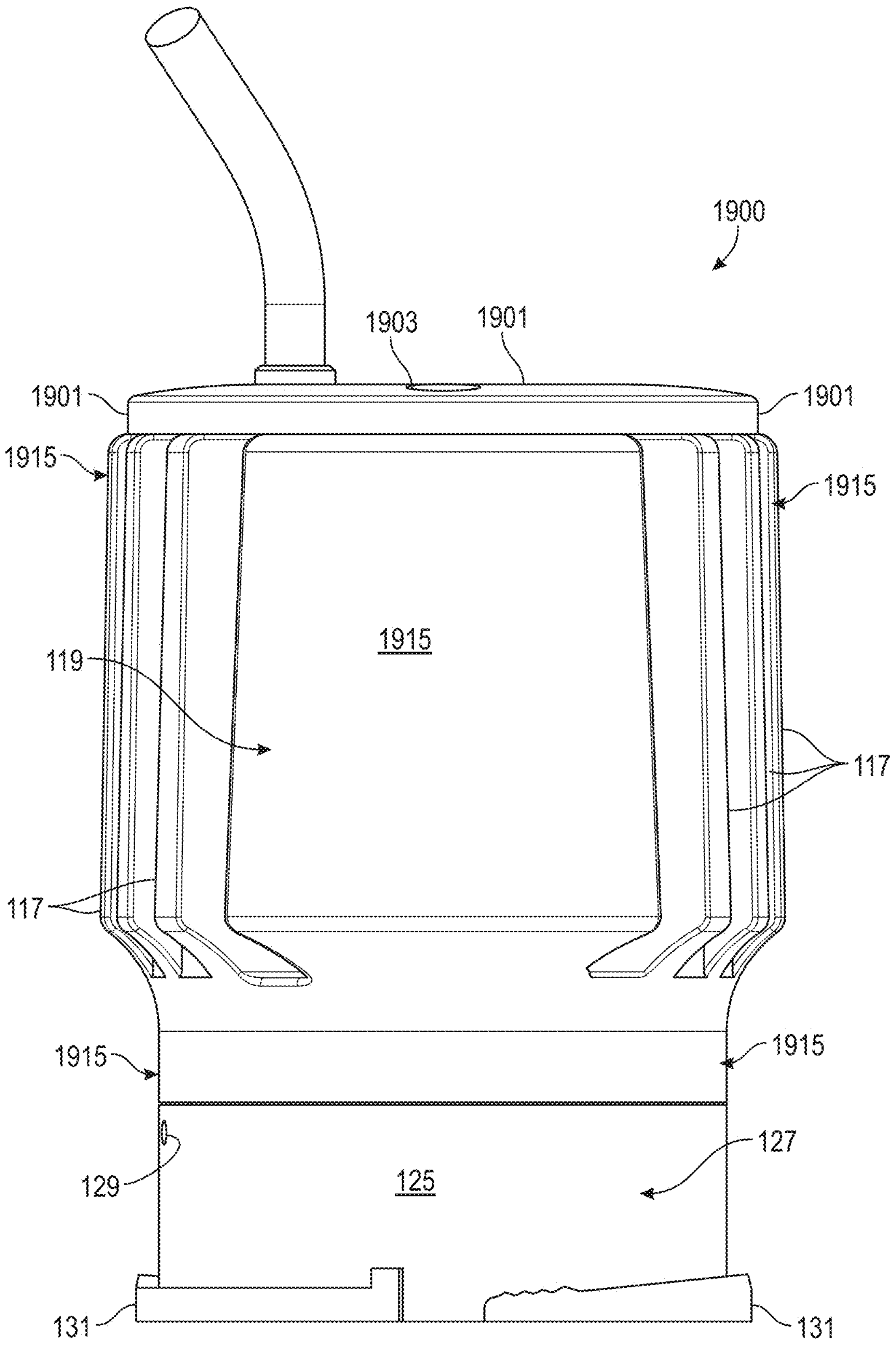
FIG. 19F is a right-side view of the integrated lighting module shown in FIG. 19A.
Figure 19G:
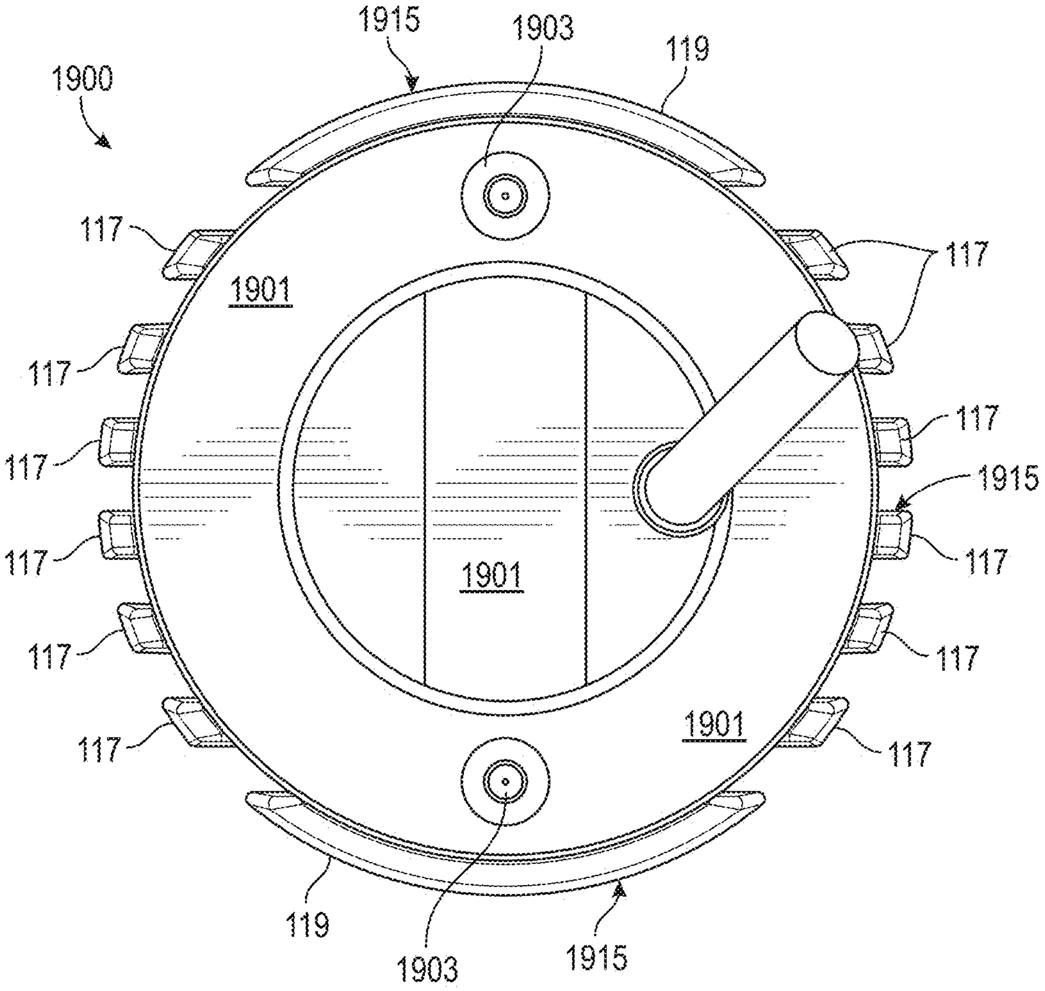
FIG. 19G is a top view of the integrated lighting module shown in FIG. 19A.
Figure 19H:
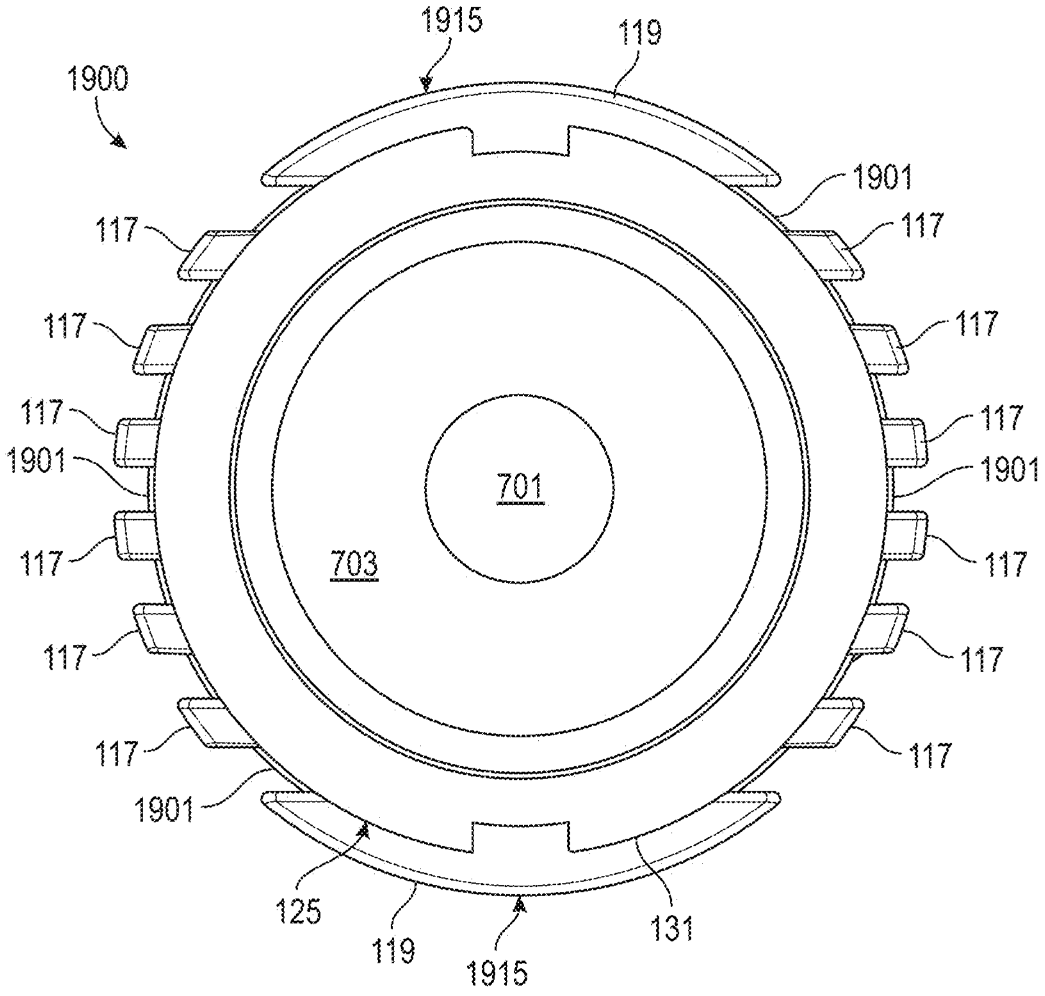
FIG. 19H is a bottom view of the integrated lighting module shown in FIG. 19A.

FIG. 19A is a top perspective view of integrated lighting module according 1900. FIG. 19B is a bottom perspective view of integrated lighting module according 1900. FIG. 19C is a front view of integrated lighting module according 1900. FIG. 19D is a rear (back) view of integrated lighting module according 1900. FIG. 19E is a left-side view of integrated lighting module according 1900. FIG. 19F is a right-side view of integrated lighting module according 1900. FIG. 19G is a top view of integrated lighting module according 1900. FIG. 19H is a bottom view of integrated lighting module according 1900. In some embodiments, integrated-lighting-module 1900 may comprise: a lid 1901, heat sink module 1915, and holder 125. In some embodiments, integrated-lighting-module 1900 may comprise: lid 1901, heat sink module 1915, holder 125, and reflector 703. In some embodiments, integrated-lighting-module 1900 may comprise: lid 1901, heat sink module 1915, holder 125, reflector 703, and LED light chip 701. In some embodiments, integrated-lighting-module 1900 may comprise: lid 1901, heat sink module 1915, holder 125, reflector 703, LED light chip 701, and a driver 2011 (for LED light chip 701). In some embodiments, integrated-lighting-module 1900 may also comprise a holder-of-LED 2102 that may be configured to hold and/or retain LED light chip 701 (see e.g., FIG. 21 for holder-of-LED 2102). In some embodiments, integrated-lighting-module 1900 may not comprise driver cap 101 nor any other component (part) that is intended to house (retain) a driver, except for its heat sink module 1915 which is configured to house (retain) driver 2011.

Figure 22A:
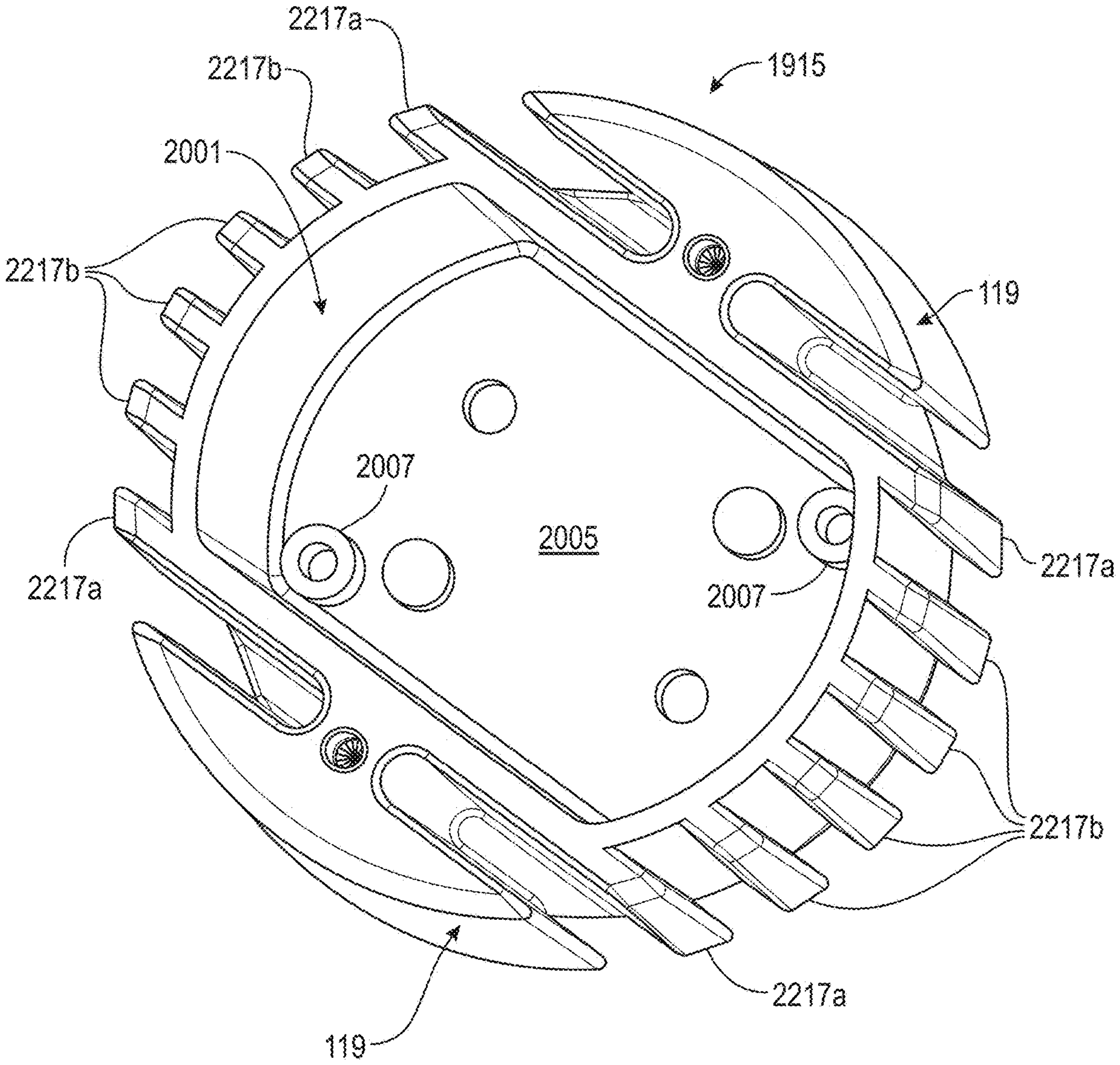
FIG. 22A is a top perspective view of just the heat sink module of the integrated lighting module shown in FIG. 19A.

In some embodiments, lid 1901 may be a lid and/or a cover that covers up and/or seals up an otherwise main (largest and/or biggest) top opening of heat sink module 1915, compare for example, FIG. 19A to FIG. 22A, where lid 1901 is omitted in FIG. 22A and showing what lid 1901 may otherwise cover over, namely main (largest) top opening of heat sink module 1915 and the upper-cavity 2001 of heat sink module 1915. In some embodiments, a height (thickness) of lid 1901 may be substantially (significantly) shorter than a height (tallness) of driver cap 101. In some embodiments, lid 1901 may be a circular disc (disk) of fixed and finite thickness, circumference, diameter, and/or the like. In some embodiments, lid 1901 may be at least mostly (substantially) solid and free from holes, except for holes for mechanical fasteners and/or for the passage of wire(s). In some embodiments, lid 1901 may be rigid. In some embodiments, lid 1901 may be made from a metal, an alloy, a ceramic, carbon fiber, stone, a masonry product, a plastic, combinations thereof, and/or the like. In some embodiments, lid 1901 may be attached to a top (upper) portion of heat sink module 1915. In some embodiments, lid 1901 may comprise at least one aperture-for-receiving-fastener 1903. In some embodiments, aperture-for-receiving-fastener 1903 may be a through hole (aperture) that is located on lid 1901 and that passes entirely through a thickness of lid 1901. In some embodiments, aperture-for-receiving-fastener 1903 may be configured to receive at least a portion of a mechanical fastener, such as, but not limited to, a screw, a bolt, a pin, a rod, a dowel, and/or the like. See e.g., FIG. 19A, FIG. 19C, FIG. 19D, FIG. 19E, FIG. 19F, FIG. 19G, FIG. 20A, FIG. 20B, and FIG. 21 for lid 1901.

In some embodiments, heat sink module 1915 may be substantially (mostly) similar to heat sink module 115 in terms of function (e.g., as a heat sink), except heat sink module 1915 may comprise an upper-cavity 2001 that is a hollow volume configured to receive and/or house at least one driver 2011 and to accommodate fitting driver 2011 inside of heat sink module 1915, heat sink module 1915 may be taller than heat sink module 115. In some embodiments, heat sink module 1915 may be about as tall as the tallness of both heat sink module 115 and driver cap 101 combined; for example, compare FIG. 19E to FIG. 2. In some embodiments, heat sink module 1915 may comprise side wall 119 and at least one fin 117; just as heat sink module 115 may comprise side wall 119 and at least one fin 117. In some embodiments, the fin(s) 117 of heat sink module 1915 may be taller than the fin(s) 117 of heat sink module 115; for example, compare FIG. 19C to FIG. 4. Aside from heat sink module 1915 being taller than heat sink module 115, an important difference between these two different heat sink modules, is that heat sink module 1915 comprises upper-cavity 2001; whereas, heat sink module 115 does not comprise nor include any such comparable internal upper-cavity for housing a driver. In some embodiments, a top (upper) portion (region) of heat sink module 1915 may be configured for (removable) attachment to lid 1901. In some embodiments, a bottom exterior portion of heat sink module 1915 may have male threads that are configured to (removable) complementary attachment to female threads located on interior (inside) cylindrical surface of holder 125. To the extent prior discussions of heat sink module 115 do not conflict with a discussion of heat sink module 1915, the prior discussions of heat sink module 115 may be applied to heat sink module 1915. See e.g., FIG. 19A, FIG. 19B, FIG. 19C, FIG. 19D, FIG. 19E, FIG. 19F, FIG. 19G, FIG. 20A, FIG. 20B, FIG. 21, FIG. 22A, and FIG. 22B for heat sink module 1915.

FIG. 20A is a (top-down) cross-sectional view through integrated-lighting-module 1900, but without showing its driver 2011 within a volume 2001 (upper-cavity 2001) of its heat sink module 1915 so that at least a portion of upper-cavity 2001 may be more visible in FIG. 20A. FIG. 20A (and FIG. 20B) show how heat sink module 1915 may comprise both upper-cavity 2001 and a lower-cavity 2003 that are physically separated from each other by floor/ceiling 2005. In some embodiments, heat sink module 1915 may comprise, upper-cavity 2001, lower-cavity 2003, and floor/ceiling 2005. In some embodiments, upper-cavity 2001 may be configured to house, hold, retain, and/or receive at least one driver 2011 therein. In some embodiments, lower-cavity 2003 may be configured to house, hold, retain, and/or receive at least one LED light chip 701 and/or a holder-of-LED 2102 therein. In some embodiments, lower-cavity 2003 may be configured to house, hold, retain, and/or receive at least a portion (or most of) of at least one reflector 703 therein. In some embodiments, a volume of upper-cavity 2001 may be larger than a volume of lower-cavity 2003. In some embodiments, upper-cavity 2001 may be taller than lower-cavity 2003. In some embodiments, upper-cavity 2001 may be almost twice as tall as lower-cavity 2003. In some embodiments, a ratio of a height of upper-cavity 2001 to a height of lower-cavity 2003 may be 1.8 (plus or minus 0.1). In some embodiments, running exteriorly of upper-cavity 2001 and adjacent and proximate to upper-cavity 2001 may fin(s) 117; whereas, fin(s) 117 may not extend downwards to be adjacent or proximate to lower-cavity 2003, because the fin(s) 117 may end (terminate) about where floor/ceiling 2005 is located, as shown in FIG. 20A. In some embodiments, on an exterior of lower-cavity 2003 there may be no fin(s) 117. In some embodiments, upper-cavity 2001 may have a single largest (biggest) opening at a top of heat sink module 1915, which during assembly of integrated-lighting-module 1900 may permit driver 2011 to be inserted into upper-cavity 2001 and/or mounted into upper-cavity 2001. In some embodiments, lower-cavity 2003 may have a single largest (biggest) opening at a bottom of heat sink module 1915, which during assembly of integrated-lighting-module 1900 may permit LED light chip 701, holder-of-LED 2102, and/or a portion of reflector 703 to be inserted into lower-cavity 2003 and/or mounted into lower-cavity 2003. In some embodiments, the single largest (biggest) opening of upper-cavity 2001 may be disposed opposite from the single largest (biggest) opening of lower-cavity 2003. In some embodiments, the single largest (biggest) opening of upper-cavity 2001 and the single largest (biggest) opening of lower-cavity 2003 may be facing opposite from each other. In some embodiments, from the perspective of entering upper-cavity 2001 from its single largest (biggest) opening, floor/ceiling 2005 may be a floor; whereas, from the perspective of entering lower-cavity 2003 from its single largest (biggest) opening, then floor/ceiling 2005 may be a ceiling. In some embodiments, floor/ceiling 2005 may comprise one or more smaller opening(s) (hole[s] and/or aperture[s]) that are configured for the passage of wire(s) from driver 2011 in upper-cavity 2001 to LED light chip 701 in lower-cavity 2003; wherein these opening(s) (hole[s] and/or aperture[s]) are smaller than the single largest (biggest) opening of upper-cavity 2001 and/or are smaller than the single largest (biggest) opening of lower-cavity 2003. In some embodiments, located on floor/ceiling 2005 may be at least one structure 2007. In some embodiments heat sink module 1915 and/or floor/ceiling 2005 may comprise at least one structure 2007. In some embodiments, structure 2007 may be located on a top of floor/ceiling 2005. In some embodiments, structure 2007 may be an anchor location for attaching driver 2011 within upper-cavity 2001 of heat sink module 1915. In some embodiments, structure 2007 may be configured to receive at least a portion of a mechanical fastener, such as, but not limited to, a screw, a bolt, a pin, a rod, a dowel, and/or the like. In some embodiments, structure 2007 may comprise an aperture (and/or a hole) that is configured to receive at least a portion of the mechanical fastener. In some embodiments, structure 2007 may be a standoff keeping driver 2011 a minimum fixed distance away from touching floor/ceiling 2005, which in turn may facilitate desired heat transfer and/or minimize overheating of driver 2011. In some embodiments, the presence of upper-cavity 2001 in heat sink module 1915 may interrupt continuity of at least some fin(s) 117, with respect to such fin(s) 117 running linearly from one side of heat sink module 1915 to its opposite side (see also FIG. 22A which may show this relationship better than in FIG. 20A). In some embodiments, upper-cavity 2001 may not be of a cylindrical shape. Whereas, lower-cavity 2003 may be a cylindrical shape (see also FIG. 22B which may show this cylindrical shape of lower-cavity 2003 better than in FIG. 20A). In some embodiments, a shape of upper-cavity 2001 may be rectangular (rectangular prism shaped) but with the shorter ends (shorter sides) both being rounded (see also FIG. 22A which may show this relationship better than in FIG. 20A). To reiterate, this paragraph is largely discussing FIG. 20A.

FIG. 20B is a cross-sectional view through integrated-lighting-module 1900, but now with showing its driver 2011 within its volume 2001 (upper-cavity 2001) of its heat sink module 1915. FIG. 20B shows at least some portion of upper-cavity 2001 may be occupied by at least one driver 2011.

FIG. 21 is an exploded perspective view of integrated-lighting-module 1900. FIG. 21 shows how when integrated-lighting-module 1900 may be assembled, how LED chip 701, holder-of-LED 2102, and at least a portion of reflector 703 may be housed within lower-cavity 2003 of heat sink module 1915, when holder 125 may be removably attached to a bottom of heat sink module 1915. Similarly, FIG. 21 shows how when integrated-lighting-module 1900 may be assembled, how driver 2011 may be housed within upper-cavity 2001 of heat sink module 1915 and with upper-cavity 2001 then being capped off and sealed up by lid 1901 being (removably) attached to a top of heat sink module 1915.

Continuing discussing FIG. 21, in some embodiments, integrated-lighting-module 1900, heat sink module 1915, and/or LED chip 701 may comprise holder-of-LED 2102. In some embodiments, holder-of-LED 2102 may be a member that is configured to hold LED chip 701. In some embodiments, holder-of-LED 2102 may be configured to attach to a bottom of floor/ceiling 2005. In some embodiments, holder-of-LED 2102 may be attached to the bottom of floor/ceiling 2005.

Continuing discussing FIG. 21, in some embodiments, integrated-lighting-module 1900 and/or lid 1901 may comprise at least one selector 2103. In some embodiments, selector 2103 may be a switch, a button, a dial, a slide, and/or other input means that is configured to select and/or change a color and/or a light temperature with respect to the light emitted from LED chip 701. For example, light temperatures are often reported in Kelvin. In some embodiments, selector 2103 may be operatively connected (e.g., via wire[s]) to LED chip 701 and/or to driver 2011. In some embodiments, selector 2103 may be accessible by a user from a top of lid 1901. Some embodiments of integrated-lighting-module 1900 may be without selector 2103.

FIG. 22A is a top perspective view of just the heat sink module 1915 of integrated-lighting-module 1900. The rectangular prism shape, but with curved shorter sides, of upper-cavity 2001 is visible in FIG. 22A. Additionally, a top of floor/ceiling 2005 is shown in FIG. 22A, along with hole(s) and/or aperture(s) in floor/ceiling 2005 that may be used for passage of wire(s) down into lower-cavity 2003 where LED chip 701 may be located. Also, FIG. 22A shows structure(s) 2007 extending (protruding) upwards from floor/ceiling 2005 (by a fixed and finite distance into upper-cavity 2001), wherein these structure(s) 2007 may be configured for receiving mechanical fasteners to anchor, attach, and/or secure driver 2011 to structure(s) 2007; and/or these structure(s) 2007 may function as standoffs keeping driver 2011 from physically touching a top of floor/ceiling 2005. FIG. 22A also shows how fin(s) 117 are on at least some of an exterior of upper-cavity 2001. FIG. 22A shows how the fin(s) 117 on one side of heat sink module 1915 match up with fin(s) 117 on the other opposite side, in a 1:1 manner and in a linear manner. Further, FIG. 22A shows how a presence of upper-cavity 2001 in heat sink module 1915 interrupts continuity of at least some fin(s) 117, with respect to such fin(s) 117 running without interruption from one side of heat sink module 1915 to an opposite side of heat sink module 1915. In other words, had upper-cavity 2001 been omitted, then fin(s) 117 could run from one side of heat sink module 1915 to its opposite side without interruption. However, because upper-cavity 2001 is present in heat sink module 1915, then at least some fin(s) 117 are interrupted from running from one side of heat sink module 1915 to its opposite side. In some embodiments, there may be two oppositely disposed fins 117 (2217*a*), with each such fin 117 (2217*a*) being located one an opposite side of upper-cavity 2001, i.e., upper-cavity 2001 may be located between these two fins 117 (2217*a*), wherein continuity of each of these two fins 117 (2217*a*) is not interrupted by the presence of upper-cavity 2001; whereas, fins 117 (2217*b*) located between these two outer fins 117 (2217*a*) may have their continuity interrupted by the presence of upper-cavity 2001. In some embodiments, these two outer fins 117 (2217*a*) may form two opposing sidewalls of upper-cavity 2001.

Figure 22B:
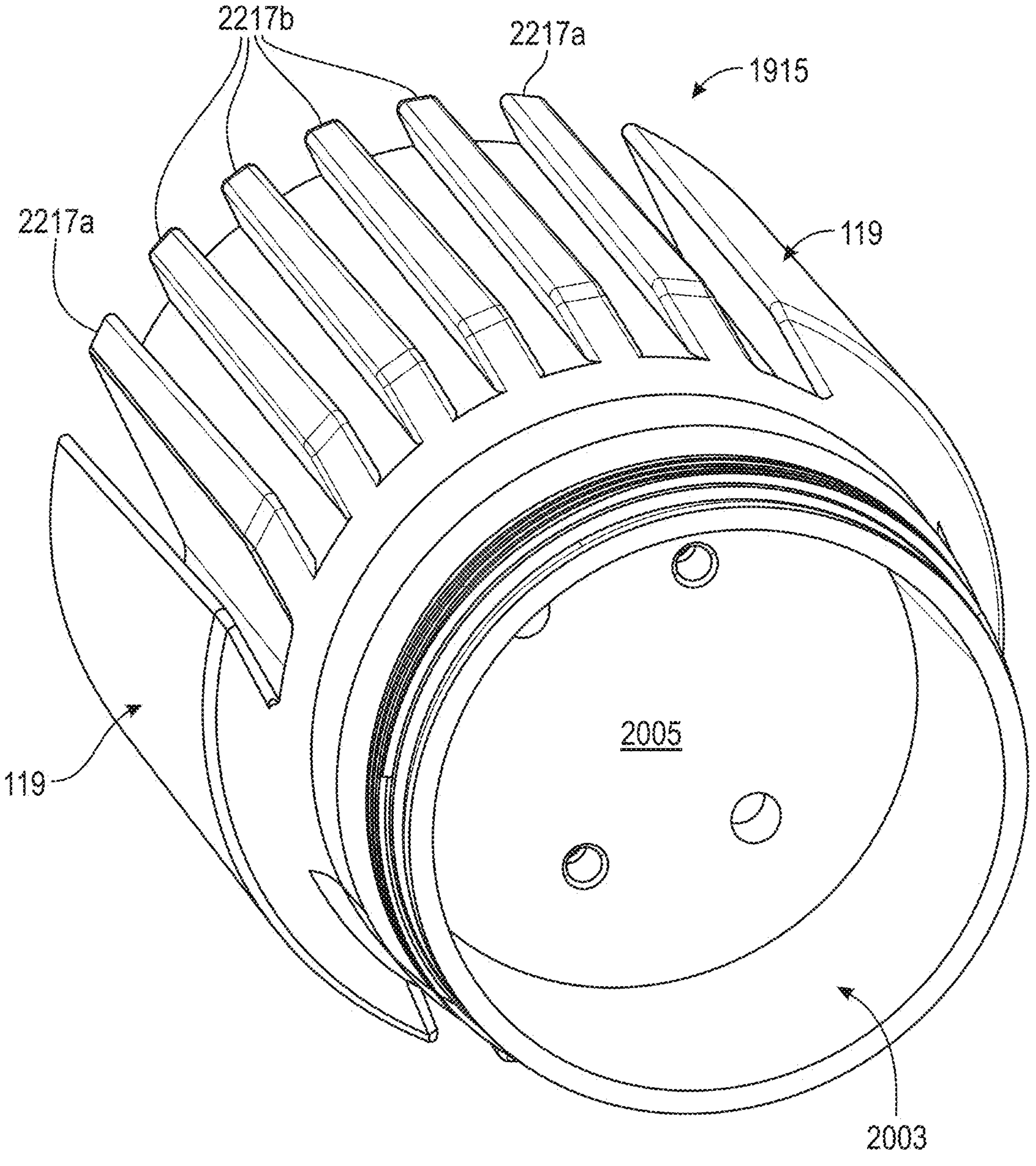
FIG. 22B is a bottom perspective view of just the heat sink module of the integrated lighting module shown in FIG. 19A.

FIG. 22B is a bottom perspective view of just the heat sink module 1915 of integrated-lighting-module 1900. The circular and/or cylindrical shape of lower-cavity 2003 is visible in FIG. 22B. Additionally, a bottom of floor/ceiling 2005 is shown in FIG. 22B, along with hole(s) and/or aperture(s) in floor/ceiling 2005 that may be used for passage of wire(s) and/or for receiving mechanical fasteners to anchor, attach, and/or secure holder-of-LED 2102 (which may be retaining LED chip 701) to floor/ceiling 2005. Further, FIG. 22B shows male threads on an exterior bottom portion of 1915, that may be configured for (removable) attachment to complementary female threads located on an interior (inside) section of holder 125. FIG. 22B also shows how fin(s) 117 do not extend all the way downwards to be on an exterior of lower-cavity 2003.

In some embodiments, the driver may be integrated into the LED chip, which may be known as "driver on board" (DOB). In such embodiments, both the driver and the LED(s) are integrated into the same chip, i.e., into the same PCB (printed circuit board). In such embodiments, have a separate non-integrated driver, such as, but not limited to, driver 2011, may be optional or omitted. In some embodiments, LED chip 701 may comprise and/or may include an integrated driver, that is integrated into the same chip (PCB [printed circuit board]) as the LED.

Figure 23A:
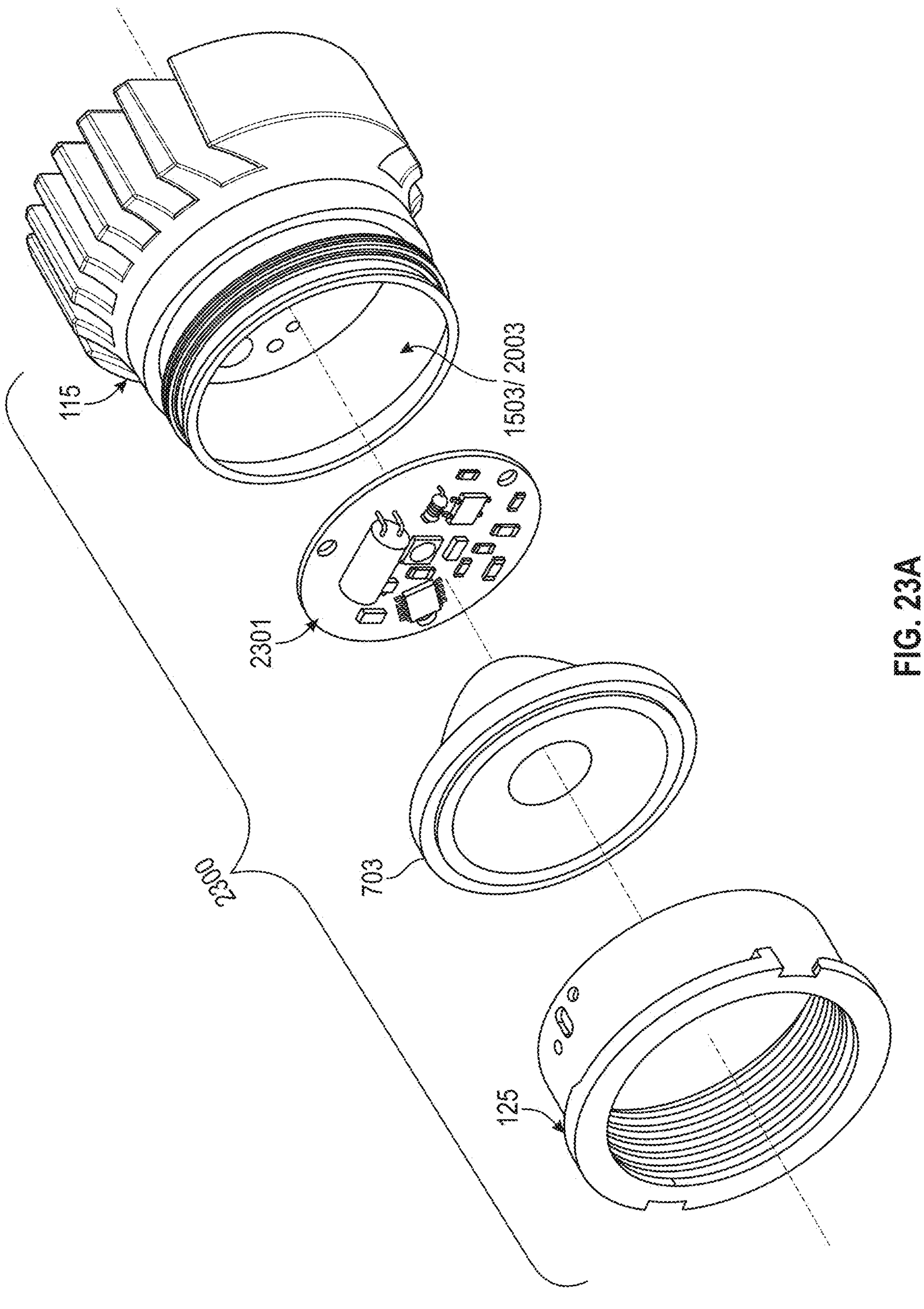
FIG. 23A is a bottom perspective exploded view (i.e., looking from the bottom towards the top) of an integrated-lighting-module that comprise at least one LED-chip-with-integrated-driver.
Figure 23B:
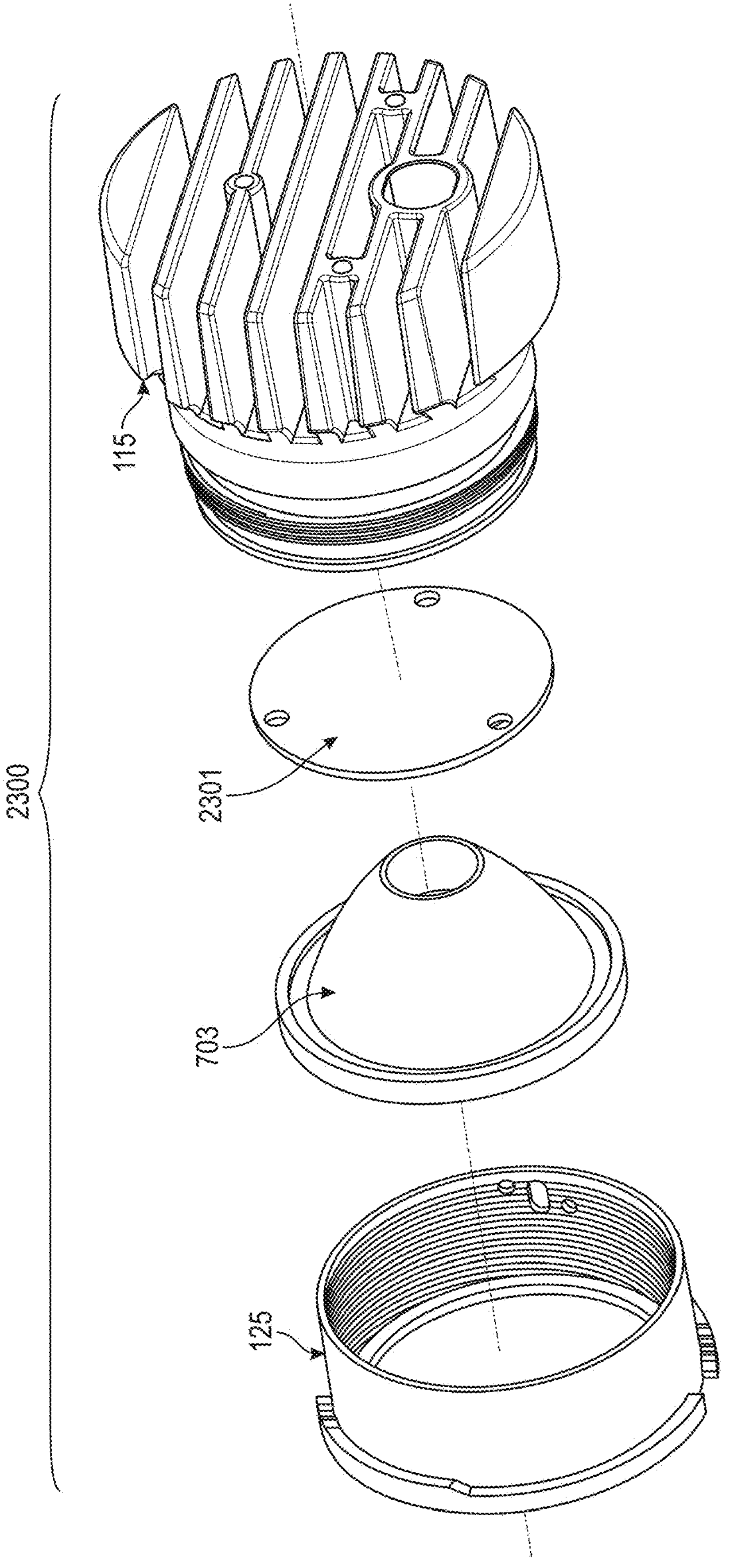
FIG. 23B is a top perspective exploded view (i.e., looking from the top towards the bottom) of the integrated-lighting-module from FIG. 23B.

FIG. 23A is a bottom perspective exploded view (i.e., looking from the bottom towards the top) of an integrated-lighting-module 2300. FIG. 23B is a top perspective exploded view (i.e., looking from the top towards the bottom) of integrated-lighting-module 2300. In some embodiments, integrated-lighting-module 2300 may at least comprise at least one LED-chip-with-integrated-driver 2301. In some embodiments, LED-chip-with-integrated-driver 2301 may be a single chip (single PCB [printed circuit board]) that comprises both at least one LED (light emitting diode) and at least one driver (transformer). In some embodiments of LED-chip-with-integrated-driver 2301 its at least one driver and its at least one LED(s) may both be integrated and/or part of a same single chip and/or a same single PCB (printed circuit board). In some embodiments, integrated-lighting-module 2300 may comprise: heat sink module 115, holder 125, and reflector 703. In some embodiments, integrated-lighting-module 2300 may comprise: heat sink module 115, holder 125, and LED-chip-with-integrated-driver 2301. In some embodiments, integrated-lighting-module 2300 may comprise: heat sink module 115, holder 125, reflector 703, and LED-chip-with-integrated-driver 2301. In some embodiments, with respect to assembled integrated-lighting-module 2300, LED-chip-with-integrated-driver 2301 may be retained within lower-cavity 1503 (volume 1503) of heat sink module 115. In some embodiments, LED chip 701 may be replaced with LED-chip-with-integrated-driver 2301. For example, in FIG. 15 LED chip 701 may be replaced with LED-chip-with-integrated-driver 2301.

In some embodiments, integrated-lighting-module 2300 may not comprise nor include: a driver cap (such as, driver cap 101); a separate non-integrated driver (such as, driver 2011); an upper cavity (volume) within a heat sink module that is configured for housing a driver (e.g., there may be no upper-cavity 2001 in the heat sink module 115 of integrated-lighting-module 2300).

In some embodiments, a driver cap (such as, driver cap 101); a separate non-integrated driver (such as, driver 2011); and/or an upper cavity (volume) within a heat sink module that is configured for housing a driver (such as, upper-cavity 2001) may be optional or omitted in a given embodiment of integrated-lighting-module 2300. In some embodiments, the heat sink module of integrated-lighting-module 2300 may be heat sink module 1915 instead of heat sink module 115.

Figure 24A:
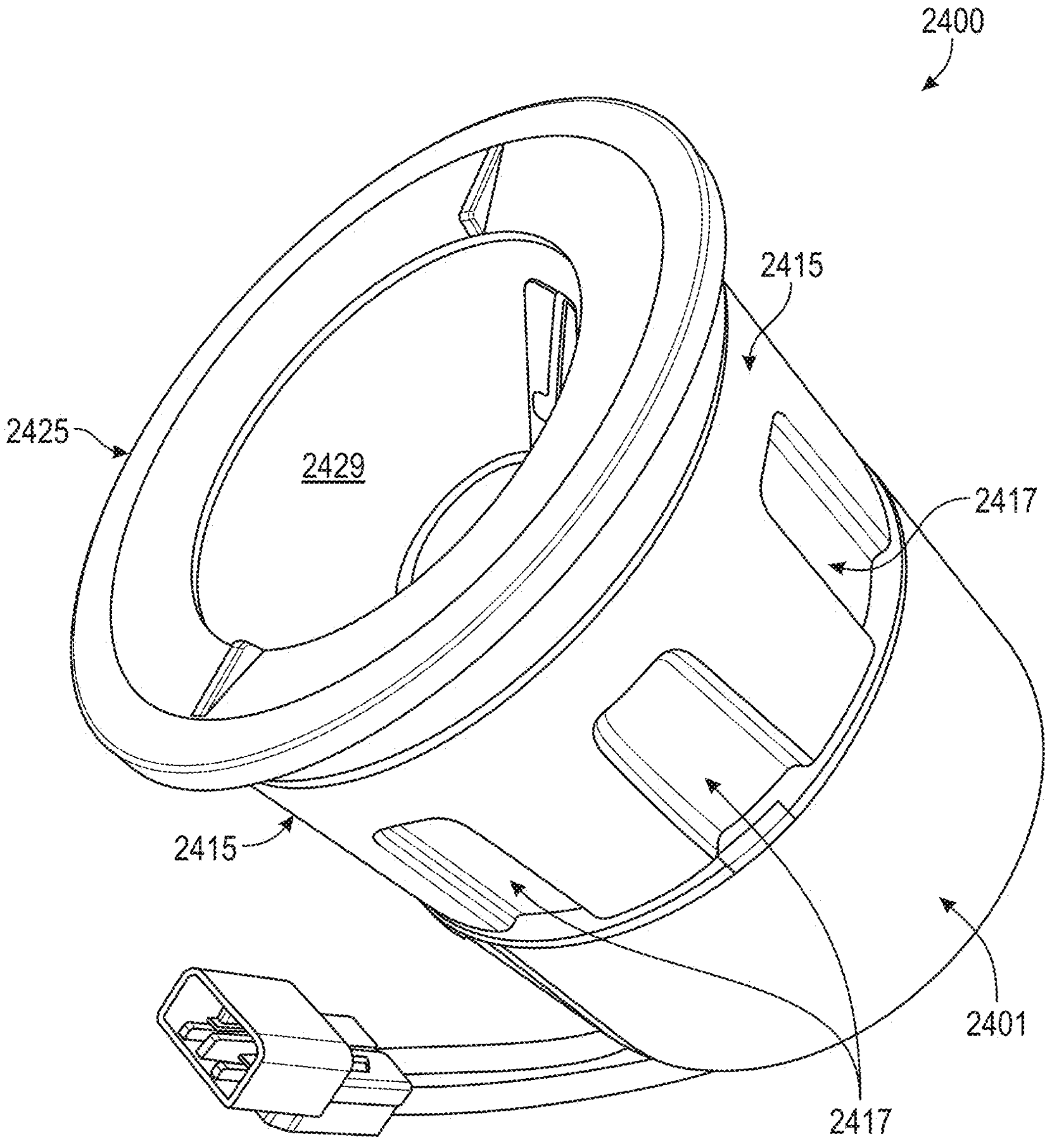
FIG. 24A (Prior Art)
FIG. 24A is bottom perspective view of a prior art integrated lighting module.
Figure 24B:
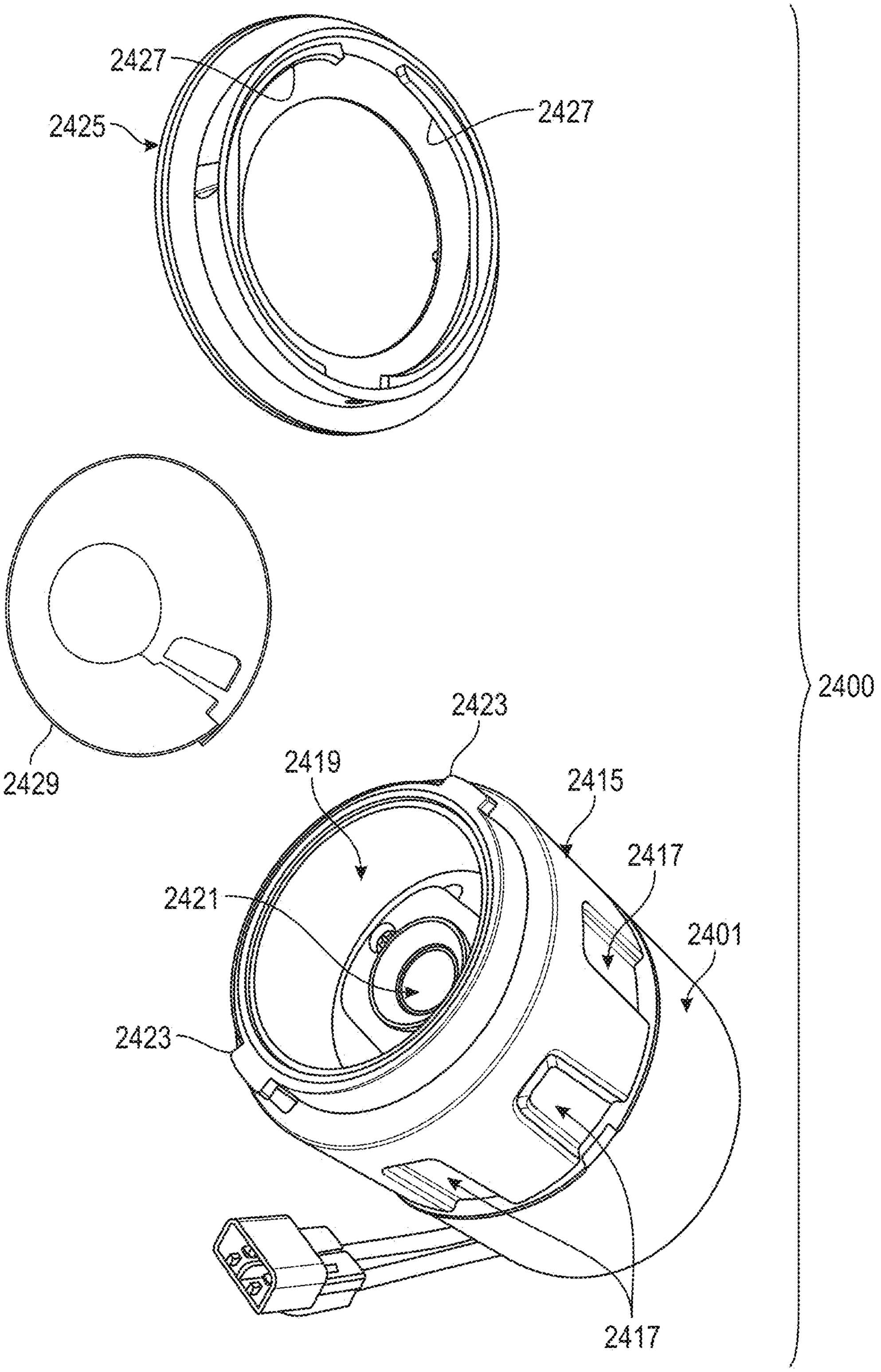
FIG. 24B (Prior Art)
FIG. 24B is a view of the prior art integrated lighting module of FIG. 24A showing with its holder and its reflector dissembled from its heat sink.

FIG. 24A and FIG. 24B are of a prior-art-integrated-lighting-module 2400. FIG. 24A shows a bottom perspective view of prior-art-integrated-lighting-module 2400. FIG. 24B shows prior-art-integrated-lighting-module 2400 in a partially dissembled configuration, showing its paper-reflector 2429 removed from between its holder 2425 and its non-finned-heat-sink 2415; and showing its LED 2421 attached to a top of its bottom-cavity 2419 of its non-finned-heat-sink 2415. Prior-art-integrated-lighting-module 2400 is prior art to integrated-lighting-module 1800, integrated-lighting-module 1900, and integrated-lighting-module 2300. Prior-art-integrated-lighting-module 2400 has a driver-cap 2401, with a driver inside, attached and on top off of its non-finned-heat-sink 2415; and attached to a bottom of its non-finned-heat-sink 2415 is its holder 2425. The paper-reflector 2429 of prior-art-integrated-lighting-module 2400 is retained between its non-finned-heat-sink 2415 and its holder 2425. The outermost outside diameter of prior-art-integrated-lighting-module 2400 is substantially uniform, constant, and consistent across both its driver-cap 2401 and its non-finned-heat-sink 2415 (except at undulations 2417 of its non-finned-heat-sink 2415). The driver of prior-art-integrated-lighting-module 2400 is held entirely within its outside of its driver-cap 2401. Note, the driver of prior-art-integrated-lighting-module 2400 is held entirely outside of its non-finned-heat-sink 2415.

Non-finned-heat-sink 2415 is metal and has a uniform, consistent, and constant outermost outside diameter (except at undulations 2417 of its non-finned-heat-sink 2415). The outermost outside diameter of non-finned-heat-sink 2415 does not smoothly taper, nor taper at all, towards its bottom (disposed away from its driver-cap 2401), to a smaller outermost outside diameter. Non-finned-heat-sink 2415 has no fins for heat dissipation, but instead has undulations 2417. The undulations 2417 are shallow depressions on an exterior surface of non-finned-heat-sink 2415; wherein shallow here is two (2) millimeters (mm) or less. The undulations 2417, of non-finned-heat-sink 2415, are arranged in a radially symmetrical manner about an axial centerline of prior-art-integrated-lighting-module 2400. An outside diameter across two oppositely disposed undulations 2417 is about four (4) mm less than the outermost outside diameter of non-finned-heat-sink 2415. The distance between any two oppositely disposed undulations 2417 is the same (because of its radial symmetry). The undulations 2417 are less effective at heat dissipation as compared to fins because the undulations 2417 have much less surface area than fins. Non-finned-heat-sink 2415 has a bottom-cavity 2419. Attached to a top of this bottom-cavity 2419 is LED 2421. Proximate and adjacent to at least some of bottom-cavity 2419, on the exterior of non-finned-heat-sink 2415 are the undulations 2417 (for example, if one moves linearly and orthogonally away from the axial centerline from within bottom-cavity 2419). Bottom-cavity 2419 also fits paper-reflector 2429. Paper-reflector 2429 is a reflector made out of paper. A bottom most portion of non-finned-heat-sink 2415 has no exterior male threads, but instead has a pair of oppositely located teeth (tabs) 2423, that are for engaging an underside of two half-arc flanges (ledges) 2427 of the holder 2425. See e.g., FIG. 24A and FIG. 24B.

Holder 2425 is made of metal. Holder 2425 has no female threads. Holder 2425 has no threads. On an inside (interior) surface holder 2425 does have a pair of two oppositely disposed half-arc flanges (ledges) 2427. The teeth (tabs) 2423 (of non-finned-heat-sink 2415) engage an underside (bottom) of these two oppositely disposed half-arc flanges (ledges) 2427 for attaching holder 2425 to non-finned-heat-sink 2415. Attachment between holder 2415 and non-finned-heat-sink 2415 do not use any threaded attachment means. See e.g., FIG. 24A and FIG. 24B.

Figure 25A:
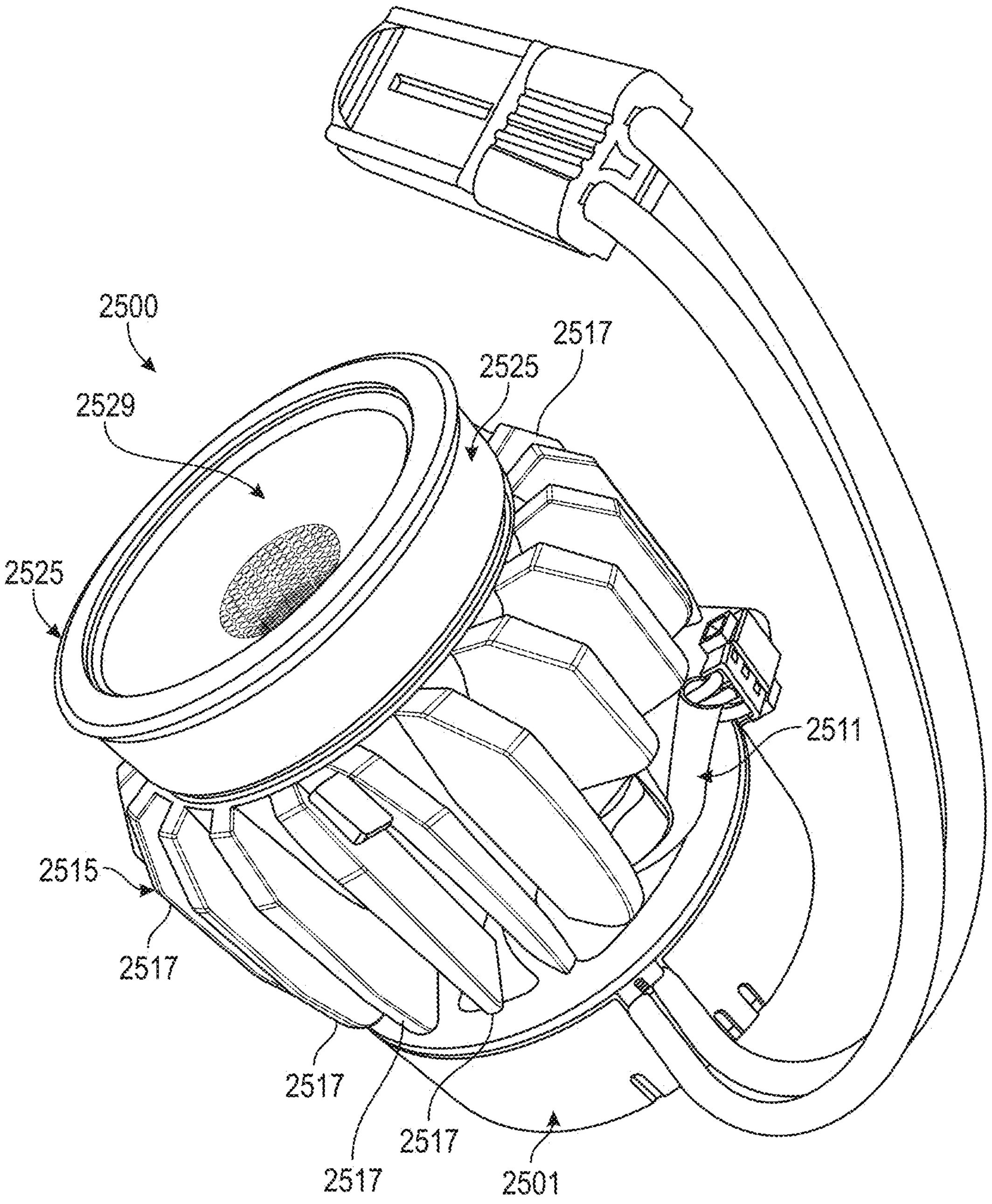
FIG. 25A (Prior Art)
FIG. 25A is a bottom perspective view of a prior art integrated lighting module.
Figure 25B:
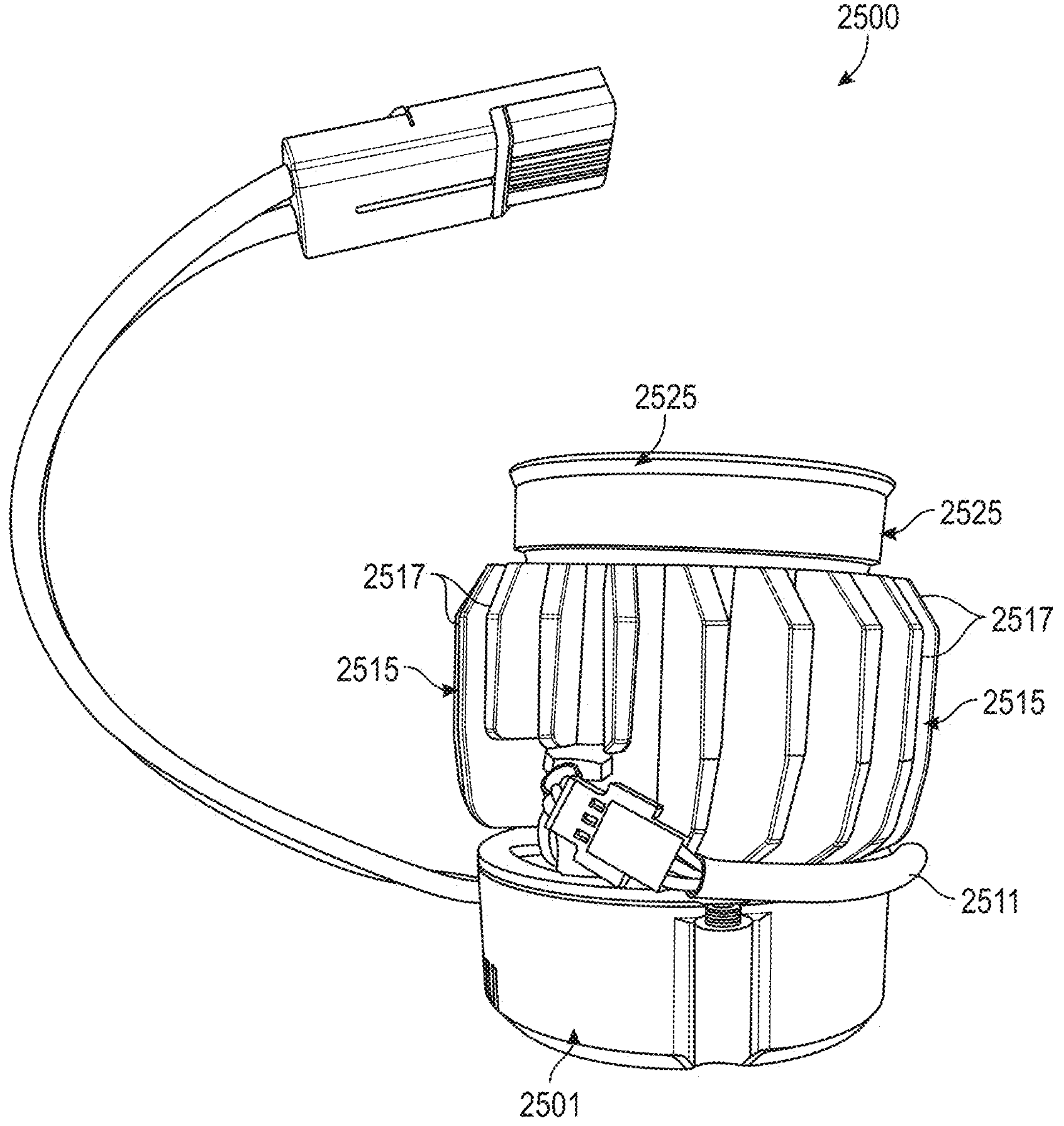
FIG. 25B (Prior Art)
FIG. 25B is a side view of the prior art integrated lighting module of FIG. 25A.
Figure 25C:
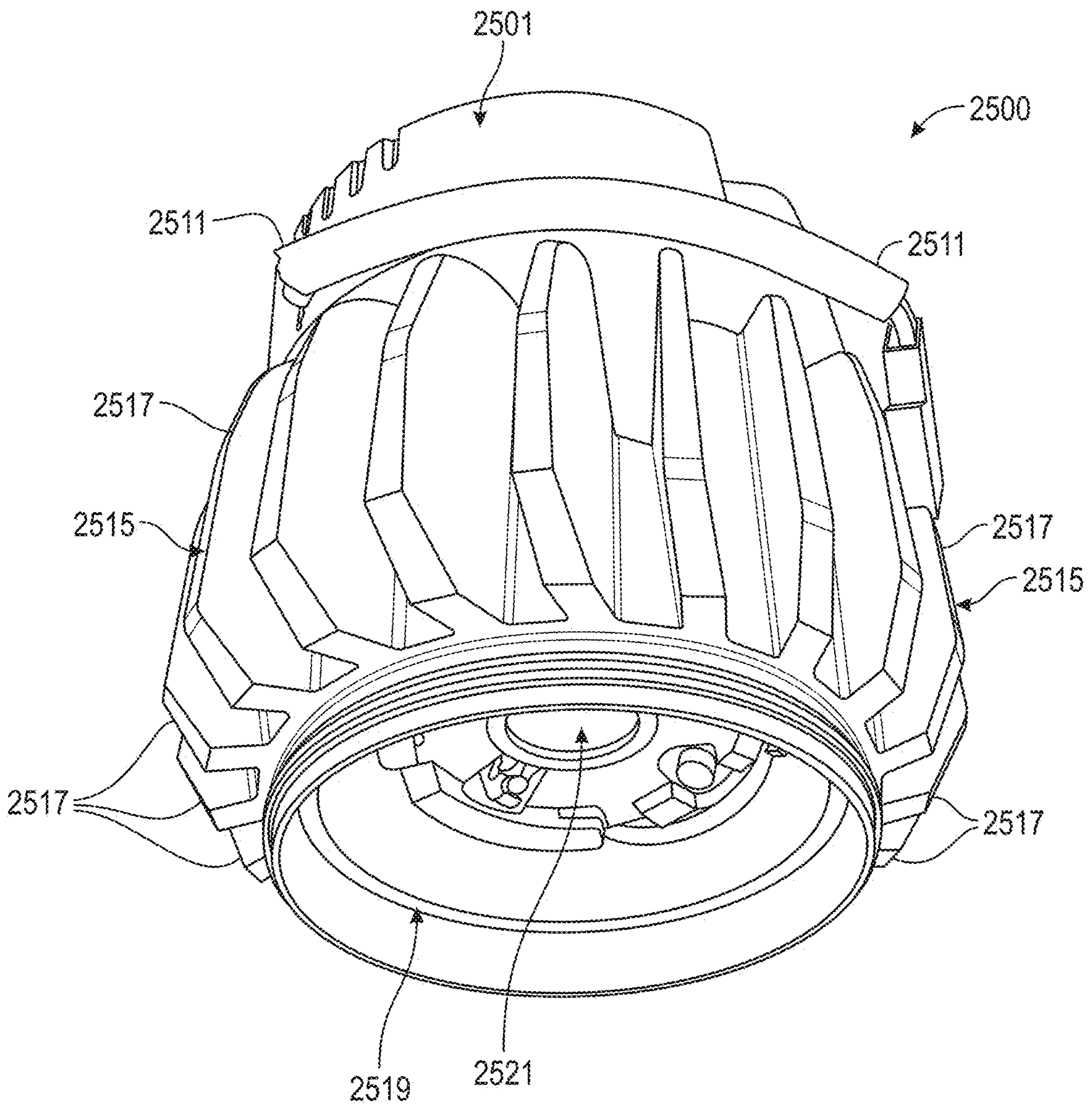
FIG. 25C (Prior Art)
FIG. 25C is another bottom perspective view of the prior art integrated lighting module of FIG. 25A with its holder and its reflector removed from its heat sink.

FIG. 25A and FIG. 25B are of a prior-art-integrated-lighting-module 2500. FIG. 25A shows a bottom perspective view of prior-art-integrated-lighting-module 2500. FIG. 25B shows a side perspective view of prior-art-integrated-lighting-module 2500. FIG. 25C shows prior-art-integrated-lighting-module 2500 in a partially dissembled configuration, showing its reflector 2429 removed from between its holder 2425 and its trapezoidal-finned-heat-sink 2515; and showing its LED 2521 attached to a top of its bottom-cavity 2519 of its trapezoidal-finned-heat-sink 2515. Prior-art-integrated-lighting-module 2500 is prior art to integrated-lighting-module 1800, integrated-lighting-module 1900, and integrated-lighting-module 2300. Prior-art-integrated-lighting-module 2500 has a driver-cap 2501, with a driver inside, attached and on top off of its trapezoidal-finned-heat-sink 2515; and attached to a bottom of its trapezoidal-finned-heat-sink 2515 is its holder 2525. The reflector 2529 of prior-art-integrated-lighting-module 2500 is retained between its trapezoidal-finned-heat-sink 2515 and its holder 2525. The outermost outside diameter of prior-art-integrated-lighting-module 2500 is not uniform, constant, nor consistent across both its driver-cap 2501 and its trapezoidal-finned-heat-sink 2515. Because the fins 2517, of trapezoidal-finned-heat-sink 2515, have a generally trapezoidal shape (on their exteriors), the outermost outside diameter of trapezoidal-finned-heat-sink 2515 varies across a height (length) of trapezoidal-finned-heat-sink 2515, with that outermost outside diameter of trapezoidal-finned-heat-sink 2515 getting smaller (narrower) at both of its ends (top and bottom) of trapezoidal-finned-heat-sink 2515. The outermost outside diameter of trapezoidal-finned-heat-sink 2515 is larger than the outermost outside diameter of driver-cap 2501. The outer most outside diameter of trapezoidal-finned-heat-sink 2515 tapers (gets narrower) at both its bottom and at its top, i.e., tapers about both of its ends. The driver of prior-art-integrated-lighting-module 2500 is held entirely within its driver-cap 2501. Note, the driver of prior-art-integrated-lighting-module 2500 is held entirely outside of its trapezoidal-finned-heat-sink 2515. In prior-art-integrated-lighting-module 2500, from a side of driver-cap 2501 there is exterior-wiring 2511 that runs into a top of trapezoidal-finned-heat-sink 2515 to provide electrical power to its LED 2521. This exterior-wiring 2511 runs on an outside exterior of driver-cap 2501 and of trapezoidal-finned-heat-sink 2515. In prior-art-integrated-lighting-module 2500, there is an air gap between its driver-cap 2501 and its trapezoidal-finned-heat-sink 2515 that is created by a central bolt that is coaxial with the axial centerline of prior-art-integrated-lighting-module 2500.

Trapezoidal-finned-heat-sink 2515 is metal. The swept-fins 2517, of trapezoidal-finned-heat-sink 2515, extend in a radial manner about and away from an axial centerline of prior-art-integrated-lighting-module 2500. The swept-fins 2517, of trapezoidal-finned-heat-sink 2515, are also swept, i.e., these swept-fins 2517 do not extend linearly and orthogonally away from the axial centerline, but rather extend at an angle of less than ninety (90) degrees. The swept-fins 2517, of trapezoidal-finned-heat-sink 2515, are not parallel with each other. The closer any pair of adjacent swept-fins 2517 are to the axial centerline the closer those two swept-fins 2517 are to each other; i.e., the further any pair of adjacent swept-fins 2517 are from the axial centerline the further apart are those two swept-fins 2517 from to each other. The distance between any two oppositely disposed swept-fins 2517 is the same. Trapezoidal-finned-heat-sink 2515 has a bottom-cavity 2519. Attached to a top of this bottom-cavity 2519 is LED 2521. Proximate and adjacent to at least some of bottom-cavity 2519, on the exterior of trapezoidal-finned-heat-sink 2515 are the swept-fins 2517 (for example, with respect to an imaginary line moving linearly and orthogonally away from the axial centerline from within bottom-cavity 2519 then that imaginary line with cross and/or intersect at least some of the swept-fins 2517). Bottom-cavity 2519 also fits reflector 2529. Holder 2525 is made of metal. See e.g., FIG. 25A, FIG. 25B, and FIG. 25C.

Note, integrated-lighting-module 2400 and/or integrated-lighting-module 2500 may be prior art to integrated-lighting-module 1900 and/or to integrated-lighting-module 2300; however, integrated-lighting-module 2400 and integrated-lighting-module 2500 are not prior art to integrated-lighting-module 100 and/or to the teachings of U.S. patents: D935082, U.S. Pat. Nos. 10,914,465, 11,092,326, 11,300,259, and 11,466,849, as integrated-lighting-module 100 and the teachings of these U.S. patents have effective priority dates that predate the effective priority dates of integrated-lighting-module 2400 and of integrated-lighting-module 2500.

With respect to prior art reference of utility U.S. Pat. No. 8,680,755 to Lim et al. (hereinafter, "Lim"), this prior art reference differs from integrated-lighting-module 100, 1800, 1900, and 2300. Lim uses and teaches a standard male threaded light bulb base (which Lim refers to as a "socket 700" which is a bit misleading as its technically a base for fitting into a socket and not a socket itself) for removable attachment to complementary sized receiving socket (such as, a medium "E26" sized socket/base) for receiving electrical power to Lim's lighting device. Whereas, integrated-lighting-module 100, 1800, 1900, and 2300 do not use any such male threaded light bulb base nor socket for receiving electrical power to integrated-lighting-module 100, 1800, and 2300. Integrated-lighting-module 100, 1800, 1900, and 2300 are typically wired to source electrical power (e.g., ROMEX wiring) using wire nuts and/or WAGO connectors (or the like electrical connector). Additionally, Lim's heat sink 400 utilizes a radial configuration for Lim's fins 450; whereas, integrated-lighting-module 100, 1800, 1900, and 2300 utilize non-radially configured fins 117 (2117) (integrated-lighting-module 100, 1800, 1900, and 2300 may utilize parallel running fins 117 [2117]). Further, Lim's heat sink 400, from a side view, has an hourglass shape (profile); whereas, a side view shape (profile) of the heat sinks 115, 1815, and/or 1915, of integrated-lighting-module 100, 1800, 1900, and 2300 are not hourglass glass shaped. Further still, Lim's lighting device is configured to emitting indirect light, in a direction that is orthogonally away from a central longitude line or a central axial line of Lim's lighting device (see e.g., Lim's FIG. 3 and FIG. 4, Lim's light source module 200); whereas, the light source (LED) 701 of integrated-lighting-module 100, 1800, 1900, and 2300 do not directly emit light a direction that is orthogonally away from a central longitude line or a central axial line of integrated-lighting-module 100, 1800, 1900, and 2300. The light emitted by the light source (LED) 701 of integrated-lighting-module 100, 1800, 1900, and 2300 is downwards, in a direction that is parallel with the central longitude line or the central axial line of integrated-lighting-module 100, 1800, 1900, and 2300. The light emitted by Lim's light source module 200 of Lim's lighting device is not downwards, in a direction that is parallel with the central longitude line or the central axial line of Lim's lighting device. The light emitted by Lim's light source module 200 of Lim's lighting device is not in a direction that is parallel with the central longitude line or the central axial line of Lim's lighting device. Similarly, because of Lim's light source module 200 orthogonal (sidewise) orientation, Lim's complementary reflector 300 is very different from reflector 703 of integrated-lighting-module 100, 1800, 1900, and 2300. Lim's reflector 300 has a three-legged table shape, where each such leg is a flat surface configured to cover over a particular side facing (orthogonal) LED of Lim's source module 200. Whereas, reflector 703 of integrated-lighting-module 100, 1800, 1900, and 2300, does not have a three-legged table shape. Reflector 703 of integrated-lighting-module 100, 1800, 1900, and 2300, has a conical frustum shape (that is complementary for downward emitted light).

With respect to prior art reference of U.S. published utility patent application of publication number 2017/0051880 to Joye et al. (hereinafter, "Joye"), this prior art reference differs from integrated-lighting-module 100, 1800, 1900, and 2300. Joye teaches and uses a fixed bipin structure of Joye pins 1410 or Joye pogo pins 1910 for receiving electrical power from an external power source to Joye's lamp 1000. Whereas, integrated-lighting-module 100, 1800, 1900, and 2300 do not utilize a fixed bipin structure for receiving electrical power from an external power source. Integrated-lighting-module 100, 1800, 1900, and 2300 do not utilize bipins, nor pogo pins. Integrated-lighting-module 100, 1800, 1900, and 2300 are without bipins, including without pogo pins. One embodiment of Joye's lamp 1000 utilizes a transfer disk 2000 (see aspects of this Joye embodiment in Joye FIG. 16 to Joye FIG. 22), housed within Joye's housing base 1200, wherein the Joye transfer disk 2000 is configured for receiving external electrical power and then transferring (communicating) such received electrical power to Joye's driver 1900 (via Joye pogo pins 1910 mating with Joye's transfer disk 2000). Whereas, integrated-lighting-module 100, 1800, 1900, and 2300 have no such transfer disk. Additionally, Joye's heat-sink housing 1600 is preferably a truncated cup shape (i.e., essentially a hemisphere whose apex is removed in favor of a flat surface); whereas, the heat sinks 115, 1815, and/or 1915, of integrated-lighting-module 100, 1800, 1900, and 2300 are not such a truncated cup shape. The smallest diameter of Joye's heat-sink housing 1600 is at its top (closer to Joye's housing base 1200 and disposed away from Joye's retainer ring 1800); and the largest diameter of Joye's heat-sink housing 1600 is at its bottom (closer to Joye's retainer ring 1800 and disposed away from Joye's housing base 1200). Whereas, the smallest diameters of the heat sinks 115, 1815, and/or 1915, of integrated-lighting-module 100, 1800, 1900, and 2300, are at their bottoms (closer to their holder 125 and/or 1825); and the largest diameters of the heat sinks 115, 1815, and/or 1915, of integrated-lighting-module 100, 1800, 1900, and 2300, are at their tops (disposed away from and furthest from their holder 125 and/or 1825). Further, Joye's heat-sink housing 1600 has no external fins; rather, Joye's heat-sink housing 1600 externally has radially organized external bumps or nubs. Whereas, the heat sinks 115, 1815, and/or 1915, of integrated-lighting-module 100, 1800, 1900, and 2300, do not have such radially organized external bumps or nubs. The heat sinks 115, 1815, and/or 1915, of integrated-lighting-module 100, 1800, 1900, and 2300, are without such radially organized external bumps or nubs. Rather, the heat sinks 115, 1815, and/or 1915, of integrated-lighting-module 100, 1800, 1900, and 2300, have non-radially organized fins 117 (2117).

In some embodiments, fins 117 (of a given integrated-lighting-module contemplated herein and not including prior-art-integrated-lighting-module 2400 nor prior-art-integrated-lighting-module 2500) may not be radially symmetrical. In some embodiments, fins 117 (of a given integrated-lighting-module contemplated herein and not including prior-art-integrated-lighting-module 2400 nor prior-art-integrated-lighting-module 2500) do not extend outwards in a radial fashion from a common central axis (axial centerline). In some embodiments, fins 117 (of a given integrated-lighting-module contemplated herein and not including prior-art-integrated-lighting-module 2400 nor prior-art-integrated-lighting-module 2500) may be parallel with each other (may run in directions that are parallel with each other). In some embodiments, fins 117 (of a given integrated-lighting-module contemplated herein and not including prior-art-integrated-lighting-module 2400 nor prior-art-integrated-lighting-module 2500) may run in a direction that may be parallel with each other.

With respect to a given integrated-lighting-module 100, integrated-lighting-module 1800, integrated-lighting-module 1900, or integrated-lighting-module 2300, a distance between two opposite terminal surfaces and/or two opposite terminal edges of a given fin 117 that at least mostly (substantially) face away from each other, may differ (be different) from a distance between two opposite terminal surfaces and/or two opposite terminal edges of a different fin 117 that at least mostly (substantially) face away from each other.

In some embodiments, with respect to a direction of moving linearly and orthogonally away from an axial centerline (common central axis) of a given heat sink module 115, 1815, and/or 1915 from within lower-cavity 2003 and/or from within volume 1503, that direction, does not lead to fins 117. See e.g., FIG. 20A (or FIG. 20B), where there are no fins 117 outside of lower-cavity 2003, because the fins 117 end at a top of floor 2005 outside of upper-cavity 2001.

With respect to integrated-lighting-module 100, integrated-lighting-module 1800, integrated-lighting-module 1900, and integrated-lighting-module 2300 there is no exterior-wiring 2511 (i.e., there is no exterior wiring running from an outside of a driver cap to a heat sink). With respect to integrated-lighting-module 100, integrated-lighting-module 1800, integrated-lighting-module 1900, and integrated-lighting-module 2300 there is no exterior wiring running from an outside sidewall of a driver cap to a heat sink. With respect to integrated-lighting-module 100, integrated-lighting-module 1800, integrated-lighting-module 1900, and integrated-lighting-module 2300 there is no exterior wiring running from an outside sidewall of a driver cap and along outer fin edges, in a mostly horizontal manner, to a heat sink. In integrated-lighting-module 100, in integrated-lighting-module 1800, and in integrated-lighting-module 1900 wiring from its respective driver to its respective LED chip 701 happens entirely within exterior boundaries (confines) of the overall assembly, of its respective driver-cap, of its respective heat sink module, and/or vertically between that driver-cap and that heat sink module; and in integrated-lighting-module 2300 the driver and the LED are part of the same PCB (there is no such exterior-wiring 2511 or the like). For example, compare FIGS. 19C-19F to FIGS. 25B and 25C.

With respect to integrated-lighting-module 1900 and/or integrated-lighting-module 2300 its driver may be located within its heat sink module and not within a driver cap; and integrated-lighting-module 1900 and/or integrated-lighting-module 2300 have may no driver cap as that term is used herein (such as, driver-cap 101).

The air gap 1841 between driver-cap 101 and heat sink module 1815 (integrated-lighting-module 1800) is not formed by a central bolt that is coaxial with the axial centerline of integrated-lighting-module 1800; rather, air gap 1841 is formed by spacer(s) 1843 and spacer(s) 1843 are not coaxial with the axial centerline of integrated-lighting-module 1800.

In some embodiments, a top and/or upper region (portion) of driver-cap 101 and/or lid 1901 may be devoid of ventilation slits (slots). In some embodiments, driver-cap 101 and/or lid 1901 may not have any ventilation slits (slots).

With respect to a length of heat sink module 115, 1815, and/or 1915, an outside diameter of heat sink module 115, 1815, and/or 1915 tapers (gets narrower) towards a bottom of the heat sink module 115, 1815, and/or 1915; but does not taper at an upper region of the heat sink module 115, 1815, and/or 1915. With respect to a length of heat sink module 115, 1815, and/or 1915, the outside diameter of heat sink module 115, 1815, and/or 1915 is the same (uniform) at its middle and at its upper region. The bottom of heat sink module 115, 1815, and/or 1915 is associated with lower-cavity 2003 (or volume 1503), with female threading, where the heat sink attaches to the holder, and/or where its LED 701 shines (at least mostly) out of. LED 701 shines light in the bottom direction.

In some embodiments, most (a majority of) fins selected from plurality of fins 117 may have a same/uniform/constant thickness; whereas, in some embodiments, a minority of fins selected from plurality of fins 117 may have a thicker thickness than the remaining fins selected from plurality of fins 117.

In some embodiments, integrated-lighting-module 100 may comprise a driver cap 101 (driver housing 101), a heat sink module 115, at least one LED light chip 701, at least one optical reflector 703, and a holder 125. In some embodiments, integrated-lighting-module 100, driver cap 101 (driver housing 101), heat sink module 115, LED light chip 701, optical reflector 703, and holder 125 may be as previously described and discussed above and/or as shown in the drawing figures.

In some embodiments, driver housing 101 may have side walls 103 of driver housing 101 and top 105 of driver housing 101 that may at least mostly cap side walls 103. In some embodiments, side walls 103 of driver housing 101 and top 105 of driver housing 101 may substantially surround a driver-volume 1501 of driver housing 101. In some embodiments, driver-volume 1501 may be configured to receive a driver that is configured to provide electrical power to at least one light emitting diode element 701. See e.g., FIG. 1, FIG. 11, and FIG. 15.

In some embodiments, heat sink module 115, 1815, and/or 1915 may be configured for transferring at least some heat away from at least one light emitting diode (LED) element 701 and/or 2301. In some embodiments, at least some of a top region of heat sink module 115 may be in communication to at least some of a bottom region of driver housing 101 (and a nature of that communication may be as shown and discussed with respect to FIG. 13A to FIG. 13I). See e.g., FIG. 1, FIG. 11, and FIG. 15.

In some embodiments, at least one light emitting diode (LED) element 701 and/or 2301 may be configured to emit light. In some embodiments, at least one light emitting diode element 701 and/or 2301 may be in communication with at least a portion of heat sink module 115, 1815, and/or 1915. In some embodiments, a nature of that communication may be that at least one light emitting diode element 701 is attached to some portion of heat sink module 115. See e.g., FIG. 1, FIG. 11, and FIG. 15.

In some embodiments, at least one optical reflector 703 may be at least substantially shaped as a conical frustum. In some embodiments, at least one optical reflector 703 may be configured for reflecting and directing at least some light from at least one light emitting diode element 701 and/or 2301 out of bottom 1133 of at least one optical reflector 703. In some embodiments, at least one light emitting diode element 701 and/or 2301 may be disposed above top-hole 1131 of at least one optical reflector 703. In some embodiments, top-hole 1131 may be located at a top portion of the optical reflector 703 and disposed opposite from the bottom 1133 of least one optical reflector 703. See e.g., FIG. 1, FIG. 11, and FIG. 15.

In some embodiments, holder 125 (or holder 1825) may be configured to trap at least one optical reflector 703 between at least some elements of holder 125 (or holder 1825) and at least some elements of heat sink module 115 (or heat sink module 1815). In some embodiments, holder 125 may be in communication with heat sink module 115 (and a nature of that communication may be as shown and discussed with respect to FIG. 13A to FIG. 13I). In some embodiments, holder 1825 may be in communication with heat sink module 1815. In some embodiments, the communication between holder 125 or holder 1825 and heat sink module 115 or 1815 may be attachment to each other. In some embodiments, the attachment between holder 125 and heat sink module 115 may be done by a complementary threading connection. See e.g., FIG. 1, FIG. 11, FIG. 13A to FIG. 13I, and FIG. 15. In some embodiments, the attachment between holder 1825 and heat sink module 1815 may be done by a complementary threading connection.

In some embodiments, when integrated-lighting-module 100 may be an assembled configuration, driver housing 101 may be attached to heat sink module 115, heat sink module 115 may be attached to at least one light emitting diode element 701, heat sink module 115 may be attached to holder 125 with the at least one optical reflector 703 trapped between at least some elements of holder 125 and at least some elements of heat sink module 115. See e.g., FIG. 1, FIG. 11, FIG. 13A to FIG. 13I, FIG. 14A to FIG. 14C, and FIG. 15.

In some embodiments, when integrated-lighting-module 100 may be an assembled configuration, integrated-lighting-module 100 may have an overall height (overall length), wherein with respect to that overall height (overall length), driver housing 101 may be located at an overall top of integrated-lighting-module 100 and holder 125 may be located at an overall bottom of integrated-lighting-module 100; such that driver housing 101 and holder 125 may be disposed opposite of each other (along that overall height [overall length]), and such that driver housing 101 may be located entirely above heat sink module 115. See e.g., FIG. 1, FIG. 11, FIG. 13A to FIG. 13I, FIG. 14A to FIG. 14C, and FIG. 15.

In some embodiments, integrated-lighting-module 100, 1800, 1900, and/or 2300 may be configured to receive 120 V (volts), A/C (alternating current), as an input. In some embodiments, integrated-lighting-module 100, 1800, 1900, and/or 2300 may be configured to receive 110 V (volts), A/C, as an input. In some embodiments, integrated-lighting-module 100, 1800, 1900, and/or 2300 may be configured to receive other predetermined voltages as an input.

In some embodiments, at least some portion of a given integrated-lighting-module (such as, but not limited to, integrated-lighting-module 100, 1800, 1900, and/or 2300) may be sized for direct communication (e.g., physical attachment and/or receiving) with a trim (such as, but not limited to, trim 1221) that has an upper opening with a diameter dimension selected from a range of one-half (0.5) inch to two and one-half (2.5) inches. In some embodiments, this diameter (of the upper opening at the trim) may be selected from a range from one and one-half (1.5) inches to two and one-quarter (2.25) inches. In some embodiments, the trim may have an upper opening to accept the given integrated-lighting-module from a range of one-half (0.5) inch to two and one-half (2.5) inches. In some embodiments, the trim may have an upper opening to accept the given integrated-lighting-module from a range of one and one-half (1.5) inches to two and one-quarter (2.25) inches. In some embodiments, this upper opening at the top of the trim may be at least mostly/substantially circular.

In some embodiments, integrated-lighting-module 100, 1800, 1900, and/or 2300 may be used with trim 1221 that may be sized "MR16." In some embodiments, trim 1221 may be another predetermined sized trim. In some embodiments, integrated-lighting-module 100, 1800, 1900, and/or 2300 may be used with trim 1221 that may have a three-inch size; and with adjustability of integrated-lighting-module 100, 1800, 1900, and/or 2300.

In some embodiments, driver cap 101, heat sink module 115, and/or holder 125 may have exterior shapes that are at least substantially (mostly): right cylindrical; conical frustum; funnel; with or without fin(s); with or without annular exterior flange(s); with or without outside threading; with or without inside threading; portions thereof, combinations thereof, and/or the like. In some embodiments, holder 125 may have at least some elements that are substantially shaped as a conical frustum.

In some embodiments, holder 125 (or holder 1825) may be a trim part/component. In some embodiments, holder 125 (or holder 1825) may be replaced with a trim/part component. In some embodiments, holder 125 (or holder 1825) and optical reflector 703 may be combined into a single integral article of manufacture. In some embodiments, holder 125 (or holder 1825), optical reflector 703, and a trim part/component may be combined into a single integral article of manufacture.

In some embodiments, integrated-lighting-module 100, driver cap 101, heat sink module 115, and/or holder 125 may comprise one or more aperture(s), such as, but not limited to aperture 109, 1117, 1119, and/or 1121. In some embodiments, these apertures may be holes, such as through holes in material of integrated-lighting-module 100, driver cap 101, heat sink module 115, and/or holder 125. In some embodiments, these apertures may be configured to receive one or more mechanical fastener(s) (such as, but not limited to, screw(s), bolt(s), nail(s), pin(s), rod(s), dowel(s), brad(s), tack(s), staple(s), and/or the like). In some embodiments, these apertures may be configured for passing at least one wire through the given aperture. In some embodiments, a top region of heat sink module 115 may comprise at least one such aperture. In some embodiments, a non-finned region of heat sink module 115 may comprise at least one such aperture. In some embodiments, a finned region of heat sink module 115 may comprise at least one such aperture.

In some embodiments, fin(s) (such as, but not limited to, fin(s) 117) of heat sink module 115 may be configured to transfer heat out of and/or away from at least portions of one or more of: heat sink module 115, LED light chip 701 and/or 2301, a driver (e.g., within driver cap 101), portions thereof, combinations thereof, and/or the like. In some embodiments, a given heat sink module 115 may have fin(s) (such as, but not limited to, fin(s) 117) anywhere on that given heat sink module 115. In some embodiments, side-wall(s) 119 (of a given heat sink module 115) may have fin(s) (such as, but not limited to, fin(s) 117) anywhere on that given side-wall(s) 119. In some embodiments, fin(s) (such as, but not limited to, fin(s) 117) may be on one or more of: a top (upper) region of heat sink module 115, a middle region of heat sink module 115, a bottom region of heat sink module 115, portions thereof, combinations thereof, and/or the like. In some embodiments, fin(s) (such as, but not limited to, fin(s) 117) may be part of one or more of: a top (upper) region of heat sink module 115, a middle region of heat sink module 115, a bottom region of heat sink module 115, portions thereof, combinations thereof, and/or the like. In some embodiments, fin(s) (such as, but not limited to, fin(s) 117) may be on one or more of: a top (upper) region of side-wall(s) 119, a middle region of side-wall(s) 119, a bottom region of side-wall(s) 119, portions thereof, combinations thereof, and/or the like. In some embodiments, fin(s) (such as, but not limited to, fin(s) 117) may be part of one or more of: a top (upper) region of side-wall(s) 119, a middle region of side-wall(s) 119, a bottom region of side-wall(s) 119, portions thereof, combinations thereof, and/or the like. In some embodiments, fin(s) (such as, but not limited to, fin(s) 117) of heat sink module 115 may have outside threading on them and/or may have inside threading on them. In some embodiments, threading on fin(s) such as, but not limited to, fin(s) 117) of heat sink module 115 may be configured for attachment to driver cap 101 and/or holder 125.

In some embodiments, heat sink module 115, 1815, and/or 1915 may have inside threading around inside diameter(s) of heat sink module 115, 1815, and/or 1915; and/or heat sink module 115, 1815, and/or 1915 may have outside threading around outside diameter(s) of heat sink module 115, 1815, and/or 1915. In some embodiments, such threading on heat sink module 115, 1815, and/or 1915 may be configured for attachment to driver cap 101 (or lid 1901) and/or holder 125 or holder 1825.

In some embodiments, integrated-lighting-module 100 may include sufficient space for a driver to be flush with a top of integrated-lighting-module 100. For example, and without limiting the scope of the present invention, the driver may be located substantially within driver cap 101 (e.g., within volume 1501).

At least some components of integrated-lighting-module 100, 1800, 1900, and/or 2300 may be 3D (three dimensional) printed, injection molded, cast, stamped, die cast, die cut, extruded, machined, combinations thereof, and/or the like.

Note, any ranges noted herein may include one or both endpoints of the given disclosed range.

An integrated-lighting-module and a system using an integrated-lighting-module have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An integrated lighting module comprising:

a driver housing that has side walls of the driver housing and a top of the driver housing that at least mostly caps the side walls; wherein the side walls of the driver housing and the top of the driver housing substantially surround a driver-volume of the driver housing, wherein the driver-volume is configured to receive a driver that is configured to provide electrical power to at least one light emitting diode element;

a heat sink module that is configured for transferring at least some heat away from the at least one light emitting diode element; wherein at least some of a top region of the heat sink module is in physical communication with at least some region of the driver housing;

the at least one light emitting diode element that is configured to emit light; wherein the at least one light emitting diode element is disposed inside of the heat sink module;

an optical reflector that is substantially shaped as a conical frustum that is configured for reflecting and directing at least some light from the at least one light emitting diode element out of a bottom of the optical reflector; wherein the at least one light emitting diode element is disposed above a top of the optical reflector; and a holder that is configured to trap the optical reflector between at least some elements of the holder and at least some elements of the heat sink module; wherein the holder is in direct physical communication with the heat sink module.

2. An integrated lighting module comprising:

a driver housing that has first side walls, a first top that at least substantially covers the first side walls; wherein the first side walls and the first top substantially surround a first volume of the driver housing, wherein the first volume is configured to receive a driver that is configured to provide electrical power to a light emitting diode element;

a heat sink module that is configured for receiving the light emitting diode element and for transferring heat away from the light emitting diode element, wherein the heat sink module has an upper portion that has a larger exterior diameter that is larger than a smaller exterior diameter of a lower portion of the heat sink module; wherein the lower portion transitions into the upper portion; wherein the driver housing is attached to the heat sink module;

the light emitting diode element that is configured to emit light, wherein the light emitting diode element is located within the heat sink module;

an optical reflector that is at least substantially frustum shaped, wherein the optical reflector is configured for reflecting and directing at least some light from the light emitting diode element out of a bottom of the optical reflector; wherein the light emitting diode element is disposed above a top of the optical reflector and within the heat sink module; and a holder that has second side-walls that substantially surround a second volume, wherein the second volume is configured to receive at least a bottom region of the lower portion of the heat sink module; wherein the holder is open at its top and at its bottom.

3. An integrated lighting module of at least five components, namely, a holder, an optical reflector, a light-emitting-diode component, a heat sink module, and a driver cap;

wherein the holder is a first substantially hollow cylindrical member that is open at both ends, with internal threading, and with a bottom-flange; wherein the optical reflector is a substantially conical frustum shaped member with a narrower top disposed away from a wider bottom of the optical reflector; wherein the optical reflector is configured to direct at least some light from the light-emitting-diode component out of the wider bottom of the optical reflector; wherein the light-emitting-diode component is configured to emit light; wherein the light-emitting-diode component when energized emits light out to the narrower top of the optical reflector and out of the wider bottom of the optical reflector; wherein the heat sink module comprises a plurality of fins that are configured to emit heat away from the heat sink module; wherein the driver cap is a second substantially hollow cylindrical member that is at least mostly closed at a top of the driver cap; wherein the driver cap is configured to attach to the heat sink module; wherein the driver cap is configured to house a driver, wherein the driver is configured to provide electrical power to energize the light-emitting-diode component; wherein the heat sink module is attached to both the driver cap and to the holder with the light-emitting-diode component and the optical reflector being disposed between a bottom of the holder and a top of the heat sink module.

* * * * *